United States Patent [19]
Kato et al.

[11] Patent Number: 5,982,444
[45] Date of Patent: Nov. 9, 1999

[54] ENCODING METHOD AND APPARATUS FOR ENCODING EDITED PICTURE SIGNALS, SIGNAL RECORDING MEDIUM AND PICTURE SIGNAL DECODING METHOD AND APPARATUS

[75] Inventors: Motoki Kato; Katsumi Tahara, both of Kanagawa, Japan

[73] Assignee: Sony Corporation, Tokyo, Japan

[21] Appl. No.: 09/095,312

[22] Filed: Jun. 10, 1998

Related U.S. Application Data

[63] Continuation of application No. 08/607,010, Feb. 26, 1996.

[30] Foreign Application Priority Data

| Feb. 28, 1995 | [JP] | Japan | 7-040250 |
| Sep. 26, 1995 | [JP] | Japan | 7-248062 |

[51] Int. Cl.$^6$ ........................................ H04N 2/01
[52] U.S. Cl. .................... 348/446; 348/911; 348/459; 348/558
[58] Field of Search ............... 348/558, 459, 348/446, 722, 699, 700, 911, 447, 556, 443, 458, 526

[56] References Cited

U.S. PATENT DOCUMENTS

| 5,115,311 | 5/1992 | Jaqua ........................... 348/441 |
| 5,452,011 | 9/1995 | Martin et al. ................. 348/526 |
| 5,461,420 | 10/1995 | Yonemitsu et al. ........... 348/401 |
| 5,508,250 | 4/1996 | Hewlett et al. ............... 348/558 |
| 5,563,651 | 10/1996 | Christopher et al. ......... 348/97 |
| 5,606,323 | 2/1997 | Dopp et al. ................... 348/459 |

FOREIGN PATENT DOCUMENTS

| 0 588 668 A2 | 3/1994 | European Pat. Off. . |
| 0 588 669 A2 | 3/1994 | European Pat. Off. . |
| 0 685 968 A2 | 12/1995 | European Pat. Off. . |
| WO 94/30006 | 12/1994 | WIPO . |
| WO 95/15659 | 6/1995 | WIPO . |

*Primary Examiner*—Victor R. Kostak
*Attorney, Agent, or Firm*—Frommer Lawrence & Haug, LLP; William S. Frommer

[57] ABSTRACT

A picture signal encoding method in which a picture string produced by converting non-interlaced pictures into sets of field pictures each beginning from the first field of each interlaced picture and another picture string produced by converting non-interlaced pictures into sets of field pictures each beginning from the second field of each interlaced picture are combined together to an input picture signal for encoding, is disclosed. The method includes a detection step of detecting a lone field not constituting the non-interlaced picture in the input picture signal, and an encoding step of re-constructing the picture string of the input picture signal and encoding the resulting non-interlaced picture string.

3 Claims, 44 Drawing Sheets

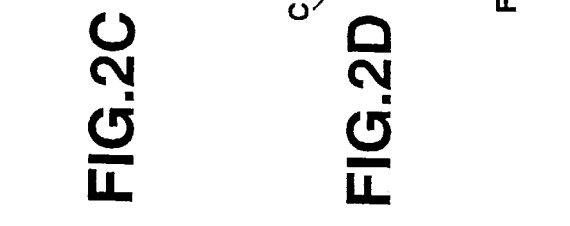
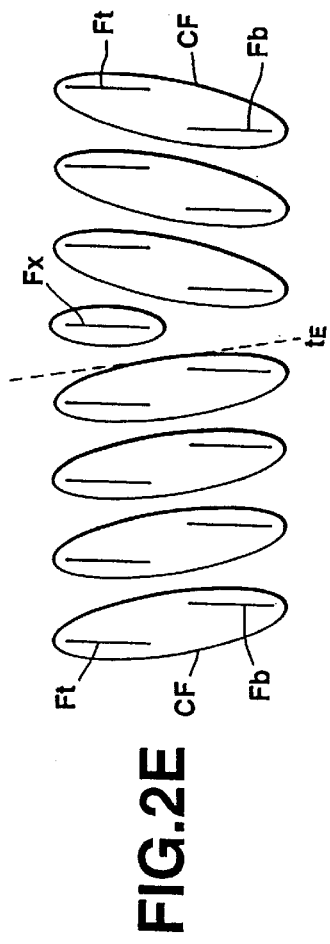
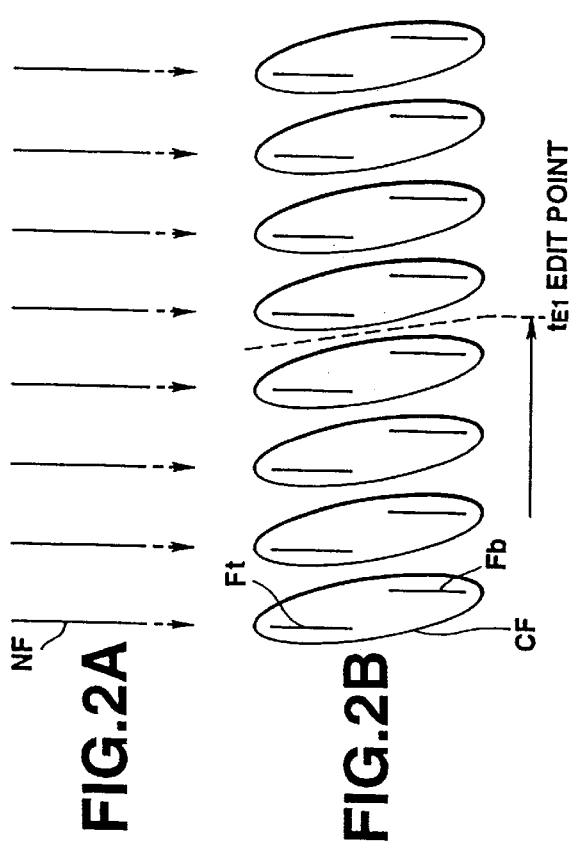
FIG.2A FIG.2B FIG.2C FIG.2D FIG.2E

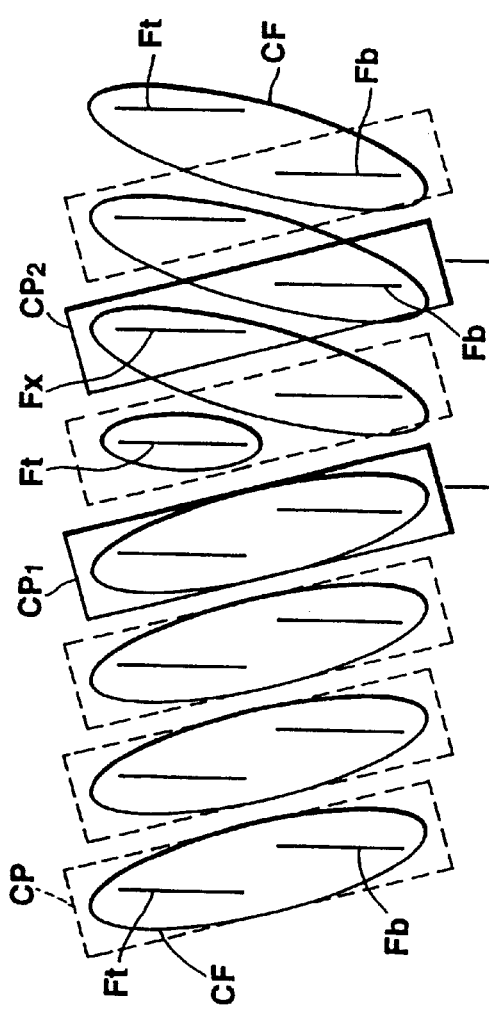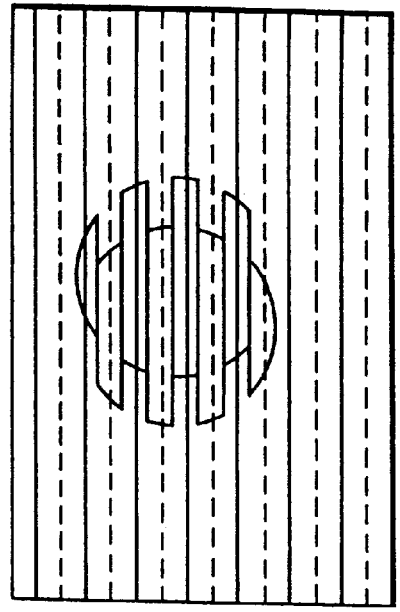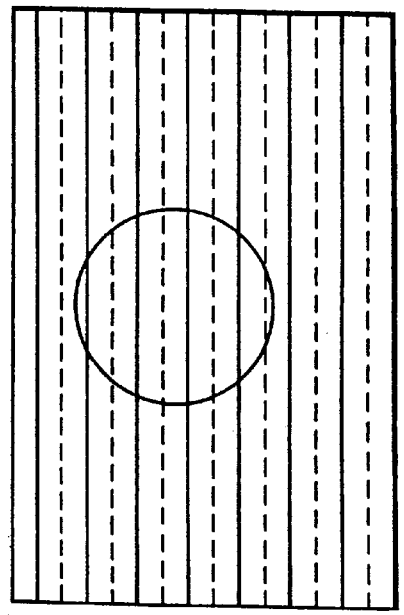

EDIT POINT

| S1 | A | | B | | C | | ? | | D | | E | | F | |
|----|---|---|---|---|---|---|---|---|---|---|---|---|---|---|
|    |   | a |   | b |   | c |   | d |   | e |   | f |   | g |
| S2 | 1 | 0 | 1 | 0 | 1 | 0 | 1 | 1 | 0 | 1 | 0 | 1 | 0 | 1 |
| S3 | 0 | 0 | 0 | 0 | 0 | 0 | 1 | 0 | 0 | 0 | 0 | 0 | 0 | 0 |
| S4 | 1 | | 1 | | 1 | | 1 | | 0 | | 0 | | | |
| S5 | 0 | | 0 | | 0 | | 1 | | 0 | | 0 | | | |
| S6 | A | | B | | C | | | | D | | E | | F | |
|    |   | a |   | b |   | c |   | d |   | e |   | f |   |

FIG.6

EDIT POINT

| S1 | A | | B | | C | | ? | | D | | E | | F | |
|----|---|---|---|---|---|---|---|---|---|---|---|---|---|---|
|    |   | a |   | b |   | c |   | d |   | e |   | f |   | g |
| S2 | 1 | 0 | 1 | 0 | 1 | 0 | 0 | 1 | 0 | 1 | 0 | 1 | 0 | 1 |
| S3 | 0 | 0 | 0 | 0 | 0 | 0 | 1 | 0 | 0 | 0 | 0 | 0 | 0 | 0 |
| S4 | 1 | | 1 | | 1 | | 0 | | 0 | | 0 | | | |
| S5 | 0 | | 0 | | 1 | | 0 | | 0 | | 0 | | | |
| S6 | A | | B | | C | | | | D | | E | | F | |
|    |   | a |   | b |   | c |   | d |   | e |   | f |   |

FIG.7

EDIT POINT ↓

| | D | E | F | G | H | I | J | K |
|---|---|---|---|---|---|---|---|---|
| S1 | e | f | g | ? | h | i | j | k |

| | | | | | | | | | | | | | | | |
|---|---|---|---|---|---|---|---|---|---|---|---|---|---|---|---|
| S2 | 0 | 1 | 0 | 1 | 0 | 1 | 0 | 1 | 1 | 0 | 1 | 0 | 1 | 0 | 1 | 0 |
| S3 | 0 | 0 | 0 | 0 | 0 | 0 | 0 | 1 | 0 | 0 | 0 | 0 | 0 | 0 | 0 | 0 |

| | | | | | | | | |
|---|---|---|---|---|---|---|---|---|
| S4 | 0 | 0 | 0 | 0 | 1 | 1 | 1 | |
| S5 | 0 | 0 | 0 | 1 | 0 | 0 | 0 | |

| | | E | F | G | H | I | J | K |
|---|---|---|---|---|---|---|---|---|
| S6 | e | f | g | | h | i | j | k |

FIG.8

EDIT POINT ↓

| | D | E | F | G | H | I | J | K |
|---|---|---|---|---|---|---|---|---|
| S1 | e | f | g | ? | h | i | j | k |

| | | | | | | | | | | | | | | | |
|---|---|---|---|---|---|---|---|---|---|---|---|---|---|---|---|
| S2 | 0 | 1 | 0 | 1 | 0 | 1 | 0 | 0 | 1 | 0 | 1 | 0 | 1 | 0 | 1 | 0 |
| S3 | 0 | 0 | 0 | 0 | 0 | 0 | 0 | 1 | 0 | 0 | 0 | 0 | 0 | 0 | 0 | 0 |

| | | | | | | | | |
|---|---|---|---|---|---|---|---|---|
| S4 | 0 | 0 | 0 | 1 | 1 | 1 | 1 | |
| S5 | 0 | 0 | 0 | 0 | 0 | 0 | 0 | |

| | | E | F | G | H | I | J | K |
|---|---|---|---|---|---|---|---|---|
| S6 | e | f | g | | h | i | j | k |

FIG.9

```
1    var = 0;
2    for(pix=0; pix<frame_horizontal_size; pix++) {
3      for(line=0; line<frame_vertical_size-2; line+=2) {
4        dif1 = F(pix, line   ) - F(pix, line+1);              ···(a)
5        dir2 = F(pix, line+1) - F(pix, line+2);               ···(b)
6
7        var += |dif1| + |dif2| ;                              ···(c)
8      }
9    }
```

FIG.13

| | A | B | C | ? | D | E | F | G | H | I | J | K |
|---|---|---|---|---|---|---|---|---|---|---|---|---|
| S1 | a | b | c | d | e | f | g | ? | h | i | j | k |
| S22 | 1 | 0 | 1 | 0 | 1 | 0 | 1 | 0 | 1 | 1 | 0 | 1 | 0 |
| S24(tff) | 1 | 1 | 1 | 1 | 0 | 0 | 0 | 0 | 1 | 1 | 1 | |
| S25(rff) | 0 | 0 | 0 | 1 | 0 | 0 | 0 | 1 | 0 | 0 | 0 | |
| PATTERN | 1 | 1 | 1 | 2 | 4 | 4 | 4 | 5 | 1 | 1 | 1 | |

| | A | B | C | ? | | | | | | | |
|---|---|---|---|---|---|---|---|---|---|---|---|
| S103 | a | b | c | d | | | | | | | |

| | A | B | C | ? | D | E | F | G | H | I | J |
|---|---|---|---|---|---|---|---|---|---|---|---|
| S104 | A | B | C | ? | D | E | F | G | H | I | J |
|  | a | b | c | d | e | f | g | ? | h | i | j |

| | | A | B | C | D | ? | E | F | G | H | I | J |
|---|---|---|---|---|---|---|---|---|---|---|---|---|
| S105 | | a | b | c | d | — | e | f | g | ? | h | i | j |

| | A | B | C | D | — | E | F | G | H | I | J |
|---|---|---|---|---|---|---|---|---|---|---|---|
| S26 | a | b | c | d | — | e | f | g | h | i | j |

| FRAME DELAY | 4 | 4 | 4 | 4 | 4 | 3 | 4 | 4 | 5 | 4 | 5 | 4 | 4 | 4 | 4 | 4 |

EDIT POINT → (above column ?/d of S1)
EDIT POINT → (above column H)

| | | | | | EDIT POINT ↓ | | | | | | | | EDIT POINT ↓ | | | | | | | |
|---|---|---|---|---|---|---|---|---|---|---|---|---|---|---|---|---|---|---|---|---|
| S1 | \|A\| a\| | \|B\| b\| | \|C\| c\| | \|?\| d\| | \|D\| e\| | \|E\| f\| | \|F\| g\| | \|G\| ?\| | \|H\| h\| | \|I\| i\| | \|J\| j\| | \|K\| k\| | | | | | | | | |
| S22 | 1 | 0\|1 | 0\|1 | 0 | 0\|1 | 0\|1 | 0\|1 | 0 | 0\|1 | 0\|1 | 0\|1 | 0 | | | | | | | | |
| S24(tff) | 1 | 1 | 1 | | 0 | 0 | 1 | 1 | 1 | 1 | 1 | 1 | | | | | | | | | |
| S25(rff) | 0 | 0 | 1 | | 0 | 0 | 0 | 1 | 0 | 0 | 0 | 0 | | | | | | | | | |
| PATTERN | 1 | 1 | 3 | | 4 | 4 | 4 | 6 | 4 | 4 | 4 | 4 | | | | | | | | | |
| S103 | | | | | \|A\| a\| | \|B\| b\| | \|C\| c\| | \|?\| d\| | \|D\| e\| | \|E\| f\| | \|F\| g\| | \|G\| ?\| | \|H\| h\| | \|I\| i\| | \|J\| j\| | | | | | |
| S104 | | | | | | \|A\| a\| | \|B\| b\| | \|C\| c\| | \|?\| d\| | \|D\| e\| | \|E\| f\| | \|F\| g\| | \|G\| ?\| | \|H\| h\| | \|I\| i\| | \|J\| j\| | | | | |
| S105 | | | | | | | \|A\| a\| | \|B\| b\| | \|C\| c\| | \|D\| d\| | \|E\| e\| | \|F\| f\| | \|G\| g\| | \|H\| h\| | \|I\| i\| | \|J\| j\| | | | | |
| S26 | | | | | | \|A\| a\| | \|B\| b\| | \|C\| c\| | \|D\| —\| | \|D\| d\| | \|E\| e\| | \|F\| f\| | \|G\| g\| | \|H\| h\| | \|I\| i\| | \|J\| j\| | | | | |
| FRAME DELAY | | | | | | \|4 4\|4 | 4\|4 | 4\|— | —\|4 | 5\|4 | 4\|5 | 4\|4 | 5\|4 | 4\|4 | 4\|4 | 4\| | | | | |

```
1   function ( ) {
2     n = 0;
3     isTop_field = 1;
4
5     while (!EOF) {
6
7       if (S22[n+3] == 1 &&  ⎫
8          S22[n+4] == 0 &&   ⎬ ─ CND1
9          S22[n+5] == 1 &&   ⎪
10         S22[n+6] == 0)  {  ⎭
11                              ─ CND2
12        if (isTop_field == 1) {
13          if (S22[n+1] == 1) ─ CND3
14            top_field_first[n] = 1, repeat_first_field[n] = 1, pattern[n] = 2;
15          else
16            top_field_first[n] = 1, repeat_first_field[n] = 1, pattern[n] = 3;
17
18          isTop_field = 0;
19        }
20        else {
21          if (S22[n+1] == 1) ─ CND4
22            top_field_first[n] = 0, repeat_first_field[n] = 1, pattern[n] = 5;
23          else
24            top_field_first[n] = 0, repeat_first_field[n] = 1, pattern[n] = 6;
25
26          isTop_field = 1;
27        }
28
29        n = n+3;
30
31      }
32      else {
33
34        if (isTop_field == 1) ─ CND5
35          top_field_first[n] = 1, repeat_first_field[n] = 0, pattern[n] = 1;
36        else
37          top_field_first[n] = 0, repeat_first_field[n] = 0, pattern[n] = 4;
38
39        n = n+2;
40
41      }
42    }
43
44  }
```

FIG.17

EDIT POINT
↓

| S1 | A | | B | | C | | D | | E | | ? | | F | | G | | H | | I |
|---|---|---|---|---|---|---|---|---|---|---|---|---|---|---|---|---|---|---|---|
| | | a | | b | | c | | d | | e | | f | | g | | h | | i | |

| S2 | 1 | 0 | 1 | 0 | 1 | 0 | 1 | 0 | 1 | 0 | 1 | 1 | 0 | 1 | 0 | 1 | 0 | 1 |
|---|---|---|---|---|---|---|---|---|---|---|---|---|---|---|---|---|---|---|
| S3 | 0 | 0 | 0 | 0 | 0 | 0 | 0 | 0 | 0 | 0 | 1 | 0 | 0 | 0 | 0 | 0 | 0 | 0 |

| S4 | 1 | | 1 | | 1 | | 1 | | 1 | | 1 | | 0 | | 0 | | 0 | |
|---|---|---|---|---|---|---|---|---|---|---|---|---|---|---|---|---|---|---|
| S5 | 0 | | 0 | | 0 | | 0 | | 0 | | 1 | | 0 | | 0 | | 0 | |

| S6 | A | | B | | C | | D | | E | | | | F | | G | | H | | I |
|---|---|---|---|---|---|---|---|---|---|---|---|---|---|---|---|---|---|---|---|
| | | a | | b | | c | | d | | e | | | f | | g | | h | | i |

| S7 | I | | B | | B | | P | | B | | B | | | P | | B | | B | |

FIG.27A

EDIT POINT
↓

| S1 | A | | B | | C | | D | | E | | ? | | F | | G | | H | | I |
|---|---|---|---|---|---|---|---|---|---|---|---|---|---|---|---|---|---|---|---|
| | | a | | b | | c | | d | | e | | f | | g | | h | | i | |

| S2 | 1 | 0 | 1 | 0 | 1 | 0 | 1 | 0 | 1 | 0 | 1 | 1 | 0 | 1 | 0 | 1 | 0 | 1 |
|---|---|---|---|---|---|---|---|---|---|---|---|---|---|---|---|---|---|---|
| S3 | 0 | 0 | 0 | 0 | 0 | 0 | 0 | 0 | 0 | 0 | 1 | 0 | 0 | 0 | 0 | 0 | 0 | 0 |

| S4 | 1 | | 1 | | 1 | | 1 | | 1 | | 1 | | 1 | | 0 | | 0 | |
|---|---|---|---|---|---|---|---|---|---|---|---|---|---|---|---|---|---|---|
| S5 | 0 | | 0 | | 0 | | 0 | | 0 | | 1 | | 1 | | 0 | | 0 | |

| S6 | A | | B | | C | | D | | E | | ? | | | | G | | H | | I |
|---|---|---|---|---|---|---|---|---|---|---|---|---|---|---|---|---|---|---|---|
| | | a | | b | | c | | d | | e | | | f | | g | | h | | i |

| S7 | I | | B | | B | | P | | B | | B | | P | | | B | | B | |

EDIT POINT ↓

| | | A | | B | | C | | D | | E | | F | | G | | H | |
|---|---|---|---|---|---|---|---|---|---|---|---|---|---|---|---|---|---|
| S1 | a | | b | | c | | ? | | d | | e | | f | | g | | h |

| S2 | 1 | 0 | 1 | 0 | 1 | 0 | 0 | 1 | 0 | 1 | 0 | 1 | 0 | 1 | 0 | 1 | 0 |

| S3 | 0 | 0 | 0 | 0 | 0 | 0 | 1 | 0 | 0 | 0 | 0 | 0 | 0 | 0 | 0 | 0 | 0 |

| S4 | 0 | | 0 | | 0 | | | 1 | | 1 | | 1 | | 1 | | 1 | |
| S5 | 0 | | 0 | | 1 | | | 0 | | 0 | | 0 | | 0 | | 0 | |

| S6 | a | A | b | B | c | C | | | D | d | E | e | F | f | G | g | H | h |

| S7 | B | | I | | B | | | B | | P | | B | | B | | P | |

FIG.28B

EDIT POINT ↓

| | | A | | B | | C | | D | | E | | F | | G | | H | |
|---|---|---|---|---|---|---|---|---|---|---|---|---|---|---|---|---|---|
| S1 | a | | b | | c | | ? | | d | | e | | f | | g | | h |

| S2 | 1 | 0 | 1 | 0 | 1 | 0 | 0 | 1 | 0 | 1 | 0 | 1 | 0 | 1 | 0 | 1 | 0 |

| S3 | 0 | 0 | 0 | 0 | 0 | 0 | 1 | 0 | 1 | 0 | 0 | 0 | 0 | 0 | 0 | 0 | 0 |

| S4 | 0 | | 0 | | 0 | | 0 | | 0 | | | 1 | | 1 | | 1 | |
| S5 | 0 | | 0 | | 0 | | 0 | | 1 | | | 0 | | 0 | | 0 | |

| S6 | a | A | b | B | c | C | ? | D | | | E | e | F | f | G | g | H | h |

| S7 | B | | I | | B | | B | | p | | | B | | B | | P | |

EDIT POINT ↓

| | | | | | | | | | | | | | | | | | | |
|---|---|---|---|---|---|---|---|---|---|---|---|---|---|---|---|---|---|---|
| S1 | A | | B | | C | | D | | E | | ? | | F | | G | | H | | I |
| | | a | | b | | c | | d | | e | | f | | g | | h | | i | |
| S2 | 1 | 0 | 1 | 0 | 1 | 0 | 1 | 0 | 1 | 0 | 1 | 1 | 0 | 1 | 0 | 1 | 0 | 1 | |
| S3 | 0 | 0 | 0 | 0 | 0 | 0 | 0 | 0 | 0 | 0 | 1 | 0 | 0 | 0 | 0 | 0 | 0 | 0 | |
| S4 | 1 | | 1 | | 1 | | 1 | | 1 | | 1 | | 0 | | 0 | | 0 | | |
| S5 | 0 | | 0 | | 0 | | 0 | | 0 | | 1 | | 0 | | 0 | | 0 | | |
| S6 | A | | B | | C | | D | | E | | | | F | | G | | H | | I |
| | | a | | b | | c | | d | | e | | | f | | g | | h | | i |
| | I | | B | | B | | P | | B | | B | | | P | | B | | B | |
| S7 | I | | B | | B | | P | | B | | P | | | P | | B | | B | |

```
1   function ( ) {
2     n = 0;
3     isTop_field = 1;
4
5     while (!EOF) {
6
7       if (picture_coding_type ! = B_PICTURE &&
8           S22[n+3] == 1 &&
9           S22[n+4] == 0 &&                          } ~ CND11
10          S22[n+5] == 1 &&
11          S22[n+6] == 0  {
12                              ~ CND12
13        if (isTop_field == 1) {
14          if (S22[n+1] == 1) ~ CND13
15            top_field_first[n] = 1, repeat_first_field[n] = 1, pattern[n] = 2;
16          else
17            top_field_first[n] = 1, repeat_first_field[n] = 1, pattern[n] = 3;
18
19          isTop_field = 0;
20        }
21        else {        ~ CND14
22          if (S22[n+1] == 1)
23            top_field_first[n] = 0, repeat_first_field[n] = 1, pattern[n] = 5;
24          else
25            top_field_first[n] = 0, repeat_first_field[n] = 1, pattern[n] = 6;
26
27          isTop_field = 1;
28        }
29
30        n = n+3;
31
32      }
33      else {
34                              ~ CND15
35        if (isTop_field == 1)
36          top_field_first[n] = 1, repeat_first_field[n] = 0, pattern[n] = 1;
37        else
38          top_field_first[n] = 0, repeat_first_field[n] = 0, pattern[n] = 4;
39
40        n = n+2;
41
42      }
43    }
44
45   }
```

FIG.33

| S207 | A  a | B  b | C  c | D  d |   | E  e | F  f |
|---|---|---|---|---|---|---|---|
| S10 | 1 | 1 | 1 | 1 |   | 0 | 0 |
| S11 | 0 | 0 | 0 | 1 |   | 0 | 0 |
| S208 | A  a | B  b | C  c | D  d | D  e | E  e | F  f |

FIG.35

| S207 | A  a | B  b | C  c |   | D  d | E  e | F  f |
|---|---|---|---|---|---|---|---|
| S10 | 1 | 1 | 1 |   | 0 | 0 | 0 |
| S11 | 0 | 0 | 1 |   | 0 | 0 | 0 |
| S208 | A  a | B  b | C  c | C  d | D  e | E  e | F  f |

FIG.36

| S207 | E e | F f | G g | H h |  I  i | J j | K k |
|------|-----|-----|-----|-----|---|-----|-----|
| S10  | 0   | 0   | 0   | 0   | 1 | 1   | 1   |
| S11  | 0   | 0   | 0   | 1   | 0 | 0   | 0   |
| S208 | E e | F f | G g | H h | H h | I i | J j | K k |

FIG.37

| S207 | E e | F f | G g | H h | I i | J j | K k |
|------|-----|-----|-----|-----|-----|-----|-----|
| S10  | 0   | 0   | 0   | 1   | 1   | 1   | 1   |
| S11  | 0   | 0   | 1   | 0   | 0   | 0   | 0   |
| S208 | E e | F f | G g | H g | I h | J i | K j | k |

FIG.38

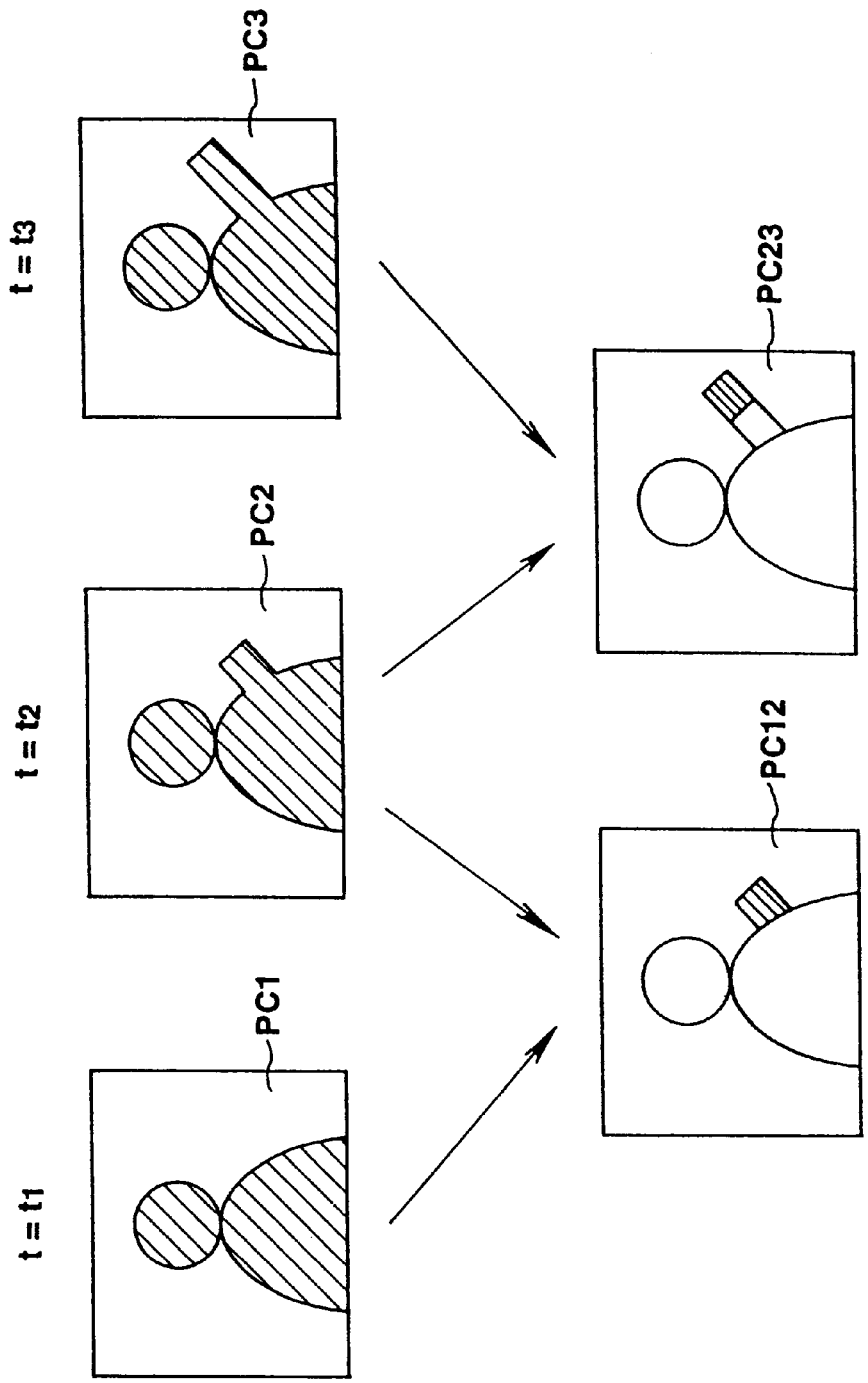

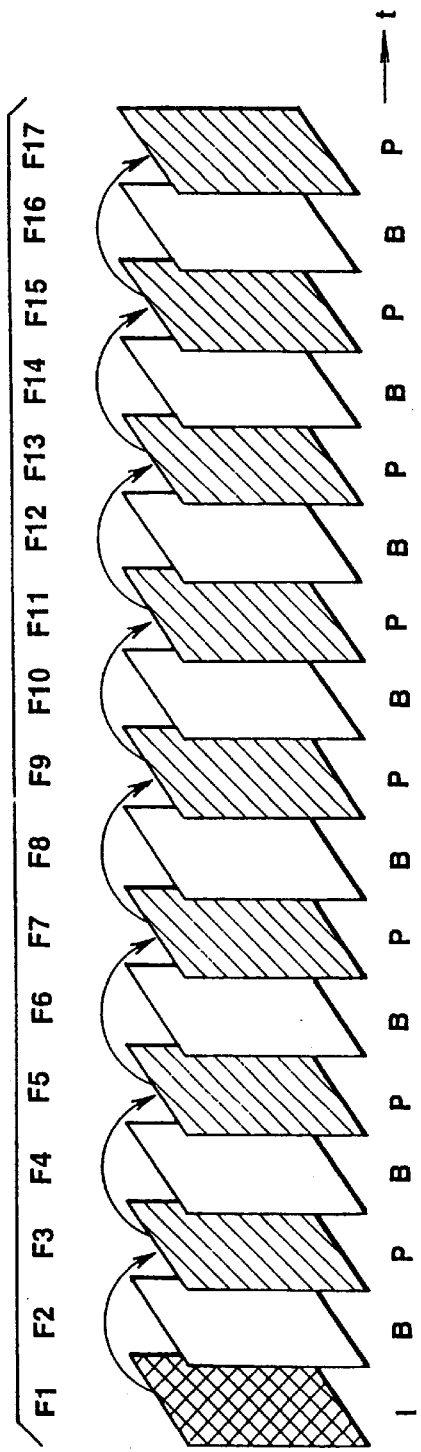
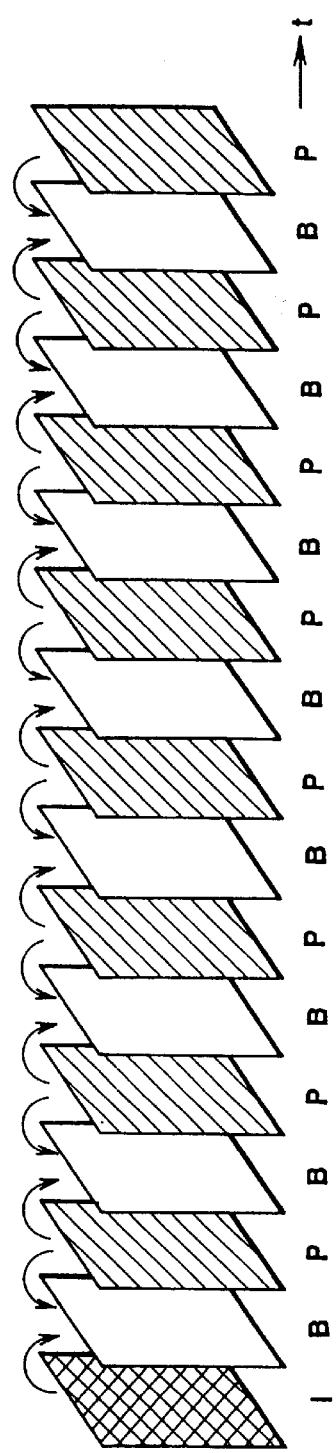
FIG.41A
FIG.41B

FIG.46B FIELD PREDICTION MODE

FIG.46A FRAME PREDICTION MODE

FIG.47B FIELD DCT MODE

FIG.47A FRAME DCT MODE ced picture signals, a signal recording medium having the encoded picture signals recorded thereon, and a picture signal decoding method and apparatus for decoding the encoded picture signals.

ENCODING METHOD AND APPARATUS FOR ENCODING EDITED PICTURE SIGNALS, SIGNAL RECORDING MEDIUM AND PICTURE SIGNAL DECODING METHOD AND APPARATUS

This is a continuation of Ser. No. 08/607,010 filed Feb. 26, 1996.

BACKGROUND OF THE INVENTION

This invention relates to a picture signal encoding method and apparatus, applied to encoding for recording or transmission of moving picture signals, a signal recording medium having the encoded picture signals recorded thereon, and a picture signal decoding method and apparatus for decoding the encoded picture signals.

In a system for transmitting moving picture signals to remote places, as in a teleconference system or television telephone system, line correlation or inter-frame correlation of picture signals is employed for compression encoding of picture signals. When recording moving picture signals on a recording medium, such as a magneto-optical disc or a magnetic tape, and reproducing the recorded signals for display on a display unit, line correlation or inter-frame correlation of picture signals is utilized for high-efficiency compression encoding of picture signals for improving the recording efficiency on the recording medium.

That is, if desired to record the digital video signals of an extremely large information volume on a recording medium of small size and small recording capacity for prolonged recording time, means need to be provided for high efficiency encoding and recording of video signals and for high efficiency decoding of the read-out signals. Thus a high-efficiency encoding system, exemplified by a Moving Picture Expert Group (MPEG) system, exploiting the correlation of video signals, has been proposed for responding to these requirements.

FIG. 1 shows a prior-art example of the system configuration for encoding and decoding moving picture signals using the MPEG system.

In FIG. 1, a field picture supplied from a video tape recorder (VTR) 151 is converted by a scan converter 152 into a frame picture which is encoded by an encoder 153. With the MPEG system, inter-frame differences are found of the video signals for lowering redundancy along the time axis. Subsequently, orthogonal transform techniques, such as discrete cosine transform (DCT), are employed for lowering redundancy along the spatial axis, thereby efficiently encoding video signals. The encoded information may be recorded on a recording medium 154.

For reproducing a recording medium, having recorded thereon high-efficiency encoded signals, reproduced signals are processed by a decoding unit 155 by, for example, inverse orthogonal transform, for deciding a frame picture, which is then converted by a scan converter 156 for display on a monitor 157.

It is assumed that a film picture, obtained from a film picture, by a tele-cine technique using so-called 2-2 pull-down, is supplied from a VTR 151.

The 2-2 pull-down is a tele-cine technique extensively used in converting 24-picture-frame-per-second film pictures into 25-frame-per-second or 50-field-per-second video signals in accordance with the so-called phase alternation by line (PAL) system. This system consists in reading out each picture frame of a film in two video fields by interlaced scanning.

Since the two fields thus read out are read out from the same picture frame, the two fields converted into a frame structure may be handled as a non-interlaced frame. That is, this frame is equivalent to a frame obtained by reading out a picture film of a film with a video frame by non-interlaced scanning.

In general, a non-interlaced frame is higher in line-to-line correlation in the vertical direction than the interlaced frame and hence is higher in redundancy and frame encoding efficiency than a interlaced frame.

If 2:2 pull-down is performed regularly for the totality of the picture frames of the film, the frames entering an encoder 3 are necessarily non-interlaced frames, so that the frame encoding efficiency is high and hence no problem is presented.

If, with the conventional encoding system, a picture string converted from the non-interlaced picture by the so-called telecine operation by interlaced pictures is processed such as by editing, the encoding efficiency tends to be lowered. That is, if video signals, containing irregular 2:2 pull-down patterns due to subsequent processing such as field editing, are supplied from the VTR 151, the frame entering the encoder 153 is not necessarily the non-interlaced frame, so that, with the conventional encoder, the frame encoding efficiency is undesirably lowered. This will be explained by referring to FIGS. 2 and 3.

In FIG. 2A, non-interlaced pictures NF, such as picture frames of a motion picture, are converted by 2:2 pull-down of the tele-cine processing into interlaced pictures of, for example, the so-called PAL system. The sequence of the non-interlaced film pictures shown in FIG. 2A is converted by so-called telecine operations into a sequence of interlaced pictures of which each frame begins with a first field (top_field), as shown in FIG. 2B. That is, the sequence shown in FIG. 2B is a sequence of frames CF each made up of the first field Ft and a second field Fb in this order. Conversely, the sequence of the non-interlaced picture NF of FIG. 2C is converted into a sequence of interlaced pictures of which each frame begins with a second field (bottom field), as shown in FIG. 2C. That is, the sequence shown in FIG. 2D is a sequence of frames CF each made up of the second field Fb and the first field Ft in this order.

If these sequences are combined together at edit points $T_{E1}$, $T_{E2}$, as shown, there is produced an irregular sequence which disrupts paired fields corresponding to the sequence of the non-interlaced pictures NF in the original picture, as shown in FIG. 2E. In the example shown in FIG. 2E, a lone field $F_x$ is produced directly at back of the edit point $T_E$.

The sequence shown in FIG. 2E adversely affects the picture encoding efficiency, as now explained by referring to FIG. 3.

The irregular sequence shown in FIG. 2E is encoded during encoding as frames of combined rectangular frames CP as shown in FIG. 3A. If the frame encoded corresponds to the combination $CP_1$ constituting the non-interlaced frame of the combination $CP_1$ of the original picture, the encoding efficiency is high, as shown in FIG. 3B. Conversely, with the combination $CP_2$ other than the correct combination of the non-interlaced picture NF, the picture contains strong high-frequency components in its edge portion, as shown in FIG. 3C, despite the fact that the original picture is the non-interlaced picture, thus lowering the encoding efficiency. In FIGS. 3B and 3C, the encoding efficiency is lowered in the case of a picture representing a true circle shifted transversely in the transverse direction.

As a technique for efficiently encoding a picture produced by tele-cine processing as described above, there has hitherto been proposed a method consisting of removing repeated fields from the 2:3 pulled down pictures and subsequently constructing the frames so that the input frames will become non-interlaced frames. However, the lone field not constituting the non-interlaced frame, produced by the irregular 2:2 pull-down as described above, is different from the iterative frame produced by 2:3 pull-down, and hence this technique cannot be empty solving the problem.

OBJECTS AND SUMMARY OF THE INVENTION

In view of the foregoing, the present invention achieves high efficiency picture encoding even in cases wherein moving pictures to be encoded suffer from irregular periods of the paired fields constituting the non-interlaced frames or contain lone frames not constituting the non-interlaced frame, as a result of processing, such as field editing, of the sequence of the non-interlaced frames. Thus it is an object of the present invention to provide a picture encoding method and apparatus whereby highly efficient encoding may be achieved even if irregular patterns are produced by editing the string of interlaced pictures.

It is another object of the present invention to provide a signal recording medium having recorded thereon signals thus encoded and a picture decoding method and apparatus whereby the encoded signals may be decoded efficiently.

According to the present invention, a lone field not constituting a non-interlaced picture in an input picture signal is detected and removed from the input picture signal. A picture string of the input picture signals is constituted from a field sequence freed of the lone field and encoded.

According to the present invention, when a first field sequence obtained on converting a non-interlaced picture in the input picture signals into two fields beginning from a first field of an interlaced picture and a second field sequence obtained on converting a non-interlaced picture in the input picture signals into two fields beginning from a second field of the interlaced picture are coupled together by editing, it is detected from the input picture signals from which of the first field or the second field begins the set of field pictures corresponding to one of the non-interlaced pictures, and the picture string of the input picture signals is re-constructed into a non-interlaced picture string based upon the results of detection.

The detection as to from which of the first field or the second field begins the set of field pictures may be achieved by comparing the field correlation of two sets of field pictures having a pre-set field as a reference field and by judging a set having a stronger correlation as being a field pair corresponding to a regular non-interlaced picture. In this case, the correlation of the paired fields is preferably found on the basis of the correlation between an i'th line of the first field and the i'th line of the second field or from the correlation between the j'th line of the second field ad the j+1st filed of the first field for detecting the lone field on the basis of the correlation. Also the current field is preferably checked as to whether it is the lone field on the basis of the correlation over plural fields, that is past and future fields with respect to the current field.

Responsive to the detection output, a flag indicating whether the set of two field pictures corresponding to the non-interlaced picture of the picture string of the input picture signal begins with the first field or with the second field and is outputted for controlling the encoding.

By detecting whether a set of two field pictures corresponding to a non-interlaced picture begins with the first field or with the second field, and re-constructing the set of field pictures during encoding based upon the results of detection, encoding may be achieved in which the set of two field pictures corresponding to the original non-interlaced picture corresponds to a frame for encoding.

BRIEF DESCRIPTION OF THE DRAWINGS

FIGS. 2A, 2B, 2C, 2D and 2E illustrate generation of an irregular sequence due to editing of two series of non-interlaced pictures.

FIGS. 3A, 3B and 3C illustrate the lowering of the encoding efficiency by an irregular sequence pattern.

FIG. 6 illustrates signals and flags at various points contained in a future sequence with respect to a lone field which is the first field.

FIG. 7 illustrates signals and flags at various points contained in a past sequence with respect to a lone field which is the second field.

FIG. 8 illustrates signals and flags at various points contained in a future sequence with respect to a lone field which is the second field.

FIG. 9 illustrates signals and flags at various points contained in a past sequence with respect to a lone field which is the second field.

FIG. 13 illustrates an illustrative example of an algorithm for detecting the combination corresponding to the correct non-interlaced picture.

FIG. 15 shows an example of re-constitution of an input frame for detection, removal and input of a lone field by the construction of FIG. 9.

FIG. 16 shows another example of re-constitution of an input frame for detection, removal and input of a lone field by the construction of FIG. 9.

FIG. 17 illustrates an example of an algorithm for judging the combination of two fields making up a non-interlaced frame.

FIGS. 27A and 27B illustrate signals and flags in various portions contained in a future sequence with respect to the lone field which is the first field.

FIGS. 28A and 28B illustrate signals and flags in various portions contained in a past sequence with respect to the lone field which is the first field.

FIG. 29 illustrates signals and flags n various portions in case a flag specifying removal of a lone field is 1 in a further embodiment of the invention.

FIG. 31 shows an example of re-constitution of an input frame for detection, removal and input of a lone field.

FIG. 32 shows another example of re-constitution of an input frame for detection, removal and input of a lone field.

FIG. 33 illustrates another example of an algorithm for judging the combination of two fields making up a non-interlaced frame.

FIG. 35 illustrates a picture output signal and a flag associated with the encoding bit stream shown in connection with FIG. 3.

FIG. 36 illustrates a picture output signal and a flag associated with the encoding bit stream shown in connection with FIG. 4.

FIG. 37 illustrates a picture output signal and a flag associated with the encoding bit stream shown in connection with FIG. 5.

FIG. 38 illustrates a picture output signal and a flag associated with the encoding bit stream shown in connection with FIG. 6.

FIGS. 40A and 40B illustrate the principle of high-efficiency encoding.

FIGS. 41A and 41B illustrate picture types for compressing picture data.

DETAILED DESCRIPTION OF THE PREFERRED EMBODIMENTS

Figure 1:
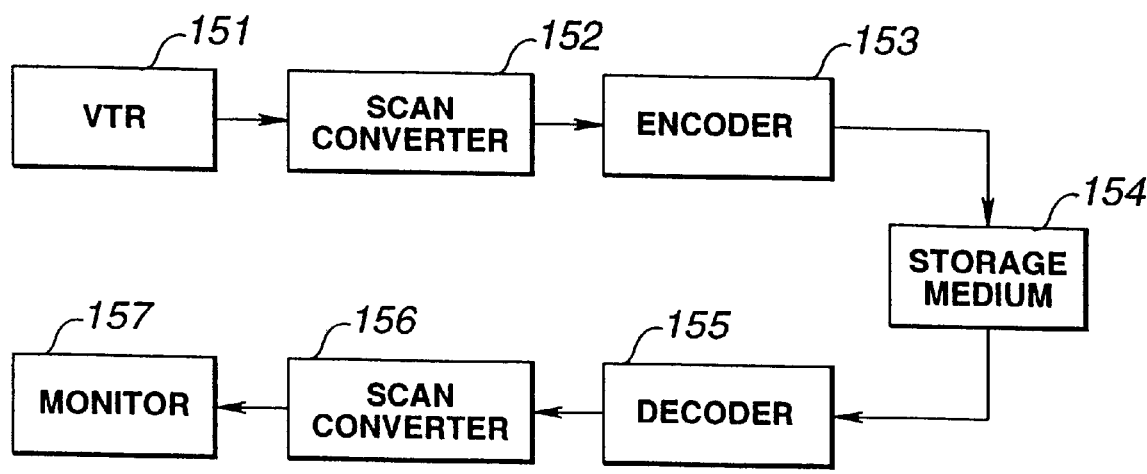
FIG. 1 is a schematic block diagram showing an arrangement of a conventional moving picture encoding/decoding system.

Referring to the drawings, preferred embodiments of the present invention will be explained in detail.

Figure 4:
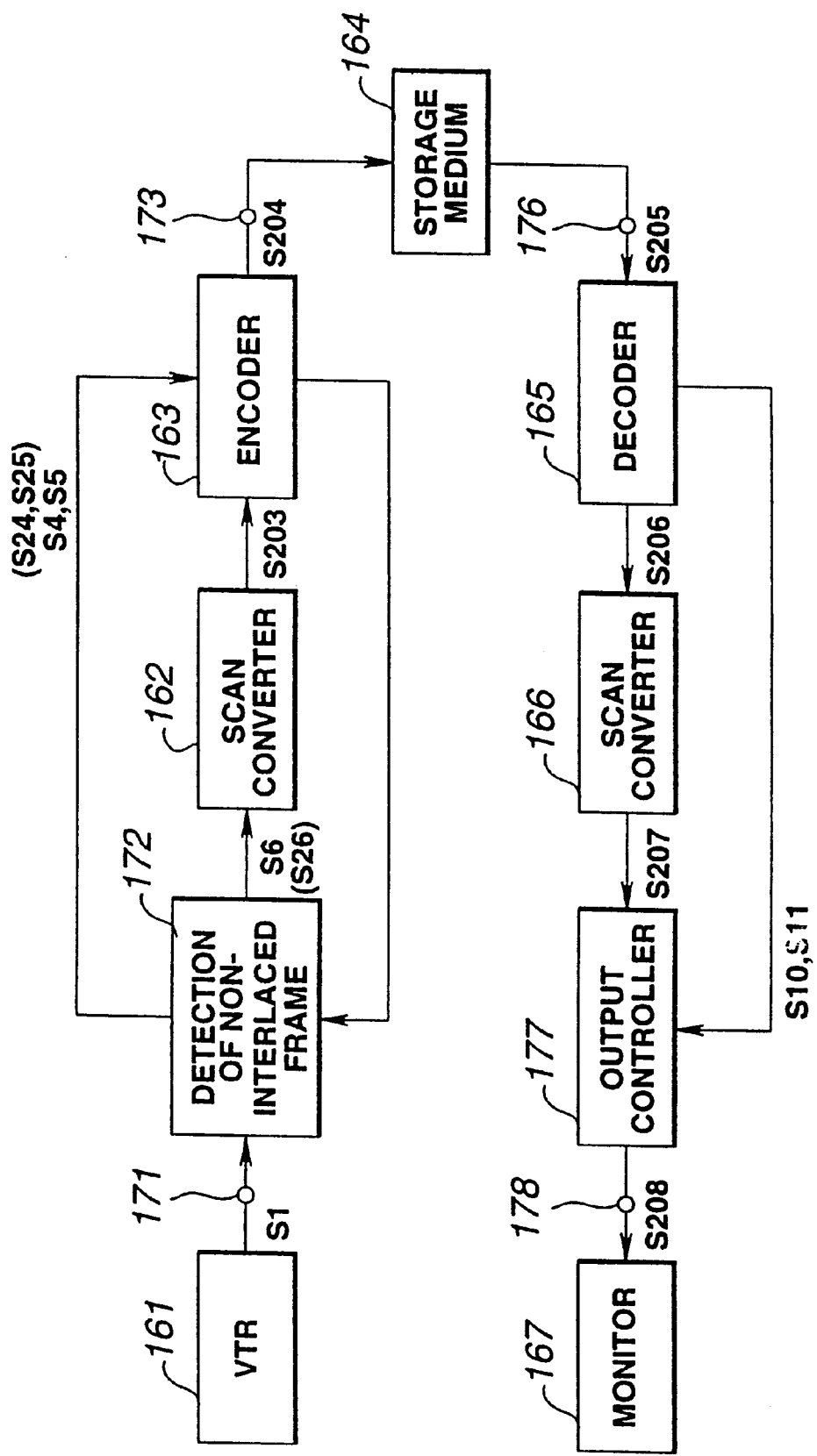
FIG. 4 is a schematic block diagram showing an encoding/decoding apparatus for moving picture signals for illustrating an embodiment of the present invention.

FIG. 4 schematically illustrates an arrangement of a picture signal encoding and decoding system for picture signals embodying the present invention.

In this figure, an input moving picture signal S1 is supplied from, for example, a video tape recorder (VTR) 161, to an input terminal 171. This input moving picture signal S1 is a signal of moving pictures containing lone fields which do not constitute a non-interlaced frame or which are irregular in the period of paired fields of the non-interlaced frame because of processing, such as field editing, performed on the non-interlaced frame sequence (FIG. 2).

The input moving picture signal S1 is supplied to a non-interlaced frame detection circuit 172. The non-interlaced frame detection circuit 172 detects the combination of the first and second fields making up the non-interlaced frame or detects a lone field not constituting the non-interlaced frame. The lone field thus detected is controlled so as not to be encoded by a downstream side encoder 163. This may be achieved by removing the lone field from the input moving picture signal S1 by the non-interlaced frame detection circuit 172, as will be explained subsequently.

The non-interlaced frame detection circuit 172 outputs a field signal S6 which is converted by a scan converter 162 in the input sequence into a frame picture to produce frame signals which are provided to an encoder 163 which will be explained later in detail. An encoded bitstream signal S204 from the encoder 163 is taken out at an output terminal 173 so as to be provided to and stored in, for example, a storage medium 164.

An encoded bitstream signal from, for example, the storage medium 164, is provided to an input terminal 176 of the decoding apparatus and thence to a decoder 165 so as to be decoded into a frame signal 206. This frame signal 206 is provided to a scan converter 166 for being converted into a field signal S207 which is provided to an output controller 177 where it becomes an output moving picture signal S208. This output moving picture signal S208 is taken out at an output terminal 178 so as to be displayed on a monitor 167. These components will be explained in detail subsequently.

The configuration of the non-interlaced frame detection circuit 172 of FIG. 4, configured for detecting a lone field and subsequently removing the detected lone field, will be explained by referring to FIG. 5.

Figure 5:
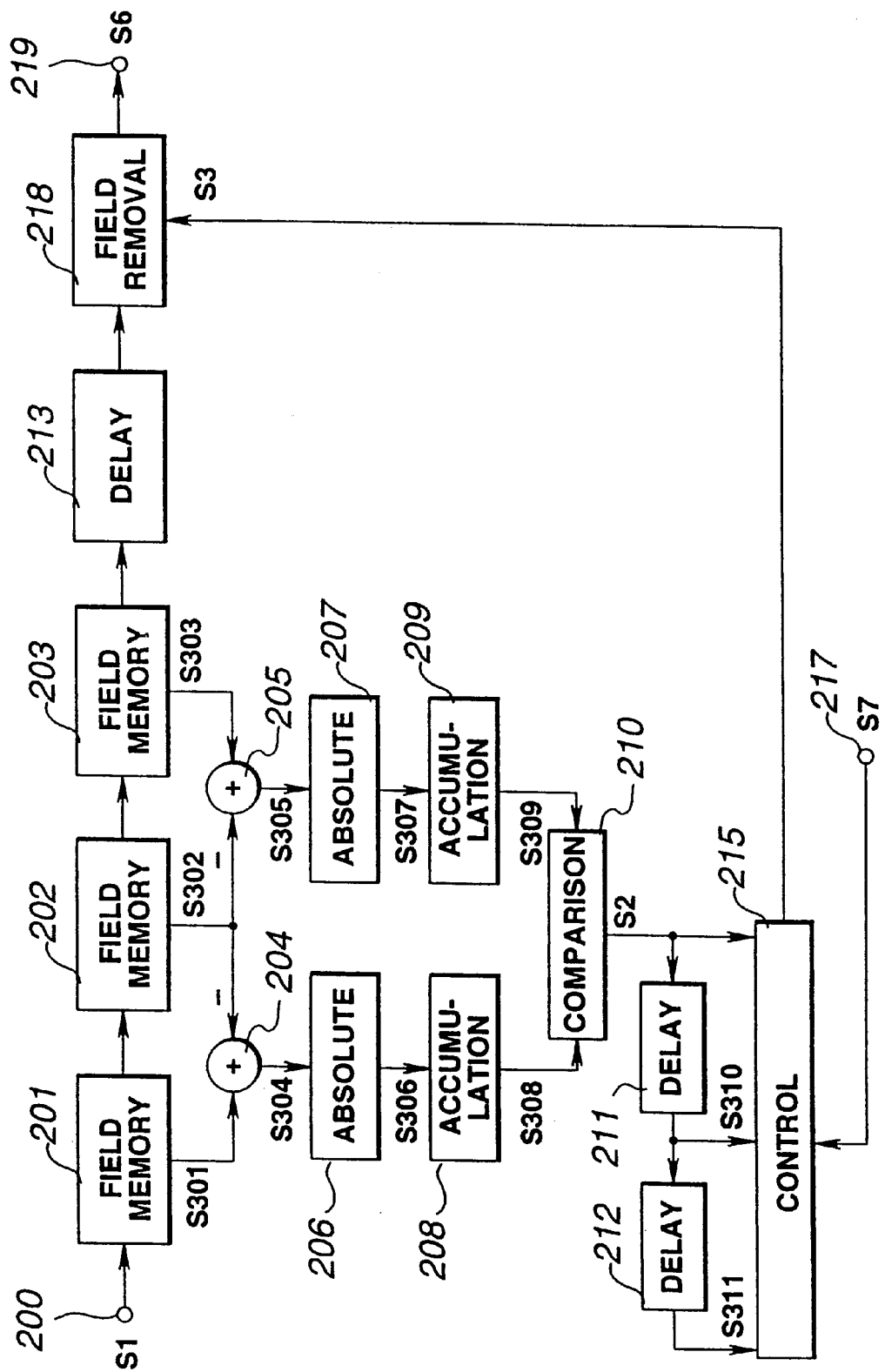
FIG. 5 is a block diagram showing an illustrative example of detection and removal of lone fields not constituting a non-interlaced picture.

To an input terminal 200 of FIG. 5 is supplied the input moving picture signal S1 of FIG. 4 so as to be sequentially stored in field memories 201 to 203. Thus, when the current field is stored in the memory 202, a past field and a future field are stored in the memories 201, 203, respectively. An adder 204 calculates the pixel-by-pixel difference between the past field signal S301 and the current field signal S302 to find a difference signal S304. The absolute value of the difference value signal S304 is found by an absolute value circuit 206 and a field-based sum of the absolute values of each field is calculated by a sum circuit 208. Similarly, an adder 205 finds a difference value between the future field signal S303 and the current field signal S302 on the pixel basis to find a difference signal S305. The absolute value of the difference value signal S305 is found by an absolute value circuit 207 and a field-based sum of the absolute values of each field are calculated by a sum circuit 209. The sum signals S308 and S309 are entered to a comparator 201 which compares the magnitudes of the signals S308, S309 to each other and outputs the result to a flag S2. The value of the flag S2 is S2=1 for S308≧S309 and S2=0 for S308<S309.

If S2 is equal to 1, it indicates that the current field is correlated more strongly with the future field, whereas, if S2 is equal to 0, it specifies that the current field is correlated more strongly with the past field. The values of S2 up to past two fields are stored in delay circuits 211 and 212.

FIGS. 6 to 9 show an example of calculations of the flag S2 for an actual input moving picture signal S1. In FIGS. 8 and 9, upper case letters and lower case letters specify the first field (top_field) and the second field (bottom_field), respectively. A non-interlaced frame is constituted by the same upper and lower case letters. The symbol "?" stands for a lone field not constituting a non-interlaced frame. It is seen from FIGS. 6 to 9 that, if a non-interlaced frame is converted into two fields beginning from the first field (top_field) of an interlaced frame, such as shown at |A a| in FIG. 6, the first field (top field) is correlated more strongly with the future second field (bottom_field), so that the flag S2 is 1. On the other hand, the second field (bottom_field) is correlated more strongly with the past first field (top_field), so that the flag S2 is 0. If a non-interlaced frame is converted into two fields beginning from the second field (bottom_field) of an interlaced frame, such as shown at d|D in FIG. 6, the second field (bottom_field) is correlated more strongly with the future first field (top field), so that the flag S2 is 1. On the other hand, the first field (top_field) is correlated more strongly with the past second field (bottom_field), so that the flag S2 is 0.

The flag S2 at a lone field "?" is explained. Since the lone field in FIGS. 6 and 8 is contained in some future sequence, the flag S2 is set to 1, whereas, in FIGS. 7 and 9, the lone field is contained in some past sequence, so that the flag S2 is set to 0.

The lone field is detected by a control circuit 215 shown in FIG. 5 based upon the flag S2. The detected lone field is removed by a field removing unit 218 from the input moving picture signal S1.

Figure 10:
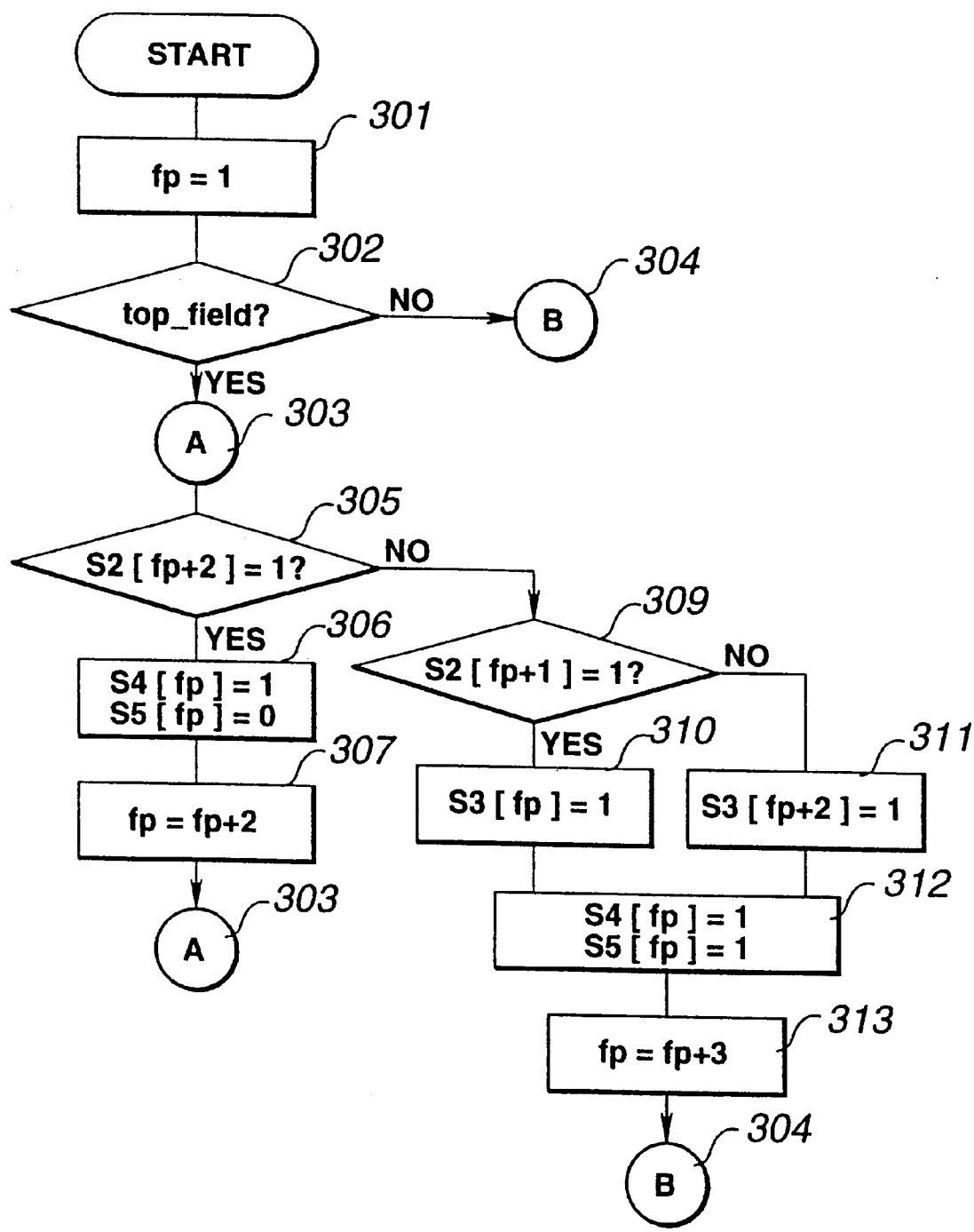
FIG. 10 is a flowchart for illustrating the operation of detection and removal of the lone field with an illustrative embodiment of the present invention.
Figure 11:
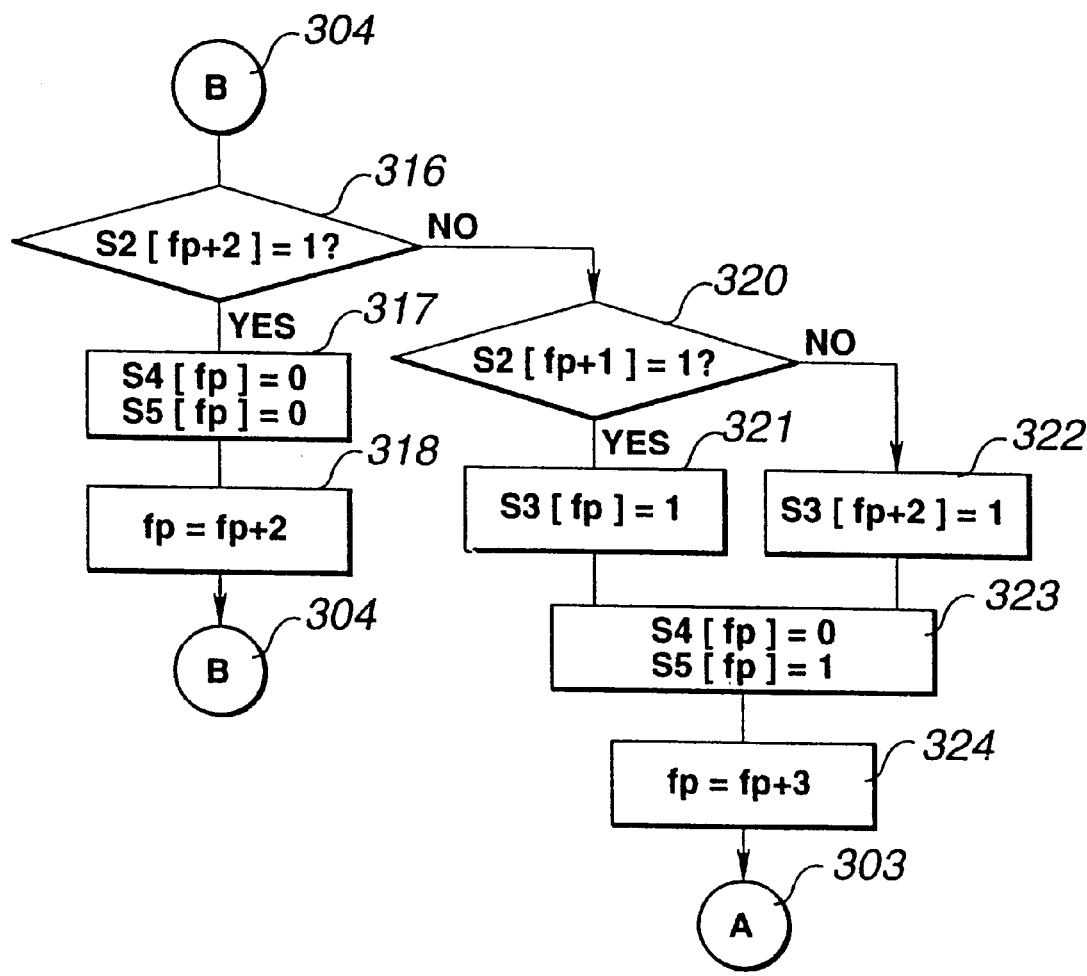
FIG. 11 is a flowchart which is a continuation of the flowchart of FIG. 7.

The flowchart of the algorithm is shown in FIGS. 10 and 11, where fp represents the field time as from the inputting of the field of the input moving picture signal and incrementation of the field time fp denotes that the time of the signal S1 advances towards future. For example, fp=fp+2 denotes that the time of the signal S1 has advanced two fields towards future, that is that the inputting of S1 is advanced by two fields. The suffixes such as [fp] to S2 denote the field time.

A signal S3 becomes 1 at a field time when a lone field not constituting the non-interlaced frame is detected.

The parity of the current field at time fp is reflected in a signal S4, which becomes 1 and 0 for the first field (top field) and for the second field (bottom_field), respectively.

A signal S5 is a flag specifying that a field has been removed since time fp until two fields on the future side of the time fp. The lone field detected at S3 is removed.

The signal S5 may be thought of as a flag specifying which of proximate two past fields or proximate two future fields are correlated more strongly with the removed field. The signal S5 is 1 for the two field showing stronger correlation. The two past and future fields neighboring to the removed field constitute encoded frames.

The signal S4 may be thought of as a flag specifying which of the first field (top_field) or the second field (bottom field) of the encoded frame is to be displayed first when decoding and reproducing the encoded frame.

Referring to the flow chart of FIGS. 10 and 11, the operation of the lone field detection is explained.

At a first step 301 of FIG. 10, the field time fp of the signal S1 is set to 1 (fp=1).

At step 302, the parity of the field of time fp discriminates whether or not the field is the first field (top field). If the result of detection at step 302 is YES, that is if the parity of the field is top_field, processing transfers to step 305 via node 303. If the result is NO, processing transfers to step 316 via node 304.

At a step 305, it is discriminated whether or not the flag S2 [fp+2] two fields towards future is 1. If the result is YES, the processing transfers to step 306 and, if otherwise, to step 309.

At step 306, the signal S4 [fp] and the signal S5 [fp] are set to 1 and 0, respectively (S4[fp]=1 and S5[fp]=0).

At step 307, the time of the signal S1 is advanced two fields (fp=fp+2), after which processing reverts to step 305 via node 303.

At a step 309, it is discriminated whether or not the flag S2 [fp+1] one field towards future is 1. If the result is YES, the processing transfers to step 310 and, if otherwise, to step 311.

At step 310, the field of time fp is a lone field not constituting a non-interlaced frame. The flag S3[fp] is 1 and the field of time fp is removed from the signal S1.

At step S311, the field of time fp+2 is a lone field not constituting a non-interlaced frame. The flag S3[fp+2] is 1 and the field of time (fp+2) is removed from the signal S1.

At step 312, next to the steps 310 and 311, the flag S4[fp] and flag S5[fp] are set to 1 (S4 [fp]=1, S5 [fp]=1).

At step 313, the time of S1 is advanced three fields (fp=fp+3). Processing then reverts to step 316 of Fig. 8 via node 304.

At step 316, it is judged whether or not the flag S2 [fp+2] for two field towards future is 1. If the result is YES, processing transfers to step 317 and, if otherwise, to step 320.

At step 317, the flag S4 [fp] is set to 0, while the flag S5 [fp] is set to 0 (S4 [fp]=0, S5 [fp]=0).

At step 320, it is judged whether or not the signal S2 [fp+1] one field towards future is 1. If the result is YES, the processing transfers to step 321 and, if otherwise, to step 322.

At step 321, the field of time fp is a lone field not constituting a non-interlaced frame. The flag S3[fp] is 1 and the field of time fp is removed from the signal S1.

At step 322, the field of time fp+2 is a lone field not constituting a non-interlaced frame. The flag S3[fp+2] is 1 and the field of time (fp+2) is removed from the signal S1.

At step 323, next to the steps 321 and 322, the flag S4[fp] and flag S5[fp] are set to 1 (S4 [fp]=0, S5 [fp]=1).

At step 324, the time of S1 is advanced three fields (fp=fp+3). Processing then reverts to step 305 of FIG. 10 via node 303.

In this manner, the lone fields not constituting the non-interlaced frames are detected and removed.

In FIGS. 6 to 9, examples of the flags S3 to S5 and the field signal S6 from the lone field detection and removal circuit 172 are also shown in addition to the flag S2.

Figure 12:
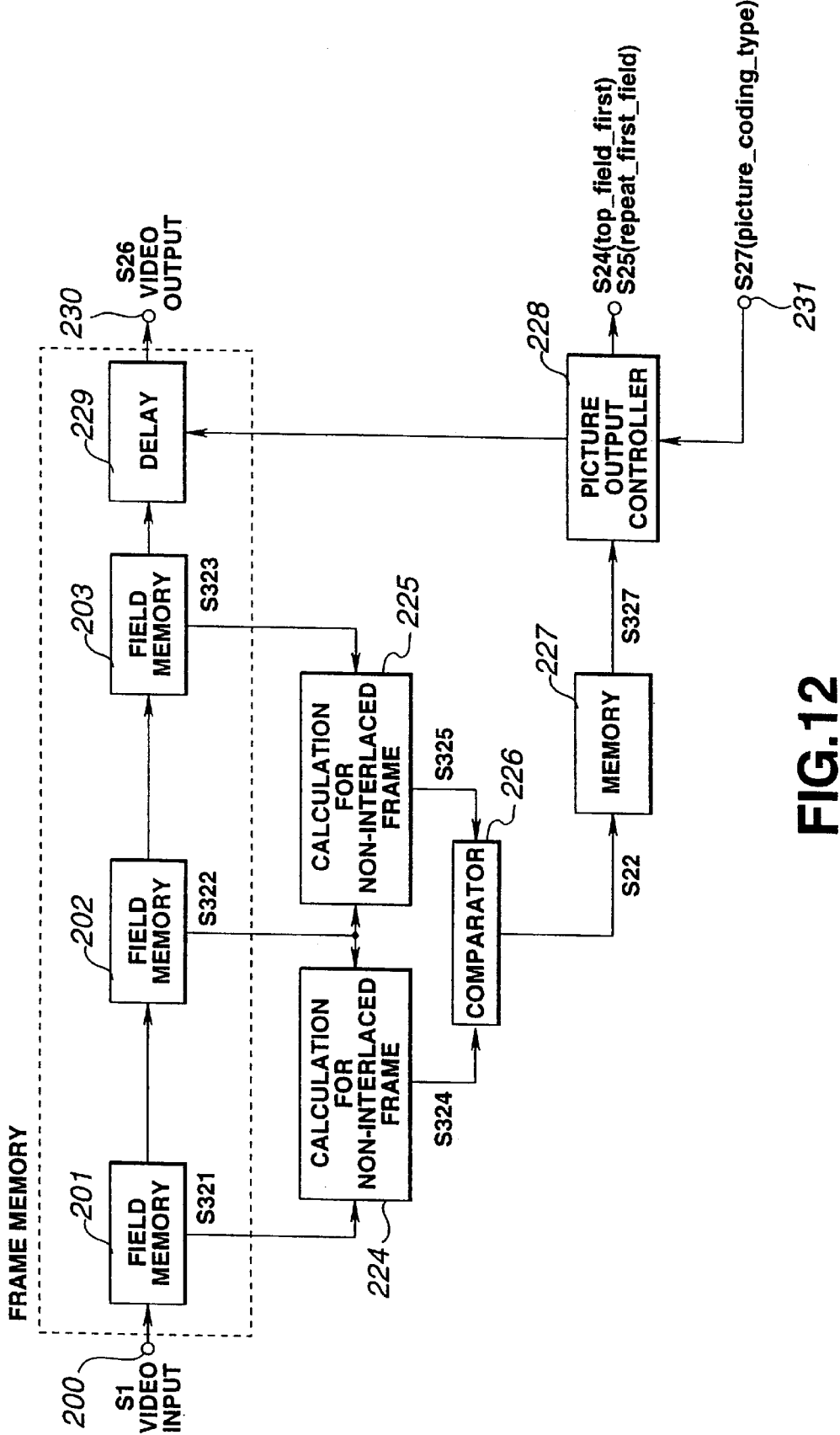
FIG. 12 is a block diagram showing another illustrative embodiment of a circuit for detection and removal of a lone field not constituting a non-interlaced picture.

Referring to FIG. 12, a modified circuit of the non-interlaced frame detection circuit 172 is explained. In FIG. 12, the parts corresponding to those shown in FIG. 5 are denoted by the same reference numerals.

To an input terminal 200 of FIG. 12 is supplied the input moving picture signal S1 of FIG. 4. This signal S1 is sequentially stored in field memories 201 to 203. Thus, if the current field, such as the n'th field, is stored in the memory 202, the (n−1)st field, which is a past field, and a (n+1)st field, which is a future field, are stored in the memories 201 and 203, respectively.

The non-interlaced frame calculating circuit 224 performs calculations as to whether or not the (n−1)st field S321 and the n'th field S322 represent the combination of the non-interlaced frame, and outputs the results of calculations S324 to a comparator 226. The non-interlaced frame calculating circuit 225 performs calculations as to whether or not the n'th field S322 and the (n+1)st field S323 represent the combination of the non-interlaced frame, and outputs the results of calculations S325 to the comparator 226.

The algorithm for calculating whether or not two given fields represent the combination of the non-interlaced frames by these non-interlaced frame calculating circuits 224, 225 is explained by referring to FIG. 13, in which the algorithm is represented by the so-called C-language.

Referring to FIG. 13, "F(pixel, line)" represents the value of the pixel in a frame constituted by the (n−1)st field S321 and the n'th field S322 and the value of the pixel in a frame constituted by the n'th field S322 and the (n+1)st field S323 in the calculating circuits 224 and 225, respectively. "line" denotes the count value of the number of lines of a frame and is counted up to a maximum value "frame_vertical_size". The 0'th line, that is "line=0", and the first line, that is "line=1", represent the first field (top_field) and the second field (bottom_field), respectively. "pix" denotes the count value of the number of pixels on each line and is counted up to a maximum value of "frame_horizontal_size". The 0'th pixel, that is "pix=0", begins with the left-most pixel of each line.

The equation a in FIG. 13 calculates the line-to-line difference "dif1" for calculating the correlation between the i'th lines of the first and second fields. If each field is made up of N lines, i assumes part or all of values from 0 to (N−1). On the other hand, the equation b calculates the line-to-line difference "dif2" for calculating the correlation between the j'th line of the second field and the (j+1)st line of the first field. The value of j assumes part or all of the values from 0 to (N−1). The sum "var" of the absolute values of the line-to-line differences is calculated, as shown in the equation c.

By employing the equations a and b simultaneously, calculations may be carried out for checking if any given two fields represent the combination for the non-interlaced frame. The calculations for the square sum may be employed in place of those for the absolute values of the equation c.

Figure 14:
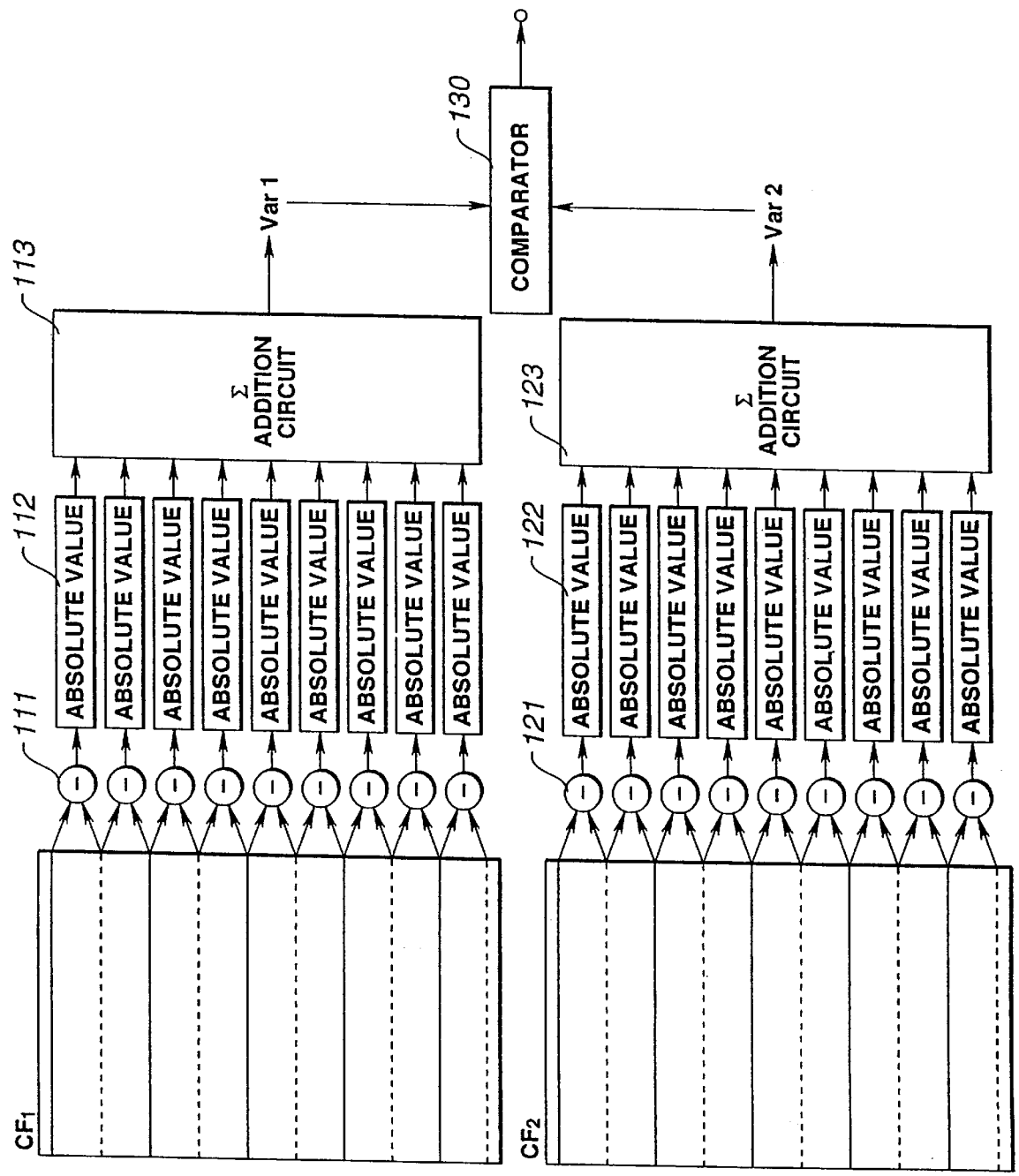
FIG. 14 is a block circuit diagram showing an illustrative example of a circuit for detecting the combination corresponding to the correct non-interlaced picture.

The algorithm of FIG. 13 may be represented by hardware shown in FIG. 14.

Referring to FIG. 14, the sums Var1, Var2 of absolute values of the differences between neighboring lines are calculated for field sets $CF_1$ and $CF_2$. That is, as for the field set $CF_1$, the differences between the data of respective lines of the first field shown by a solid line in FIG. 14 and the data of respective lines of the second field shown by a broken line and the differences between the data of respective lines of the second field and the data of respective lines of the first field are found by subtractors 111, the corresponding absolute values are found by an absolute value circuit 112 and the sum of the absolute values is found by an adder 113 for finding the sum Var1 of the absolute values of the differences between respective neighboring lines. As for the field set $CF_2$, the differences between the data of respective lines of the first field shown by a solid line in FIG. 14 and the data of respective lines of the second field shown by a broken line and the differences between the data of respective lines of the second field and the data of respective lines of the first field are found by subtractors 121. In addition, the corresponding absolute values are found by an absolute value circuit 122 and the sum of the absolute values is found by an adder 123 for finding the sum Var2 of the absolute values of the differences between respective neighboring lines. The sums of the absolute values Var1 and Var2 are compared to each other and the smaller sum value is judged to represent the paired fields corresponding to the correct non-interlaced frame. The reason for giving this judgment is that the paired fields of the correct non-interlaced frame suffers from the high frequency components near the edge to a lesser extent. The sum of the absolute values, employed herein, may be replaced by the square sum. That is, the absolute value circuits 112, 122 may be replaced by square circuits.

In the algorithm of FIG. 13, the signals S324 and S325 are outputted by the calculating circuits 224 and 225 as calculated values "var". The signals S324, S325 are provided to the comparator 226 where the magnitudes of the signals S324 and S325 are compared to each other to output a flag S22 for the result. The value of the flag S22 is assumed so that, for S324<S325, S22=0 and, for S324>S325, S22=1. On the other hand, if the flag S22 is "1", it specifies that the n'th field is the combination of the (n+1)st field and a non-interlaced frame. This algorithm takes advantage of the fact that, if any given two fields correspond to the combination for a non-interlaced frame, the line-to-line correlation between two fields is high so that the sum of the absolute values of the line-to-line differences becomes small.

FIGS. 15 and 16 show an example of calculations of the flag S22 for an actual input moving picture signal S1. In FIGS. 15 and 16, as in the above example shown in FIGS. 6 to 9, the upper case letters and lower case letters specify the first field (top field) and the second field (bottom_field), respectively. A non-interlaced frame is constituted by the same upper and lower case letters. The symbol "?" stands for a lone field not constituting a non-interlaced frame.

It is seen from FIGS. 15 and 16 that, if a non-interlaced frame is converted into two fields beginning from the first field (top_field) of an interlaced frame, such as shown at |A a| in FIG. 6, the first field (top_field) "A" is correlated more strongly with the future second field (bottom_field) "a", so that the flag S22 is 1. On the other hand, the second field (bottom_field) "a" is correlated more strongly with the past second field (bottom_field) "A", so that the flag S22 is 0. If a non-interlaced frame is converted into two fields beginning from the second field (bottom_field) of an interlaced frame, such as shown at d|D in FIG. 6, the second field (bottom_field) "d" is correlated more strongly with the future first field (top field) "D", so that the flag S22 is 1. On the other hand, the first field (top_field) "D" is correlated more strongly with the past second field (bottom_field) "d", so that the flag S22 is 0.

The reason the lone field "?" is produced is that field editing has previously been carried out on the non-interlaced frame sequence at each edit time point.

The flag S2 at a lone field "?" is explained. Since the lone field in FIG. 15 is contained in some future sequence, it has strong correlation with the future field, so that the flag S2 is set to 1. On the other hand, the lone field is contained in some past sequence, and hence has strong correlation with the past field, so that the flag S22 is set to 0.

Although judgment as to the combination of the non-interlaced frame is given on the basis of the flag S22 outputted from the comparator 226, there are occasions where an incorrect value of the flag S22 is outputted. Such incorrect judgment may be reduced by storing several values of the flag S22 time-sequentially in a memory or register 227 and by giving ultimate judgment as to the combination of the non-interlaced frame on the basis of a pattern of an array of plural values of the flag S22.

An illustrative example of a method for judging the combination of the non-interlaced frame from the flag S22 is shown in FIG. 17, in which the algorithm is shown by the so-called C-language representation.

In FIG. 17, n specifies the field time elapsed since the input of a field of the input moving picture signal S1, while S1[n] and S22[n] specify the flag S22 for S1[n]. If n is incremented, it specifies that the time of the signal S1 proceeds towards future. For example, n=n+2 specifies that the time of the signal S1 has proceeded two fields towards future, that is that the inputting of S1 has proceeded two fields.

In FIG. 17, the variable "isTop_field" reflects a parity of the field n=0 as an initial value. Since the field sequence of the input signal S1 shown in FIGS. 15 and 16 begins with top field, "isTop_field=1", as shown at the line 4 of FIG. 17. Since the parity at field time n is reflected in the variable top field_first(n), it is set to "1" or "0" for top_field or bottom_field, respectively. A variable repeat_first_field[n] is a flag specifying removal of the lone variable. The variable pattern[n] is used for controlling an output of a picture output controller 228 of FIG. 12.

If the AND condition from line 7 to line 10 of FIG. 17 is met, removal of the lone field is commanded, with repeat_first field[n] being 1. The variable top_first_field[n] is set in accordance with the value of "isTop_field". The next check is carried out three fields later, as n=n+3 at line 29 indicates. Thus the value of "isTop_field" is inverted so that it operates as a parity for the next check field, as line 18 and line 26 indicate.

If the above AND condition is not met, the previous state of the variable persists. The next check is performed two fields later, as line 39 indicates.

Figure 18:
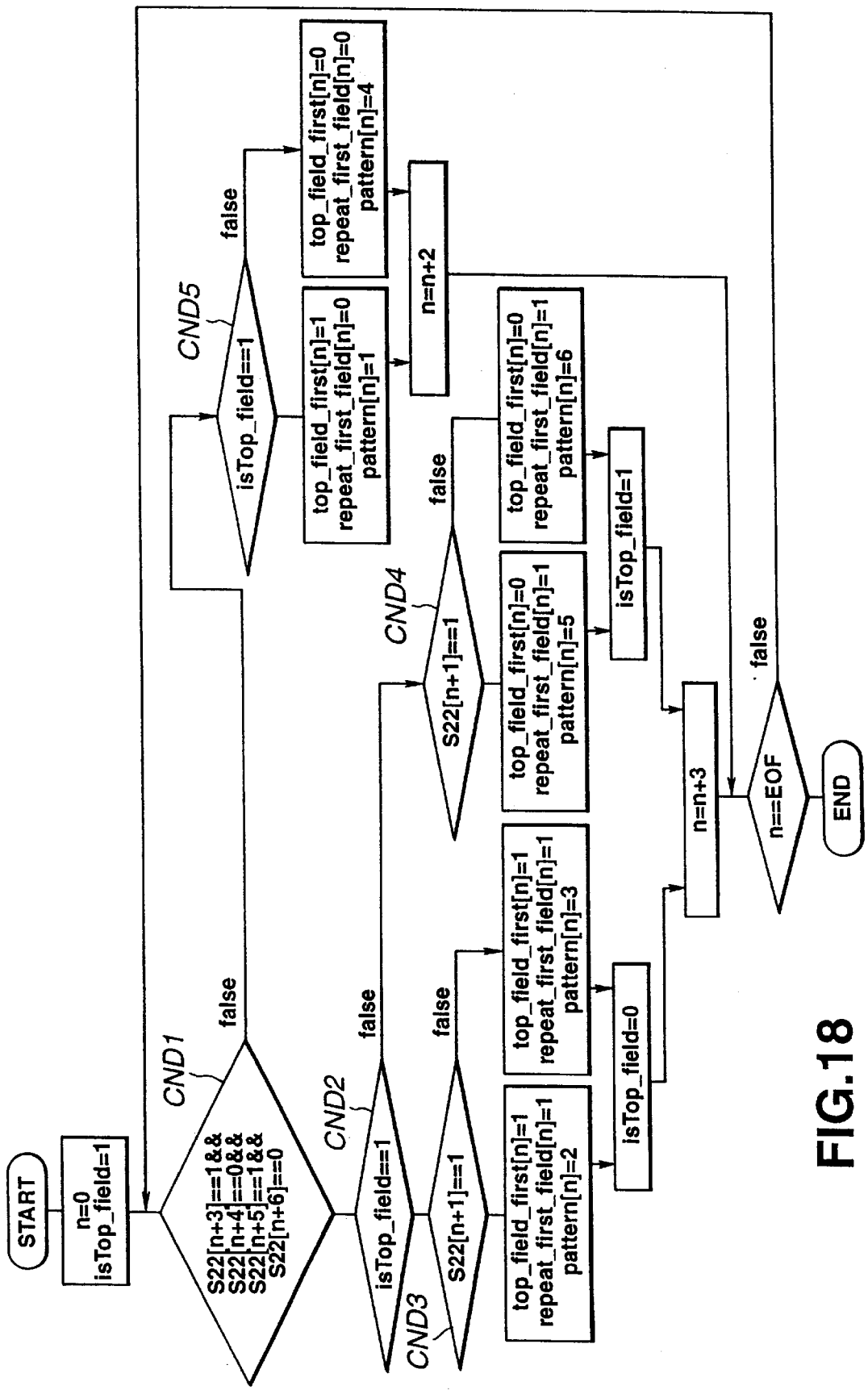
FIG. 18 is a flowchart for illustrating the processing sequence corresponding to the algorithm of FIG. 14.

FIG. 18 shows an algorithm corresponding to the algorithm of FIG. 17.

In FIG. 18, the conditions $CND_1$ to $CND_5$ of FIG. 17 correspond to respective decision steps $CND_1$ to $CND_5$ of FIG. 18. The remaining steps of FIG. 18 specify the setting of the variables n, "isTop_field", top_first_field[n], repeat_first_field[n] and pattern[n].

An example of finding top_first_field[n], repeat_first field[n] and pattern[n] for the input signal S1 shown in FIGS. 15 and 16 in accordance with the algorithm shown in FIGS. 15 and 16 is now explained. In FIGS. 15 and 16, S24 and S25 specify top first_field[n] and repeat_first_field[n], respectively.

The process in which a picture output controller 228 of FIG. 12 controls a picture output of a delay unit 229 to output a signal S26 is explained. The delay unit 229 is a memory for storing fields on the future side with respect to the (n+1)st field and is able to output a field picture with a specified delay from a picture output controller 228. In the example of FIGS. 15 and 16, a 7-field memory is required. A frame memory may be employed for constituting the delay unit 229 and the field memories 202 to 203.

The picture output S26 is outputted as shown in (1) to (6) below on the basis of a variable "pattern". Specified examples are shown in FIGS. 15 and 16.

(1) For pattern=1
Two fields of a field signal S104, delayed by four frames from S1, are outputted sequentially.
(2) For pattern=2
signal S103, delayed three frames from S1, is outputted. A signal S104 and two invalid fields |--| are then outputted in this order.
(3) For pattern=3
Two fields of the signal S104 and two invalid fields are outputted in this order.
(4) For pattern=4
A signal S104 is outputted, and a signal S105, delayed five frames from the signal S1, is then outputted.
(5) For pattern=5
Two fields of a signal S104 are outputted sequentially.
(6) For pattern=6
A signal S104 and a signal S105 are outputted sequentially.

The invalid field is such a field entered to the next stage encoder but not processed effectively. The invalid signal is specified by a symbol "-". In FIGS. 15 and 16, frame delay amounts of the output S26 relative to the input signal S1 are shown.

The example of FIGS. 15 and 16 indicate that, as compared to the input S1, the output S26 is freed of the lone field "?" while the first field and the second field making up a non-interlaced frame are changed to an interlaced frame in which the first field is entered first. By inserting the invalid frame, the frame period of S26 is locked with respect to the frame period of the input S1. Thus the downstream side encoder is able to be locked in operation with respect to the frame period of the input S1.

Referring again to FIG. 4, the field signal S26, outputted by the non-interlaced frame detection unit 172, is converted by the scan converter 162 in the input sequence into a frame picture. In the example of FIGS. 15 and 16, "|" of S26 stands for the frame boundary. Thus it is seen that a frame picture is constituted at an interval of two fields outputted based upon the above pattern.

The input frame S203, associated flags S24 (top_first field[n]) and (repeat_first_field[n]) and an invalid frame flag are entered to an encoder 163. The flags S24 (top_first field[n]) and (repeat_first_field[n]) can be encoded using flags of the same name as defined in MPEG2. The encoder does not effectively process an input frame for which an invalid frame flag has been set. The detailed structure of the encoder 163 will be explained subsequently.

An encoded bitstream S204 is supplied to the recording medium 164. In the above-described embodiment, the algorithm for judging the combination of the non-interlaced frame shown in FIG. 13 is constructed using a pattern of array of seven S22 signals S2[n]~S2[n+6]. However, a pattern of array of a larger number of signals S22 may be employed for further reducing the risk of giving mistaken judgment of the non-interlaced frames. Conversely, a pattern of array of a smaller number of signals S22 may be employed for reducing the frame delay amount of the output S26 at the cost of the increased possibility of giving mistaken judgment of the non-interlaced frames.

Figure 19:
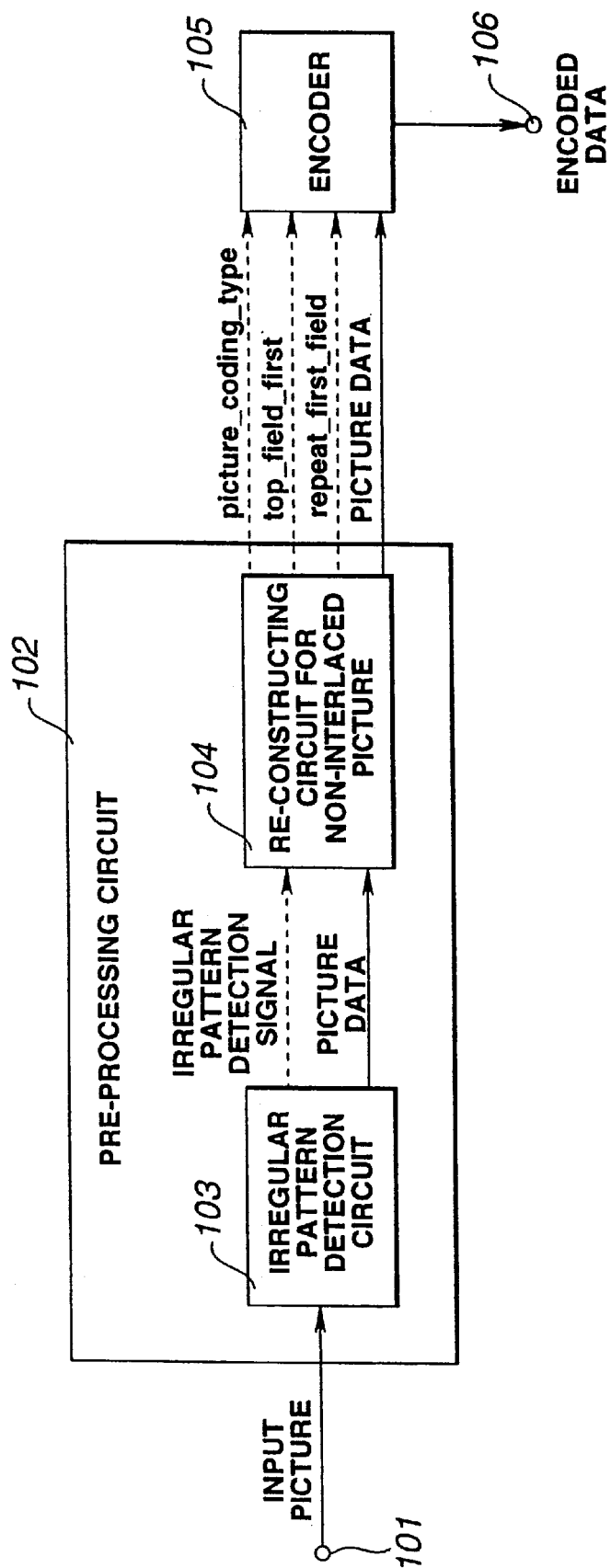
FIG. 19 is a schematic block diagram of a picture signal encoding apparatus according to the present invention.

Referring to FIG. 19, a modified embodiment of the picture signal encoding apparatus according to the present invention will be explained in detail.

To an input terminal 101 of FIG. 19 are entered, as an input picture signal, a picture string converted from the non-interlaced pictures NF into plural field sets each made up of two field pictures, that is frames CF, each beginning with the first field or top field Ft of an interlaced picture, as shown in FIG. 2B, and another picture string converted from the non-interlaced pictures NF into plural field sets each made up of two field pictures, that is frames CF, each beginning with the second field or bottom field Fb of an interlaced picture, as shown in FIG. 2B. These picture strings are linked to each other by editing as shown in FIG. 2D.

The input picture signal is provided to an irregular pattern detection circuit 103, as detection means for a pre-processing circuit 102, where it is judged whether two fields corresponding to one of the non-interlaced pictures begins with the first field or with the second field. The irregular pattern detection signal and picture data, as output signals of the irregular pattern detection circuit 103, are provided to a re-constructing circuit 104 for the non-interlaced picture as re-constructing means. This re-constructing circuit 104 reconstructs and outputs a non-interlaced picture depending upon whether paired field pictures corresponding to the non-interlaced pictures of the picture string of the input picture signals begin with the first field or with the second field.

An output signal of the re-constructing circuit 104 for the non-interlaced picture is provided as an output signal of the pre-processing circuit to an encoder 105. In the present modification, an encoder for performing compression encoding by exploiting line-to-line correlation or frame-to-frame correlation of picture signals is employed as the encoder 105, while three sorts of flags picture_coding_type, top_first_field[n] and repeat_first_field[n] as later explained are used, in addition to picture data, as a signal provided from the pre-processing unit 102 to the encoder 105. The encoder 105 generates encoded data in accordance with these flags and outputs the generated data at an output terminal 106. An illustrative example of the encoder 105 will be explained subsequently.

First, the manner of detecting paired fields or a frame constituting a correct non-interlaced picture by the irregular pattern detection circuit 103 as detection means of the pre-processing circuit 102 of FIG. 19, is explained.

Figure 20:
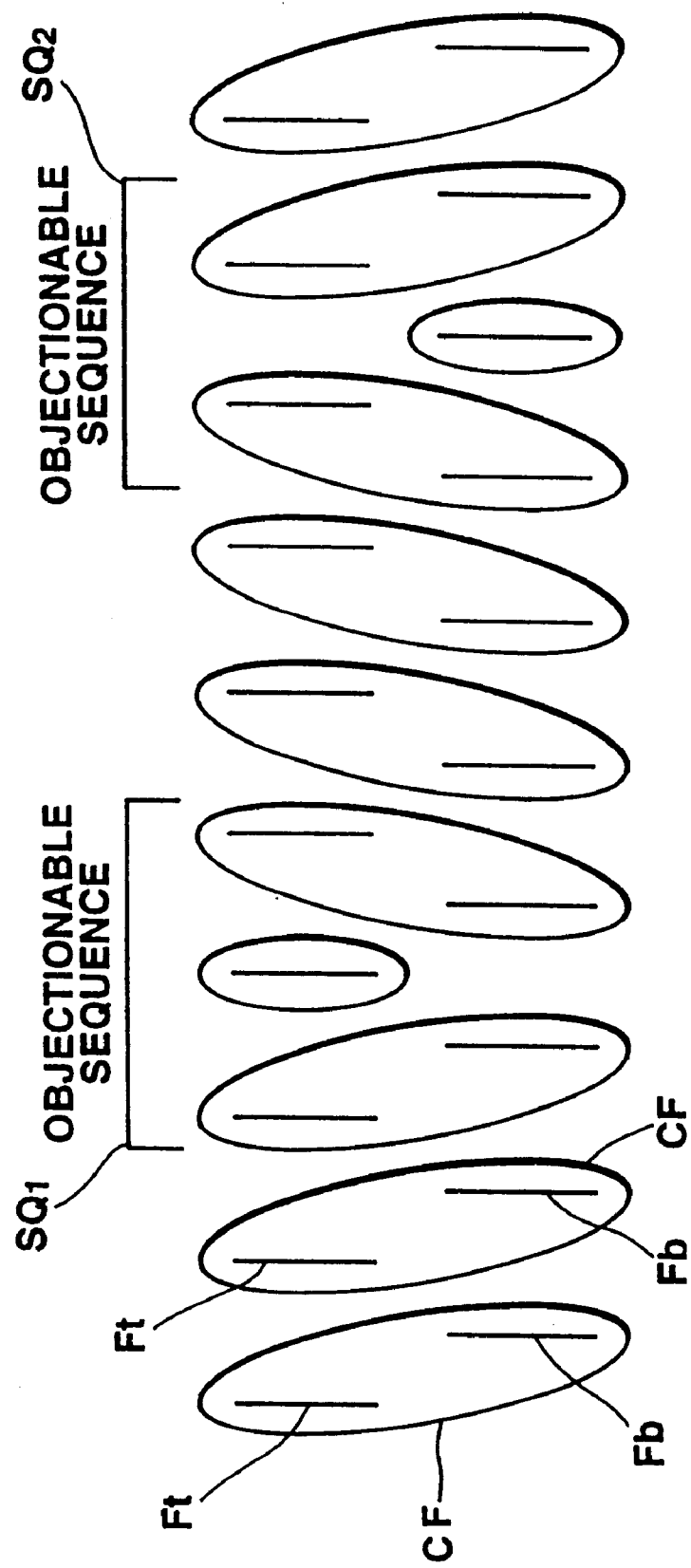
FIG. 20 illustrates an irregular pattern in which the combination of the sequences of non-interlaced pictures is disrupted.

FIG. 20 shows an irregular pattern in which the combination of sequences of non-interlaced pictures is disrupted. It is seen that objectionable sequences SQ1 or SQ2 are produced when a sequence of paired fields corresponding to a non-interlaced picture beginning from the first field Ft and a sequence of paired fields (frames) corresponding to a non-interlaced picture beginning from the second field Fb are linked together by editing.

Figure 21A:
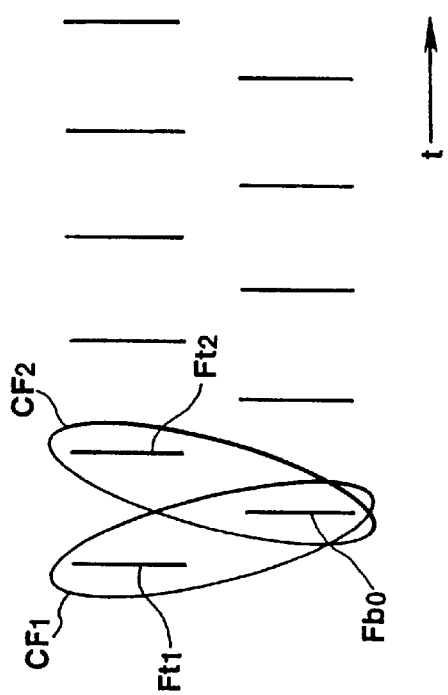
FIGS. 21A, 21B and 21C illustrate the operation of detecting regular patterns.
Figure 21C:
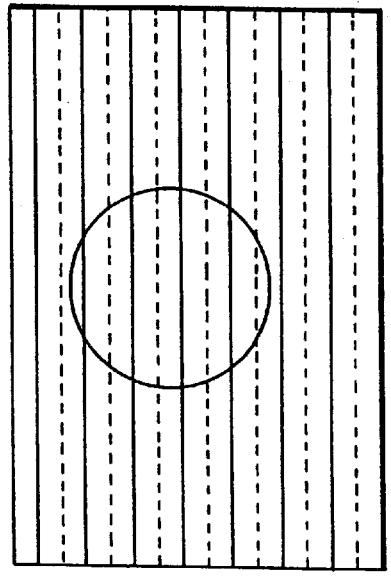
Figure 21B:
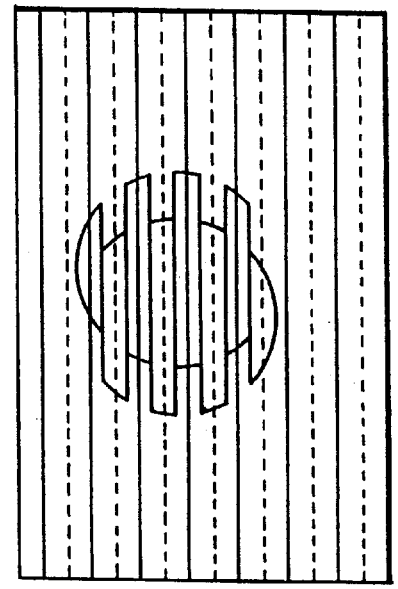

Thus, as shown in FIG. 21A, two sets of fields $CF_1$ and $CF_2$ containing a pre-set field, herein a second field $Fb_0$, are formed. One $CF_1$ of the fields, or a frame, is made up of a field pair of a first field $Ft_1$ and a second field $Fb_0$, arrayed in this order, while the other $CF_2$ of the fields, or a frame, is made up of a field pair of a second field $Fb_0$, and a first field $Ft_2$. One of these field sets $CF_1$ or $CF_2$ represents a combination corresponding to the correct non-interlaced frame, as indicated in FIGS. 21B or 21C.

For detecting the set of fields constituting a frame of a correct non-interlaced picture, a detection circuit shown for example in FIG. 14 may be employed.

The method for encoding an objectionable pattern following detection of an irregular pattern in case of disruption of the combination of the non-interlaced sequences is now explained.

Figure 22A:
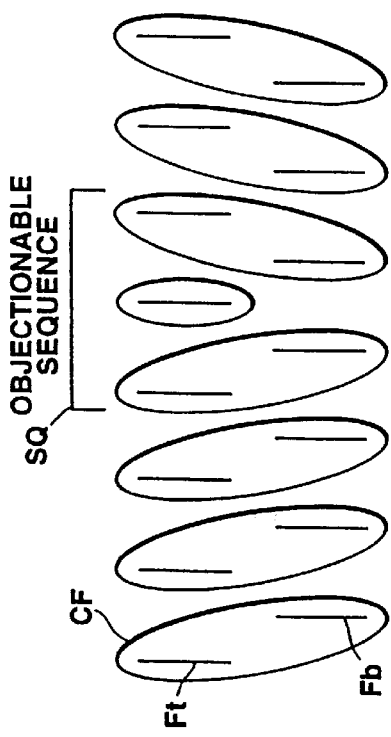
FIGS. 22A, 22B, 22C and 22D illustrate the encoding of objectionable patterns.
Figure 22B:
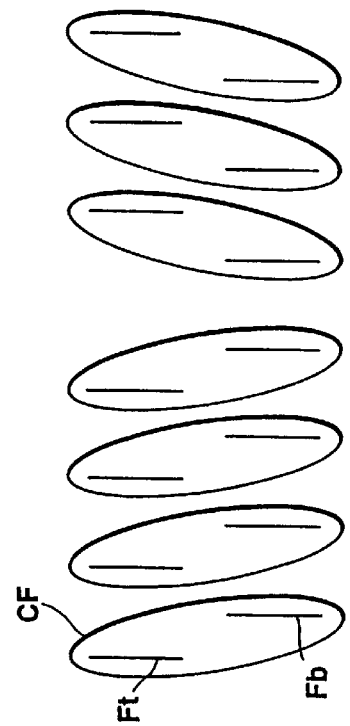

FIG. 22A shows an irregular pattern detected as described above, or the objectionable sequence SQ. What is objectionable in encoding the sequence is the lone field Fx shown in FIG. 22B. The lone field Fx is a field generated by editing and not having a counterpart in forming a non-interlaced frame. If encoding is to be made by exploiting e.g., frame correlation, this lone field Fx cannot be encoded. Thus, as shown in FIG. 22B, such lone field Fx is basically removed for interpolation using e.g., forward or backward side fields.

Figure 22C:
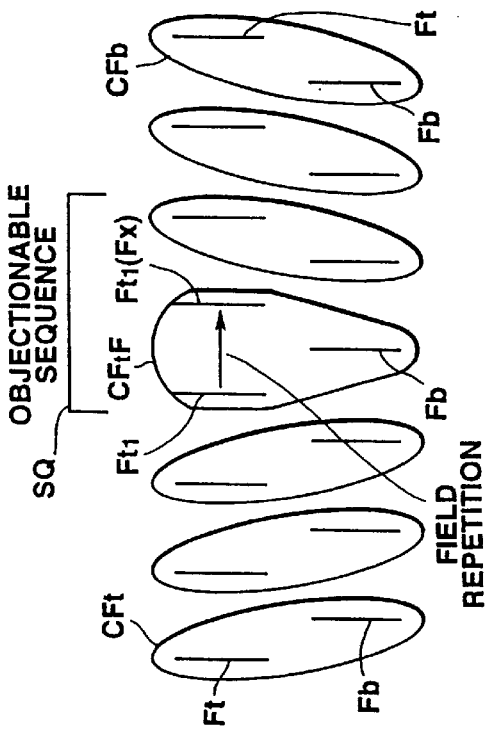
Figure 22D:
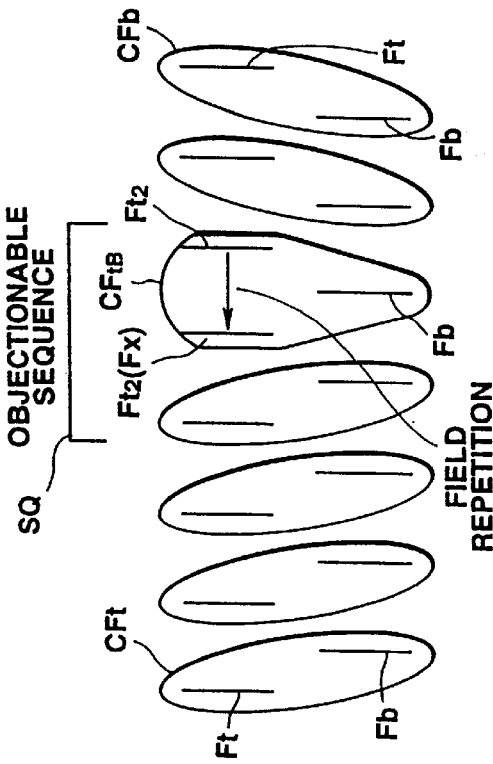

FIG. 22C shows a case in which such interpolation has been made by repeating a previous field $Ft_1$ in place of the removed lone field Fx. The set of field pictures, comprising such repetition of the previous frame $Ft_1$, is termed $CFt_F$. Such interpolation may also be made by repeating a succeeding field $Ft_2$ in place of the removed lone field Fx, as shown in FIG. 22D. The set of field pictures, comprising such repetition of the succeeding frame $Ft_2$, is termed $CFt_B$. Of the sets of paired fields corresponding to the non-interlaced picture, or frames being encoded, in FIGS. 22C and 22D, the set of field pictures beginning from the first field Ft and that beginning from the second field Fb are termed CFt and CFb, respectively.

Figure 23:
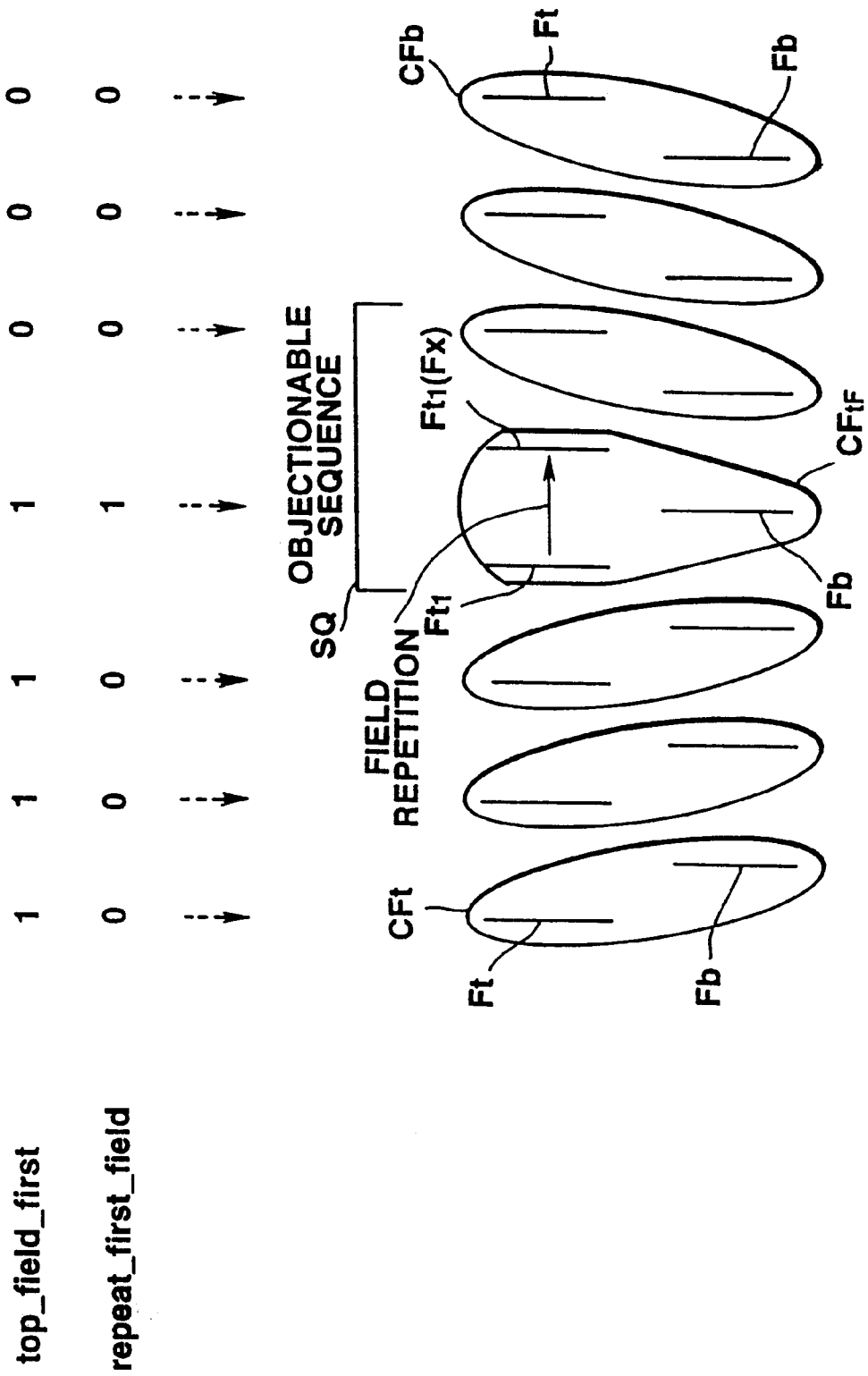
FIG. 23 illustrates an example of interpolating a lone field by iteration of a previous field.

FIG. 23 shows an example in which the pattern shown in FIG. 22C is processed with moving picture encoding using frame correlation as later explained. In this encoding, the sequence of the set of field pictures CF or frames corresponding to this non-interlaced picture can be encoded using the combination of two sorts of flags, namely the flags top_first_field[n] and repeat_first_field[n].

Of these, the flag top_first_field[n]is 1 or 0 when the set of field pictures or frame being encoded is the set $CF_t$ beginning from the first field Ft or that beginning from the second field Fb.

The repeat_first_field[n]is 1 or 0 when the first field of the set of field pictures or frame being encoded is or is not to be repeatedly displayed, respectively.

Thus the encoding is achieved by allocating numerical values shown in FIG. 23 to the flags.

Figure 24:
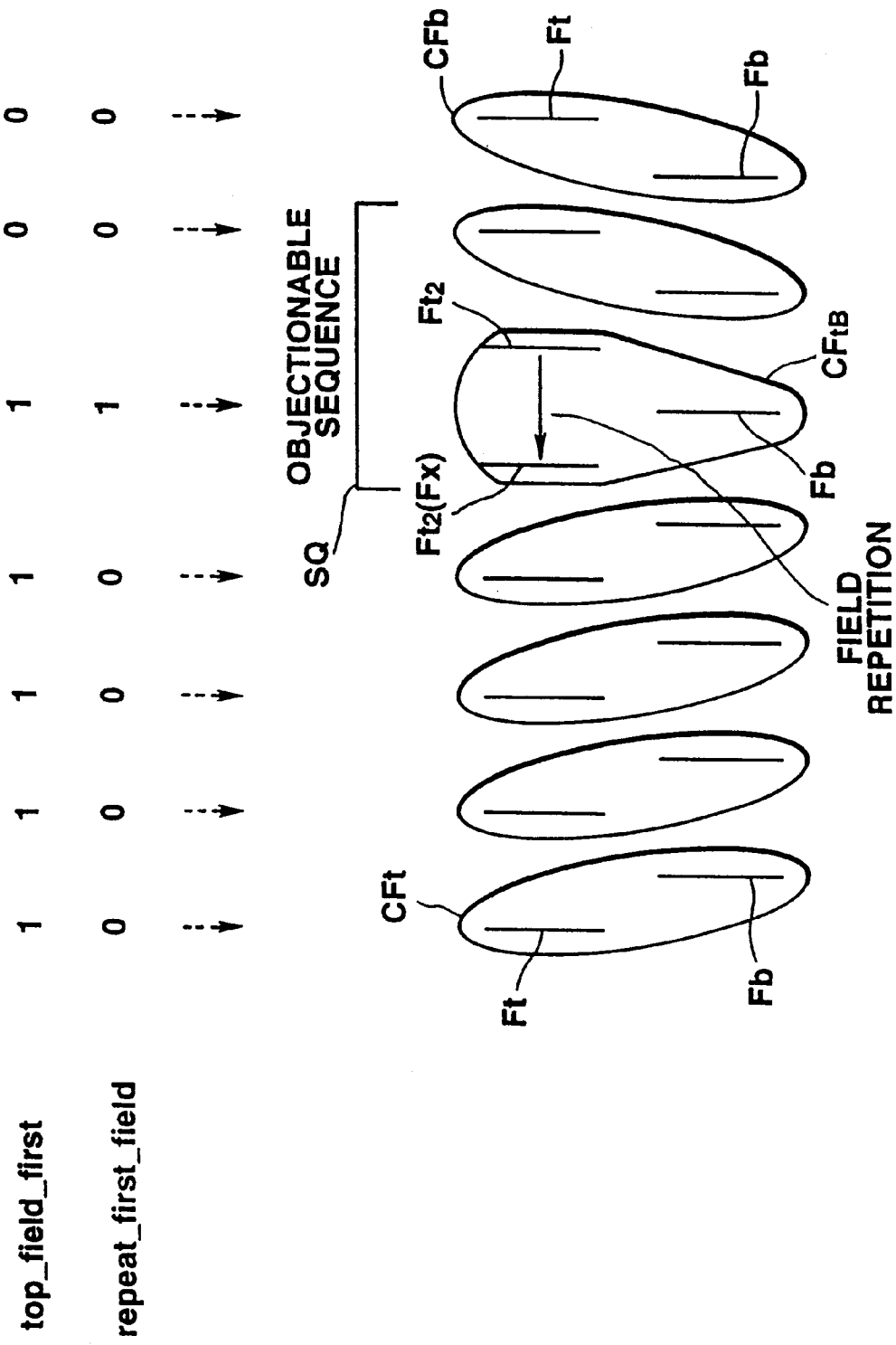
FIG. 24 illustrates an example of interpolating a lone field by iteration of a previous field.

FIG. 24 shows an example of encoding the pattern of FIG. 22D.

In FIGS. 23 and 24, the two flags top_first_field[n] and repeat_first_field[n] are both 1 for the sets of the encoding frames or set of field pictures $CFt_F$ and $CFt_B$, in which the beginning field is the first field Ft and in which this beginning field is repeatedly displayed. It is noted that, in the set of field pictures $CFt_B$ of FIG. 24, in which the backward field $Ft_2$ is repeated, data of the first field Ft as the beginning field is repeated as encoding data.

The re-constructing circuit for the non-interlaced picture, shown in FIG. 19, executes reconstruction of the set of field pictures or the encoding frame CF, containing picture type scheduling as explained subsequently, and outputs three sorts of the flags, namely picture_coding_type, top_first_field[n] and repeat_first_field[n]. These flags are provided along with picture data to the encoder 105.

The encoder 105 generates encoded data by the following method, using the above flags, and outputs the data at an output terminal 106.

The encoded output signals from the output terminal 106 are recorded on a signal recording medium, such as an optical recording medium, for producing a recording medium having recorded thereon signals encoded with high efficiency encoding.

With the above-described moving picture encoding method or apparatus, encoding can be executed after constructing a frame so that an input frame will become a non-interlaced frame, even if the period of field pairs making up the non-interlaced frame of the input moving picture is irregular or a lone field not constituting a non-interlaced frame is contained in the input moving picture, so that highly efficient picture encoding can be achieved. The above-described method or apparatus is effective when encoding video signals containing an irregular 2:2 pull-down pattern due to processing, such as field editing, of video signals, with a frame rate of 25 Hz, produced by 2:2 pull-down from film pictures.

The use of the MPEG encoding standard as the encoding standard is now explained.

With the encoding by the MPEG system, each video sequence is divided in terms of groups-of-pictures (GOPs), that is a group of frames, such as 12 frames. By the prediction system, each frame is classified into three types, namely intra-coded pictures or I-pictures, predictively coded pictures or P-pictures, in which motion prediction is from past and future P- or I-pictures, and bi-directionally coded pictures or B-pictures, in which motion prediction is from past and future P- or I-pictures. In the present embodiment, the flag S5 explained in connection with FIGS. 4 to 11 is controlled so as not to be 1 when encoding an input frame as a B-picture. Thus the method of controlling the non-interlaced frame detection circuit 172 differs from the method shown in FIG. 4 in this respect, although the two methods are similar in the remaining respects.

Figure 26:
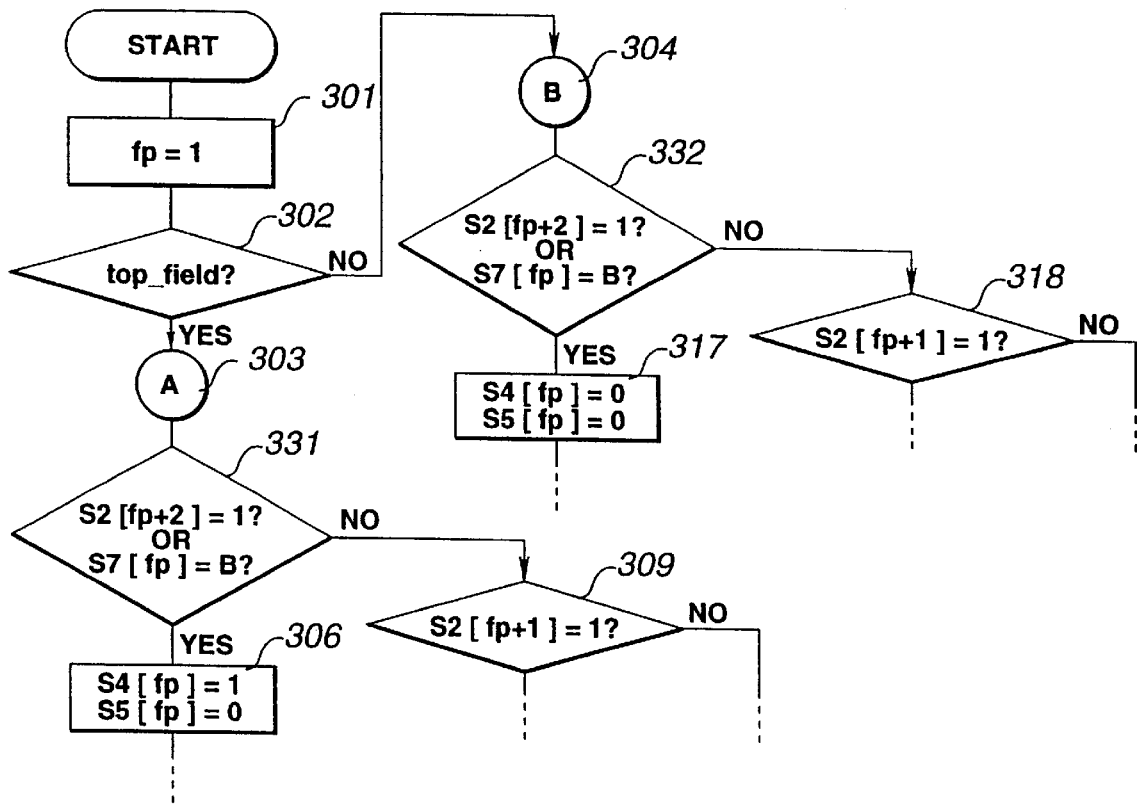
FIG. 26 is a flowchart for illustrating the operation of detecting and removing a lone field according to a modification of the present invention.

The algorithm of processing in the non-interlaced frame detection circuit in the example of encoding by the MPEG system is explained by referring to the flowchart of FIG. 26. The signal S7 specifies the frame encoding method, and is designated from a encoding unit 163. The algorithm of FIG. 26 differs from the algorithm shown in FIGS. 10 and 11 in that the condition of the conditional branching 305 and 316 are modified to steps S331 and S332. Since the algorithm of FIG. 26 is otherwise the same as that shown in FIGS. 10 and 11, only the modified portion inclusive of the step S331, S332 are shown without showing the remaining portions.

That is, the conditional branching step 305 of FIG. 10 is modified as shown at the conditional branching step 331 of FIG. 26. At this step 331, it is discriminated whether the flag forward by two steps S2[fp+2] is 1 or whether the signal S7 specifies a B-picture. On the other hand, the conditional branching step 316 of FIG. 11 is modified to the conditional branching step 332 shown in FIG. 26. At this step 332, it is judged whether the flag forward by two fields S2[fp+2] is 1 or the signal S7 indicates a B-picture.

FIGS. 27A and 27B, showing illustrative examples of signals and flags at various portions, are directed to removal of the lone field by the signal top_field. FIGS. 27A and 27B are directed to the method explained in connection with FIG. 6 to 11 and to the method now explained in connection with FIG. 23.

The time of the field "?" is the current time fp. In FIG. 27A, "?" is detected as a lone field and removed. The frame |fF| is designated as the B-picture and the flag S5 is set to 1.

In FIG. 27B, since the encoding of the B-picture is specified at time fp of the field "?", "?" is not detected as a lone field. When the field time has advanced by two fields (fp=fp+2), the encoding of the P-picture is specified. The field "F" is detected as a lone field and removed. The frame |gG| is encoded as a P-picture and the flag S5 is set. If, in the algorithm shown in FIG. 26, the time of the field "F" is the current time fp, the field "F" is judged to be one frame not constituting a non-interlaced frame in a field sequence on the temporally forward side of the current time fp.

Another example of removing the lone field is shown in FIGS. 28A and 28B, in which the lone field is removed by the signal bottom_field. FIGS. 28A and 28B show an example of the method explained in connection with FIGS. 6 to 11 and an example of the method explained in connection with FIG. 26.

In FIGS. 28A and 28B, the time of the field "c" is the current time fp. In FIG. 28A, "?" is detected as a lone field and removed. The frame |cC| is designated to the B-picture and the flag S5 is set to 1.

In FIG. 28B, the time for field "c" is the time fp and the encoding method is designated to the B-picture, so that "?" is not detected as being a lone field. When the field time has proceeded by four fields, the encoding method is designated to P-picture and the field "d" is detected as being a lone field and removed. The frame |Ee| is encoded as a P-picture and the flag S5 is set to 1. If, in the algorithm shown in FIG. 26, the time for the field "d" is the current time fp, the field "d" in the field sequence on the temporally forward side of the current time fp is judged to be a lone field not constituting a non-interlaced frame.

By the above procedure, the lone field not constituting a non-interlaced frame is detected and removed.

The field signal S6, thus freed of the lone fields and outputted from the field detection and removal circuit 172 of FIG. 4, is converted by the scan converter 162 into frame pictures in the input sequence. The example of the signal F6 is as explained in connection with FIGS. 27 and 28. The input frame signals S203 and the associated flags S4 and S5 are entered to the picture encoder 163. The two flags S4 and S5 may be encoded using top_first_field[n] and repeat_first_field[n] defined in MPEG2. The detailed structure of the encoder 163 is described subsequently. The encoded bitstream S204 is supplied to the recording medium 164.

The specific embodiment explained herein is indispensable when the picture decoder has the performance of the class of the so-called MP@ML (main profile at main level) of MPEG2. That is, while a flag indicating that the lone field not constituting the non-interlaced frame has previously been removed is transmitted using repeat_first_field[n] of MPEG2, MP@ML of MPEG2 prohibits repeat_first_field[n] from being set to 1 for the frame rate of 25 Hz. Thus the above specific embodiment is used for avoiding this rule as well as achieving highly efficient picture encoding.

The embodiment of compulsorily setting the encoding method to I or P for the flag S5 equal to 1 is explained.

In general, the P-picture or the I-picture appears cyclically in a GOP. For example, in the GOP structure shown in FIG. 25, both the P-pictures or the I-pictures appear every three frames.

In the instant embodiment, the frame encoding method is compulsorily set to an I-frame or to a P-frame when the flag S5 explained in connection with FIGS. 6 to 11 is set to 1. Thus the instant embodiment differs from the previous embodiment as to the method for controlling the signal S7 specifying the frame encoding method performed by the encoder 163. The instant embodiment is otherwise the same as the embodiment explained in connection with FIGS. 6 to 11.

An illustrative example is explained by referring to FIGS. 29 and 4. The time of the field "?" is detected as a lone field and removed, while the flag S5 is set to 1. The encoder 163 is responsive thereto and designates the P-picture by the signal S7. It is noted that if the P-pictures are used every three frames, the B-picture is be specified.

The field signal S6, outputted by the non-interlaced frame detection circuit 172, is converted in the input sequence by the scan converter 162. FIG. 29 shows an example of the signal S6.

The input frame signals S203 and the associated flags S4 and S5 are entered to the picture encoder 163. The two flags S4 and S5 may be encoded using top_first_field[n] and repeat_first field[n] defined in MPEG2. The detailed structure of the encoder 163 will be described subsequently. The encoded bitstream S204 is supplied to the recording medium 164.

The specific embodiment explained herein is again indispensable when the picture decoder has the performance of the class of the so-called MP@ML (main profile at main level) of MPEG 2. That is, the rule prohibiting repeat_first_field[n] of the B-picture from being set to 1 as described above may be avoided while efficient picture encoding may be achieved.

Meanwhile, if the above MPEG encoding standard is used in picture signals of the PAL (Phase Alternation by line) system, it is prescribed that field repetition in the sequence of the PAL system is to be prohibited by the B-picture. The irregular telecine pattern as described above appears in the above PAL system and needs to be coped with appropriately. This is now explained by referring to FIG. 30.

Figure 30B:
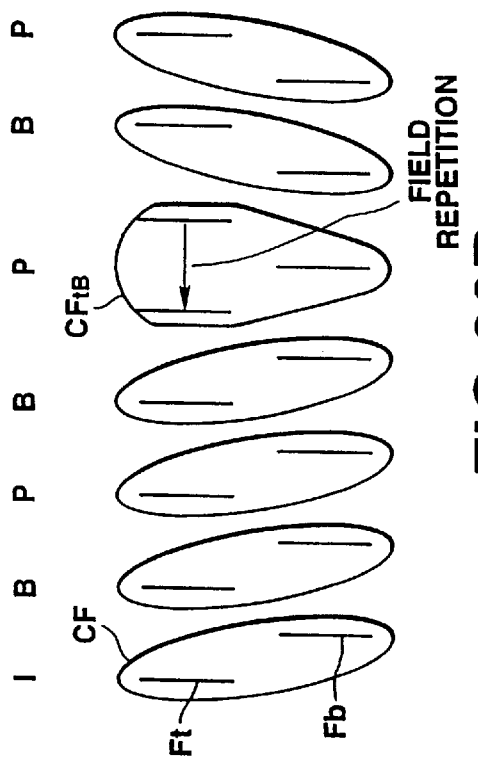
FIGS. 30A, 30B and 30C illustrate the relation between the picture type and the method for designating a flag for an encoder.
Figure 30C:
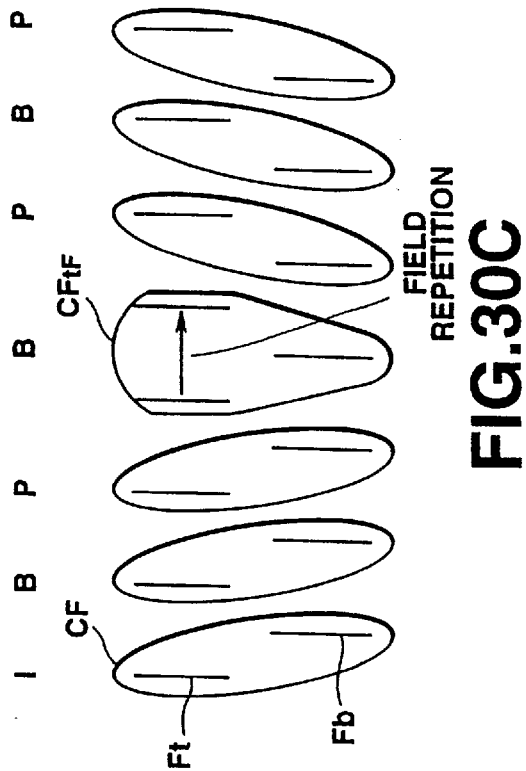

In FIG. 30, it is up to the encoder to decide where field repetition is to be done for encoding the objectionable irregular pattern, In the present embodiment, field repetition is scheduled to occur at an I-picture or at a B-picture.

Figure 30A:
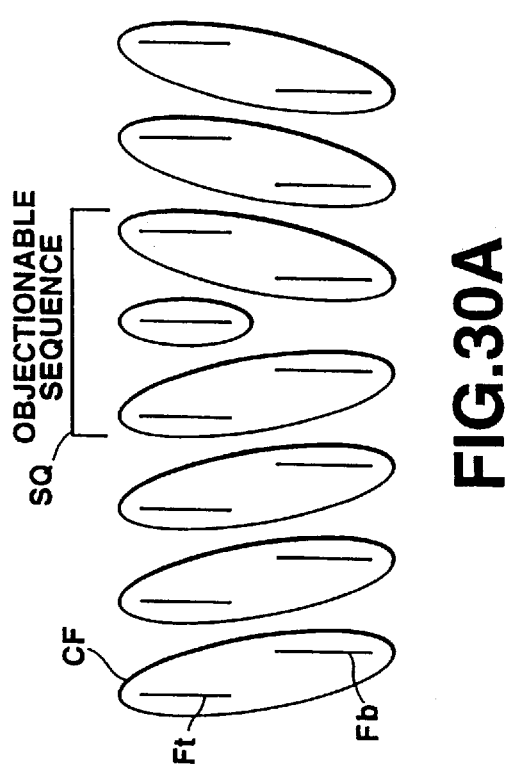

That is, with a sequence containing the irregular pattern as shown in FIG. 30A, encoding can be done without contravening the above rule by scheduling the set of fields CFt$_B$ containing field repetition so as to correspond to the P-picture as shown in FIG. 30B. Meanwhile, if the set of fields CFt$_F$ containing the field repetition corresponds to the B-picture during encoding, the above rule is violated. Thus the scheduling is done for avoiding such encoding, and the sequence thus scheduled is routed to the encoder 105 of FIG. 19.

In the non-interlaced picture re-constructing circuit 104, reconstruction of the encoding frames of field picture sets DF, inclusive of the picture type scheduling as described above, is performed, and three sorts of flags picture_coding_type, top first_field[n] and repeat_first_field[n] are outputted and routed along with picture data to the encoder 105.

An illustrative example of using a non-interlaced frame detection circuit configured as in FIG. 12 is now explained in detail.

An illustrative algorithm for judging the combination of the non-interlaced frames from the flag S22 in case of employing the circuit of FIG. 12 is shown in FIG. 33. The flag "picture_coding type on line 7 denotes the frame encoding method designated by the downstream side encoder 163 shown in FIG. 4. The present algorithm differs from the algorithm shown in FIG. 17 with respect to the AND conditions on lines 7 to 11. In the instant embodiment, the condition for repeat_first_field[n] being 1 in the algorithm of FIG. 17 holds if additionally "picture_coding type" is other than "B-picture".

Figure 34:
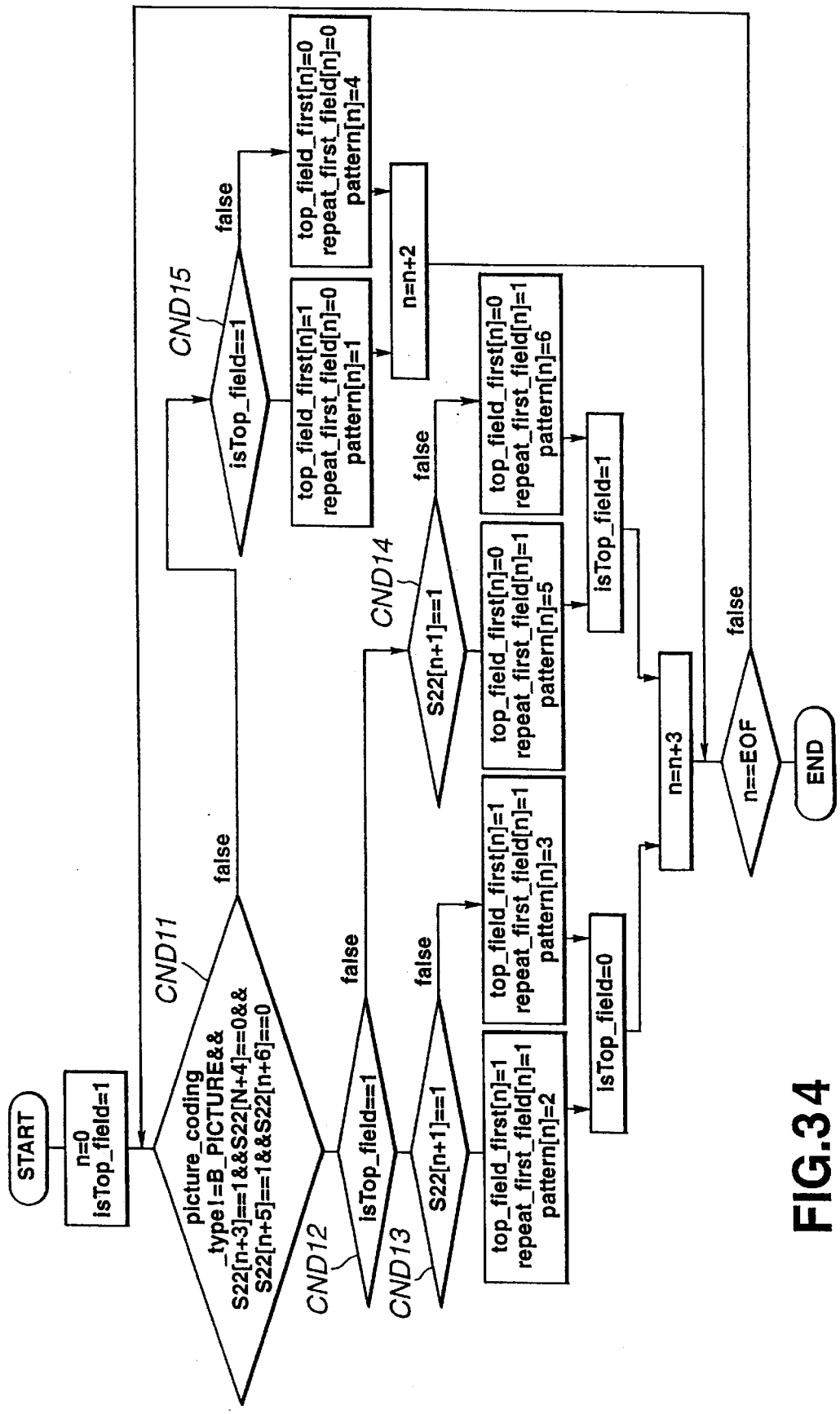
FIG. 34 is a flowchart for illustrating the processing sequence for the algorithm of FIG. 30.

The flowchart corresponding to the algorithm of FIG. 33 is shown in FIG. 34.

In this figure, the conditions CND$_{11}$~CND$_{15}$ of FIG. 33 correspond to the condition discrimination steps CND$_{11}$~CND$_{15}$ of FIG. 34. The remaining steps of FIG. 34 show variables n, isTop first, top_first_field[n], repeat_first_field[n] and pattern[n].

Figure 31:
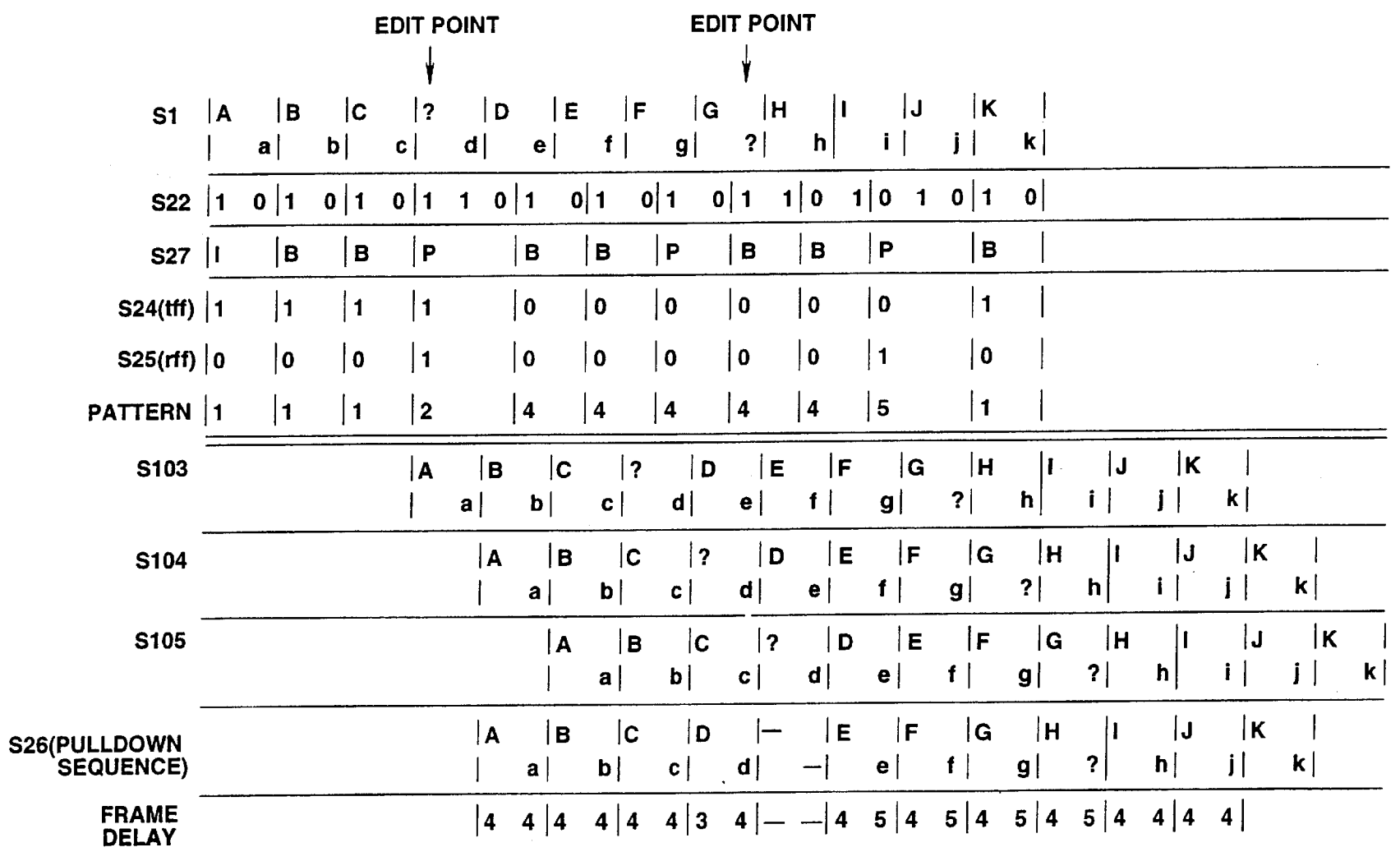
Figure 32:
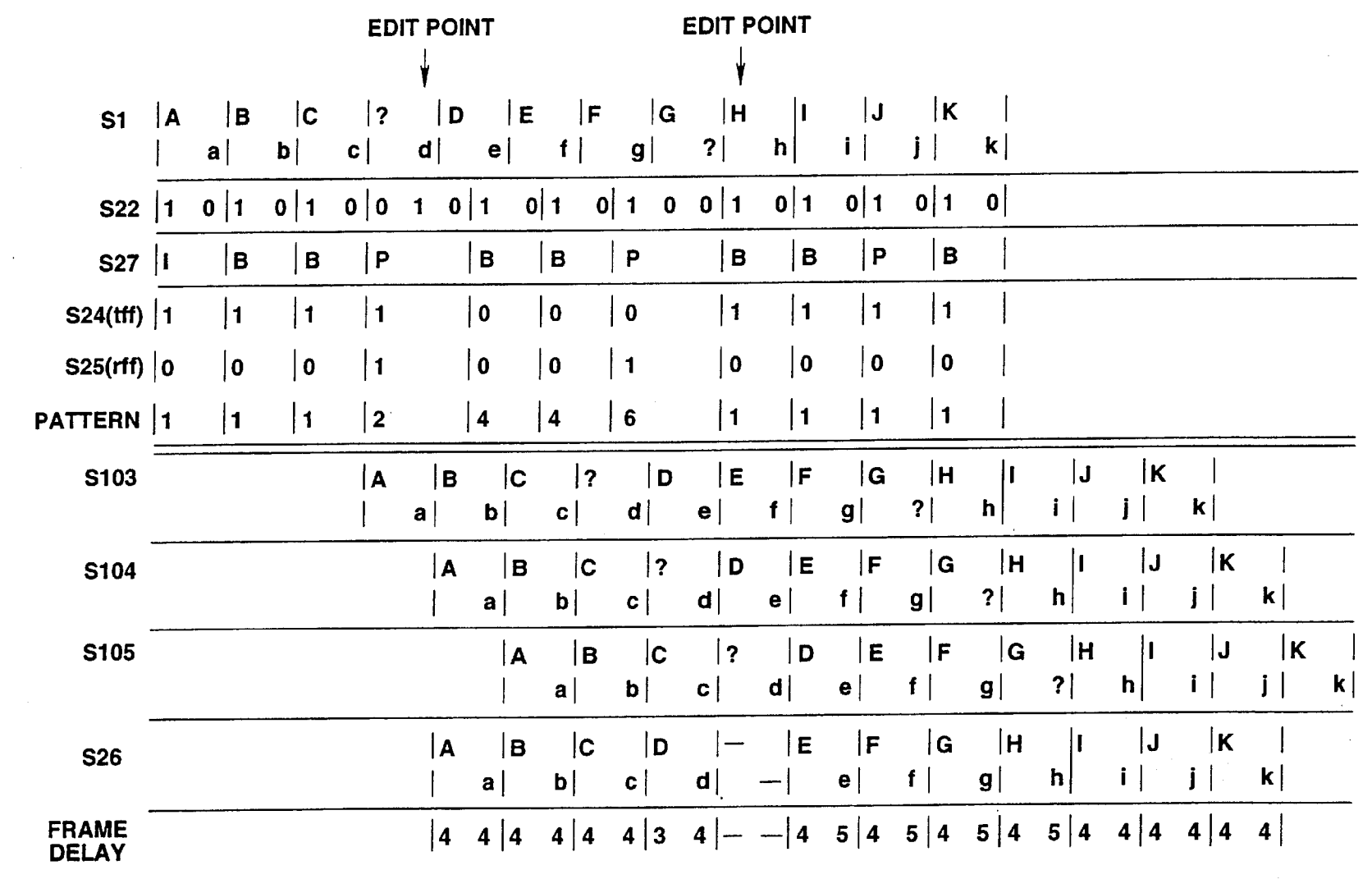

An illustrative example is shown in FIGS. 31 and 32, of which FIG. 31 shows the results of discrimination of top_first field[n] and repeat_first_field[n] for the same input S1 as that of FIG. 15 by the algorithm of FIG. 33. FIG. 32 shows the results of judgment of top_first_field, repeat_first_field and pattern by the algorithm of FIG. 33.

The deference of FIG. 31 from FIG. 15 resides in the fact that, in FIG. 15, pattern=15 for repeat_first_field=1 at n=15, that is at "?" at the 15th field of S1, such that the lone field is removed, whereas, in FIG. 31, since picture_coding_type designated by the field "?" is B-picture, repeat_first_field is not set to 1. In the algorithm of FIG. 33, it is for the n=19 for a field "i" that repeat_first_field becomes 1, at which time pattern=5 and the field "i" is removed.

The difference of FIG. 32 from FIG. 16 resides in the fact that, in FIG. 16, pattern=5 for repeat_first_field=1 at n=4, that is at "C" at the fourth field of S1, such that the lone field "?" is removed, whereas, in FIG. 32, since picture_coding_type designated by the field "C" is B-picture, repeat_first field is not set to 1. In the algorithm of FIG. 33, it is for n=6 for a field "?" that repeat-first_field becomes 1, at which time pattern=2 and the field "?" is removed.

In FIG. 31, the field "i" is inherently a combination of producing the field "I" and the non-interlaced frame. In the algorithm of FIG. 33, the field "i" is removed due to limitations that repeat_first_field is not set to 1 for the B-picture. The reason is that the fields "h" and "I" are combined to form a non-interlaced frame, which is not inherently correct, so that, when the field "J" and "j" are combined to form a non-interlaced frame, the field "i" has to be set to the lone field. Thus, in the instant embodiment, in distinction from the algorithm of FIG. 17, a frame suffering from lowering in the encoding efficiency tends to be produced at back or ahead of the frame where repeat_first_field is 1 (frame |I h| of FIG. 31), due to the limitation that repeat_first_field is not to be 1 for the B-picture. This deficiency may be effectively coped with by raising the bit rate for the frame.

The lone field not constituting the non-interlaced frame is detected as described above and removed.

Referring again to FIG. 4, the output field signal S26 from the non-interlaced frame detection unit 178 is converted by the scan converter 162 in the input sequence into a frame picture S203. It is seen that, in the embodiment of FIGS. 31 and 32, "|" in S26 is the frame boundary. It is seen that a frame picture is constructed at an interval of two fields outputted on the basis of the above pattern.

The input frame S203 and the associated flags S24 and S25 are entered to the picture encoder 163. These two flags S24 and S25 may be encoded using top_first_field[n], repeat_first field[n] defined in MPEG2. The encoded bitstream S204 from the encoder 163 is stored in the storage medium 164.

The decoding apparatus shown in FIG. 4 is explained.

From the storage medium 164 of FIG. 4, an encoded bitstream signal S205 is provided via a terminal 176 to the picture decoder 165. In he picture decoder 165, a frame signal S206 is reproduced from the encoded bitstream signal S205. The picture decider 165 will be explained subsequently in detail.

For each frame of the frame signal S206, a first flag S10 specifying from which of top_field or bottom_field a picture is to be displayed, and a second flag S11, specifying that the field has been removed, are decoded. These lags S10 and S11 are associated with the flags S4, S5 or S24, S25 explained in connection with the explanation for the encoder.

Each frame of the frame signal S206 is converted by the scan converter 166 into two fields of the field signal S207, that is top_field and bottom_field. An output controller 177 controls picture display of the field signal S207 by the flags S10 and S11.

When the flag S10 is 1, top_field is outputted first, whereas, when the flag S10 is 0, bottom_field is outputted first.

If the flag S11 is 1, one previously decoded and reproduced field is interpolated. For example, an initially outputted field, as commanded by the flag S10, is iteratively outputted. In such case, the two flags S10 and S11 may be realized using top_first_field and repeat_first_field defined in MPEG2. In this manner, a signal S208 is outputted on the basis of the signal S207 and the flags S10 and S11. This signal S208 is displayed on a monitor 167.

The processing by an output controller is specifically shown in FIGS. 35 to 38. These four examples illustrate outputs corresponding to the encoded bitstreams of the sequences explained in connection with FIGS. 6 to 9, respectively.

Figure 39:
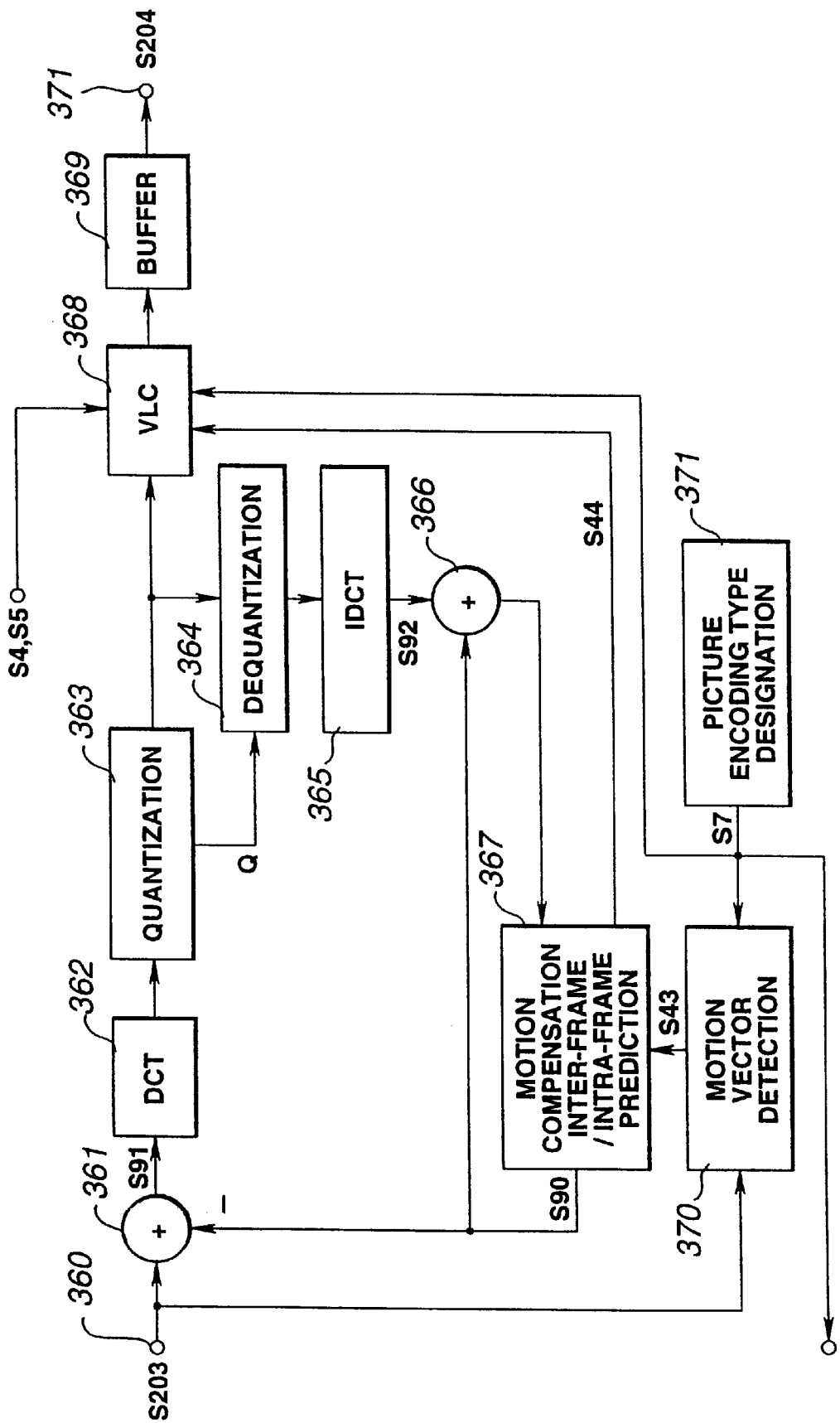
FIG. 39 is a block diagram showing an illustrative construction of a picture encoding unit.

An illustrative example of the picture encoder 163 shown in FIG. 4 is explained by referring to FIG. 39. The embodiment of FIG. 39 implements the hybrid encoding method consisting in the combination of motion-compensated interframe prediction and DCT widely known in MPEG2.

An input moving picture signal S203 is supplied at a terminal 360 of FIG. 39. Each frame is encoded by any one of three methods of I-pictures, P-pictures or B-pictures.

Figure 25:
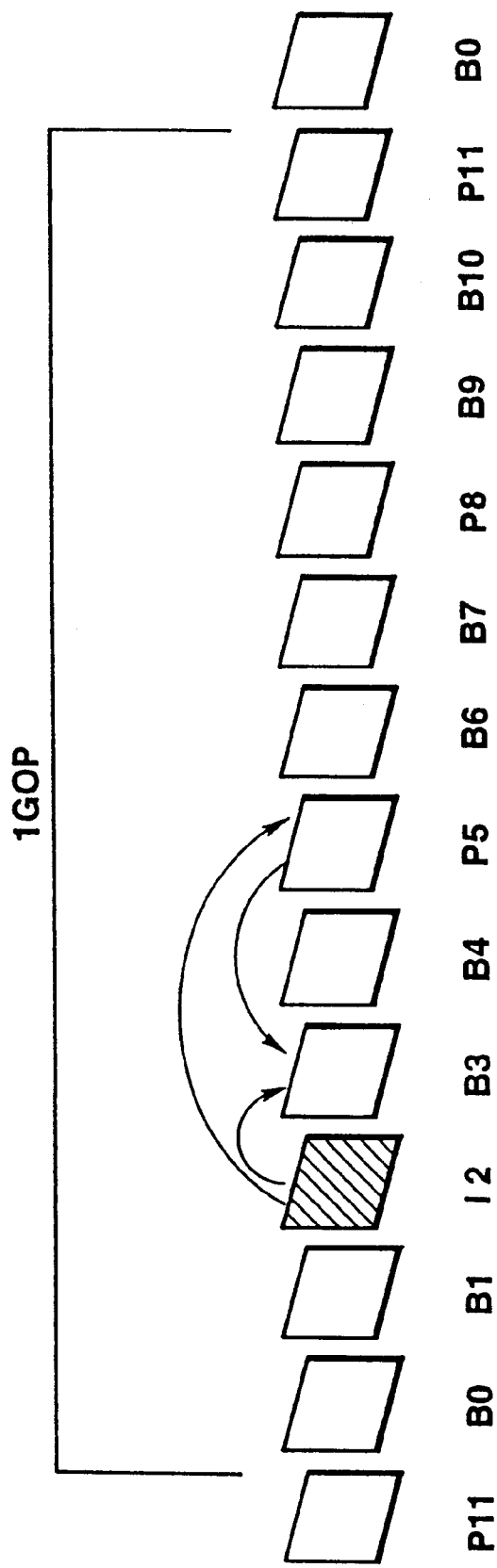
FIG. 25 illustrates an illustrative example of a group-of-picture.

In case of a GOP composed of 12 frames, as shown in FIG. 25, a frame I2 is encoded as an I-picture, while frames B0 and B1 are encoded as a B-picture and a frame P5 is encoded as a P-picture. The frames B3, B4, P8, B6, B7, P11, B9 and B10 are then encoded in this order. The picture encoding method is carried out by a picture encoding type designating circuit 371, which outputs the signal S7.

This signal S7 is entered to a motion vector estimation circuit 370 where inter-frame motion vector is detected. Motion vector estimation is performed by pattern matching between a reference frame and a current 16 pixel by 16 line macro-block. That is, a sum Ef of absolute values |Aij−Fij| of the difference between the signal Aij of the current macro-block and the signal Fij of an arbitrary block indicated by a motion vector, that is Ef=Σ|Aij−Fij| is found.

The motion vector detection circuit 370 outputs the motion vector information S43 for which Ef becomes minimum. A motion compensation inter-frame/intra-frame prediction circuit 367 outputs a prediction picture signal S90 read out with the motion vector information S23. An adder 361 calculates the difference between signals S203 and S90 to take out a predicted residue signal S91. If the signal S7 indicates an I-picture, prediction is not made and the input moving picture signal S203 is directly outputted.

The predicted residue signal S91 is processed by a DCT circuit 362 with two-dimensional DCT. If prediction is not done, it is the original signal that is processed with two-dimensional DCT. The DCT coefficients are scalar-quantized by a quantization circuit 363. The resulting quantized output is Huffman-encoded by a variable length encoding (VLC) circuit 368. The quantization step Q and the motion vector information S44 are Huffman-encoded on the frame basis by the VLC circuit 368 on the macro-block basis. The frame signals S7 and the above-mentioned flags S4 and S5 are Huffman-encoded by the VLC circuit 368 on the frame basis.

A buffer 369 smoothes the bit rate outputted on a transmission channel. If overflow is likely to occur, the buffer 369 operates to feed back that effect and increases the quantization step of the quantization circuit 363 while decreasing the amount of the information outputted from the quantization circuit 363.

On the other hand, data outputted by the quantization circuit 363 is fed to a dequantization circuit 364 where it is dequantized responsive to the quantization step Q supplied from the quantization circuit 363. An output of the dequantization circuit 364 is supplied to an inverse DCT circuit 365 for inverse DCT processing. An output of the dequantization circuit 364 is entered to the inverse DCT circuit 365 where it is inverse DCTed. The decoded prediction residue signal S92 is entered to an adder 366.

The same data as the prediction residue signal S90 supplied to the adder 361 is supplied to the adder 366. The adder 366 adds the signal S90 to the signal S92. This generates locally decoded picture data. This picture is the same signal as the output picture on the receiver side.

Referring to FIGS. 37 to 45, illustrative examples of encoding and decoding of the moving picture signals are explained in further detail. In these illustrative embodiments, picture signals are encoded for compression by exploiting line-to-line or inter-frame correlation of picture signals.

If the line-to-line correlation is exploited, picture signals can be further processed with, for example, discrete cosine transform (DCT) for data compression.

In inter-frame correlation is exploited, picture signal can be further compressed by encoding. For example, if frame pictures PC1, PC2 and PC3 are generated at time points t=t1, t2 and t3, respectively, as shown in FIG. 40A, the difference between the picture signals of the frame pictures PC1 and PC2 may be calculated to generate a picture PC12, as shown in FIG. 40B, while the difference between the picture signals of the frame pictures PC2 and PC3 of FIG. 40B may be calculated to generate a picture PC23, as shown in FIG. 40B. Since pictures of frames of temporally neighboring frames are not changed so significantly from each other, the difference signal produced on calculation of the difference between the two pictures is of a small value. Thus, as for the picture PC12 shown in FIG. 40B, a signal of a hatched portion of the picture PC12 of FIG. 40B is obtained as the difference between picture signals of the frame pictures PC1 and PC2 of FIG. 40A. Similarly, as for the picture PC23 shown in FIG. 40B, a signal of a hatched portion of the picture PC23 of FIG. 40B is obtained as the difference between picture signals of the frame pictures PC2 and PC3 of FIG. 40A. The amount of the codes can be compressed by encoding this difference signal.

However, if only the difference signal is transmitted, the original picture cannot be restored. Thus the pictures of respective frames are arranged into three sorts of pictures, namely an intra-coded picture or I-picture, a predictively coded picture or P-picture and a bi-directionally coded picture or a B-picture, for compression coding the picture signals.

That is, 17-frame picture signal from a frame F1 to a frame F17 are grouped as a group-of-picture, serving as an encoding unit, as shown in FIGS. 41A and 41B. The picture signals of the leading frame F1 are encoded as an I-picture, while picture signals of the second and third frames F2, F3 are processed as a B-picture and as a P-picture, respectively. The fourth and the following frames F4 to F17 are alternately processed as B-pictures and P-pictures.

As picture signals of the I-picture, picture signals of one frame of the I-picture are directly transmitted. As picture signals of the P-picture, basically the difference from the temporally previous I- or P-pictures is encoded and transmitted, as shown in FIG. 38A. As picture signals of the B-picture, basically the difference from mean values of a temporally previous frame or a temporally succeeding frame is found and the difference is encoded and transmitted, as shown in FIG. 40B.

Figures 42A, 42B:
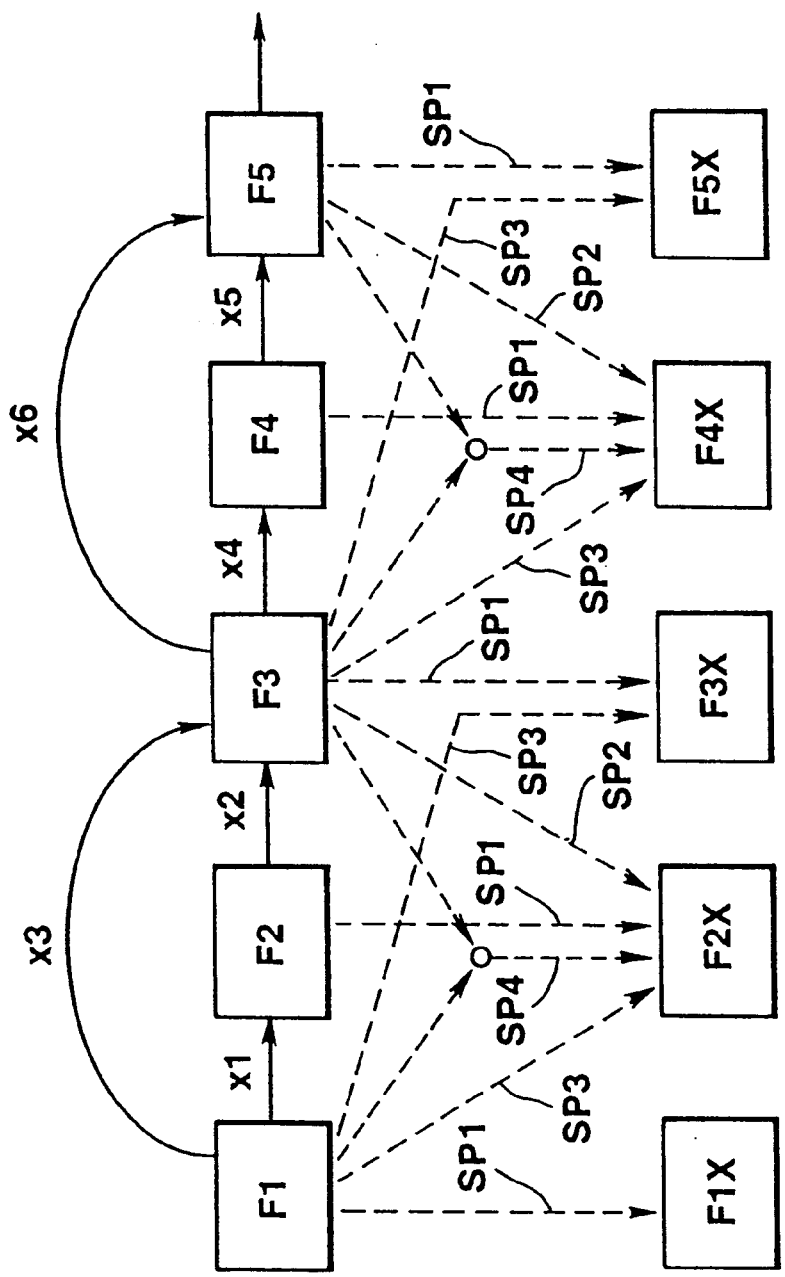
FIGS. 42A and 42B illustrate the principle of encoding moving picture signals.

FIGS. 42A and 42B illustrate the principle of the method for encoding moving picture signals. Specifically, FIGS.

42A and 42B illustrate frame data of moving picture signals and transmitted frame data, respectively. In FIG. 42, since the first frame F1 is processed as an I-picture or as a non-interpolated frame, it is directly transmitted on a transmission chancel as transmission data F1X (non-interpolated transmission data). As for the second frame F2, processed as a B-picture or as an interpolated frame, the difference from the mean value between the temporally previous frame F1 and the temporally succeeding frame F3 (inter-frame encoded non-interpolated frame) is found and the resulting difference is transmitted as transmitted data (transmitted interpolated frame data) F2X.

More specifically, there are four different modes, for processing as the B-picture, which may be switched on a macro-block basis. The first mode directly transmits data of the original frame F2 as transmission data F2X as indicated by a broken-line arrow SP1 (intra-encoding mode). The processing is similar to that for the I-picture. The second mode calculates the difference from the temporally succeeding frame F3 and transmits the difference as indicated by a broken-line arrow SP2 (backward prediction mode). The third mode transmits the difference from the temporally previous frame F1 as indicated by a broken-line arrow SP3 (forward prediction mode). The fourth mode generates the difference between the temporally previous frame F1 and the temporally succeeding frame F3 and transmits the difference as transmission data F2X (bi-directional prediction mode).

Of these four modes, the mode which minimized the transmission data is employed on the macro-block basis.

When transmitting the difference data, the motion vector x1 from the prediction picture, that is the motion vector between the forward predicted frames F1 and F2 and/or the motion vector x2 between the backward predicted fames F3 and F2, is transmitted along with the difference data.

As for the frame F3 of the P-picture (non-interpolated frame of inter-frame prediction), the difference signal from the temporally previous frame F1 as the prediction picture, as indicated by a broken-line arrow SP3, and the motion vector x3, are calculated, and transmitted as transmitted data F3X (forward prediction mode). Alternatively, the data of the original frame F3 is directly transmitted as transmitted data F3X, as indicated by a broken-line arrow SP1 (intra-coding mode). In this P-picture, as in the B-picture, the particular method of transmission which reduces the transmitted data volume to a larger extent is selected on the macro-block basis.

The frame F4 of the B-picture and the frame F5 of the P-picture are processed in a similar manner so that transmission data F4X, F5X and motion vectors x4, x5 and x6 are produced.

Figure 43:
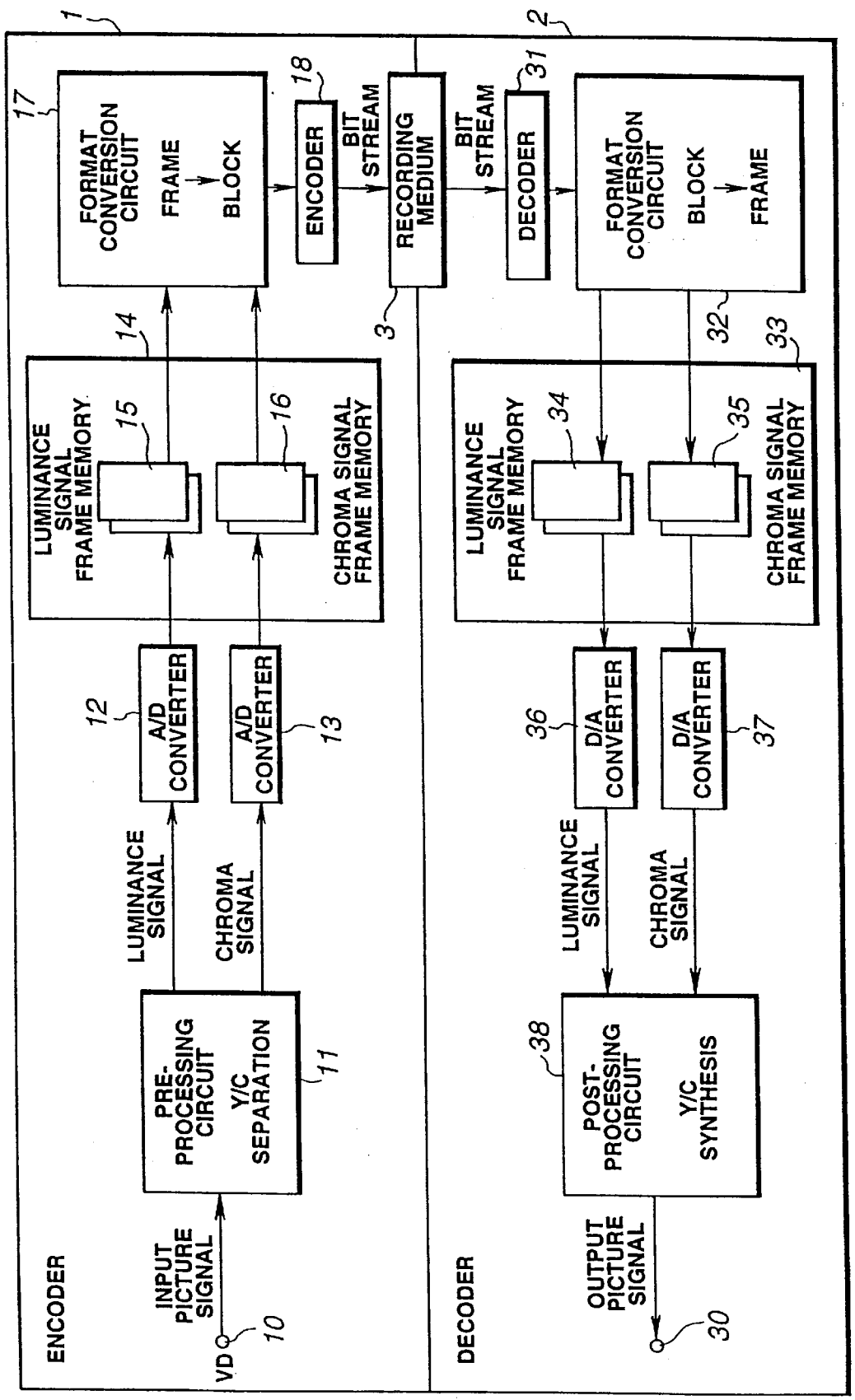
FIG. 43 is a block diagram showing examples of construction of a picture signal encoder and decoder according to the present invention.

FIG. 43 shows an illustrative construction of an apparatus for encoding, transmitting and decoding moving picture signals in accordance with the above-described principle. An encoding apparatus 1 encodes input picture signals and transmits the encoded signals to a recording medium 3 as a transmission path for recording thereon. A decoding apparatus 2 reproduces signals recorded on a recording medium 3, decodes and outputs reproduced signals.

In the encoding apparatus 1, input picture signals VD are supplied via an input terminal 10 to a pre-processing circuit 11 where it is separated into luminance and color signals (chroma signals) which are A/D converted by A/D converters 12 and 13, respectively. The picture signals, A/D converted by the A/D converters 12, 13 to digital signals, are supplied to a frame memory 14 for storage therein. In the frame memory 14, a luminance signal frame memory 15 and a chroma signal frame memory 16 store luminance and chroma signals, respectively.

Figures 44A, 44B, 44C:
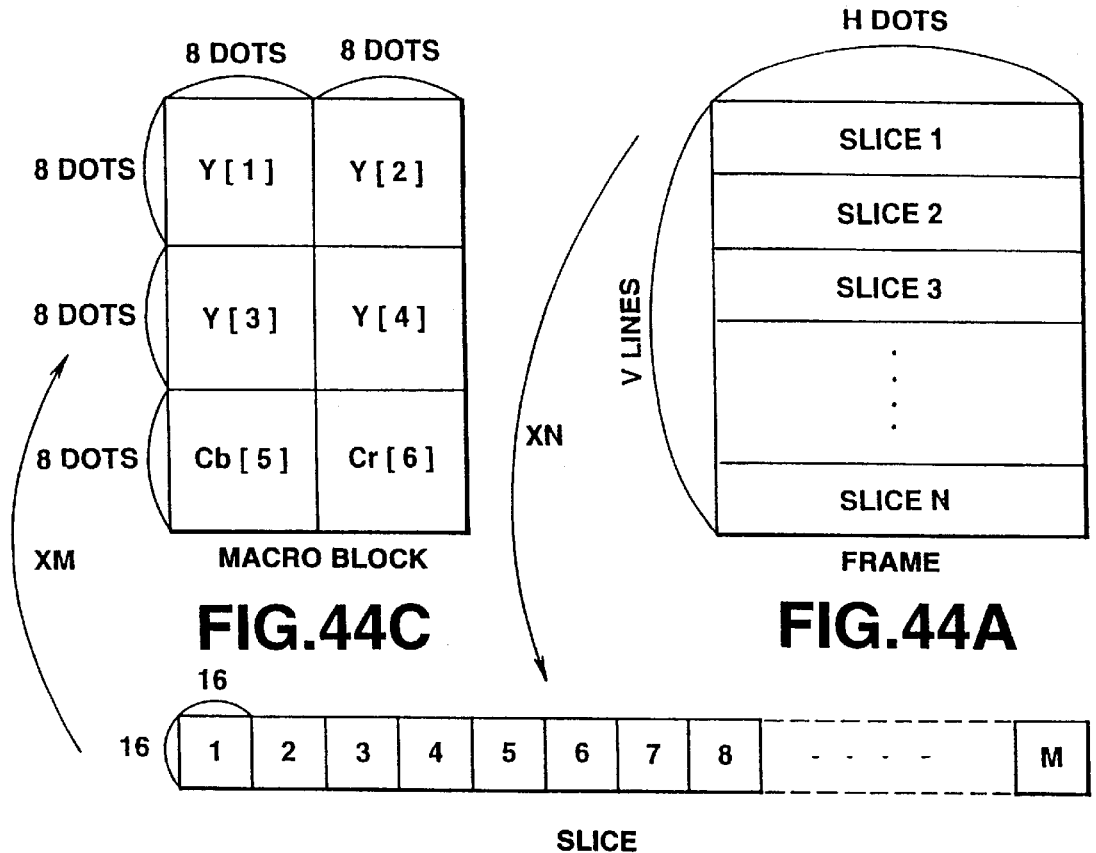
FIG. 44 illustrates the operation of format conversion of a format conversion circuit 17 in FIG. 40.

A format conversion circuit 17 converts frame-format signals, stored in the frame memory 14, into block-format signals. That is, three picture signals stored in the frame memory 14 are in the form of frame format data comprising V lines each consisting of H dots, as shown in FIG. 44A. The format conversion circuit 17 slices the 1-frame signals into n slices each consisting of 16 lines. Each slice is divided into macro-blocks, as shown in FIG. 44B. Each macro-block is made up of luminance signals corresponding to 16×16 pixels or dots, as shown in FIG. 44C. These luminance signals are further divided into blocks Y[1] to Y[4] each consisting of 8×8 dots. These 16×16 dot luminance signals are associated with 8×8 dot Cb signals and 8×8 dot Cr signals.

The data thus converted into block format data is supplied from the format conversion circuit 17 to an encoder 18 where it is encoded, as will be explained subsequently with reference to FIG. 45.

The signals encoded by the encoder 18 are outputted as a bitstream on a transmission chancel so as to be recorded on, for example, a recording medium 3.

The data reproduced from the recording medium 3 is supplied to a decoder 31 of the decoding apparatus 2 for decoding. The decoder 31 will be explained subsequently in detail by referring to FIG. 48.

The data decoded by the decoder 31 is supplied to the format conversion circuit 32 for conversion from the block format data into frame format data. The frame-format luminance signal are provided to a luminance signal frame memory 34 of a frame memory 33 for storage therein, while chroma signals are supplied to a chroma signal frame memory 35 for storage therein. The luminance signals read out from the luminance signal frame memory 34 and the chroma signals read out from the chroma signal frame memory 35 are D/A converted by D/A converters 36, 37, respectively, and thence supplied to a post-processing circuit 38 for synthesis. The resulting output picture signal are outputted at an output terminal 30 to a display, such as CRT, not shown, for display.

Figure 45:
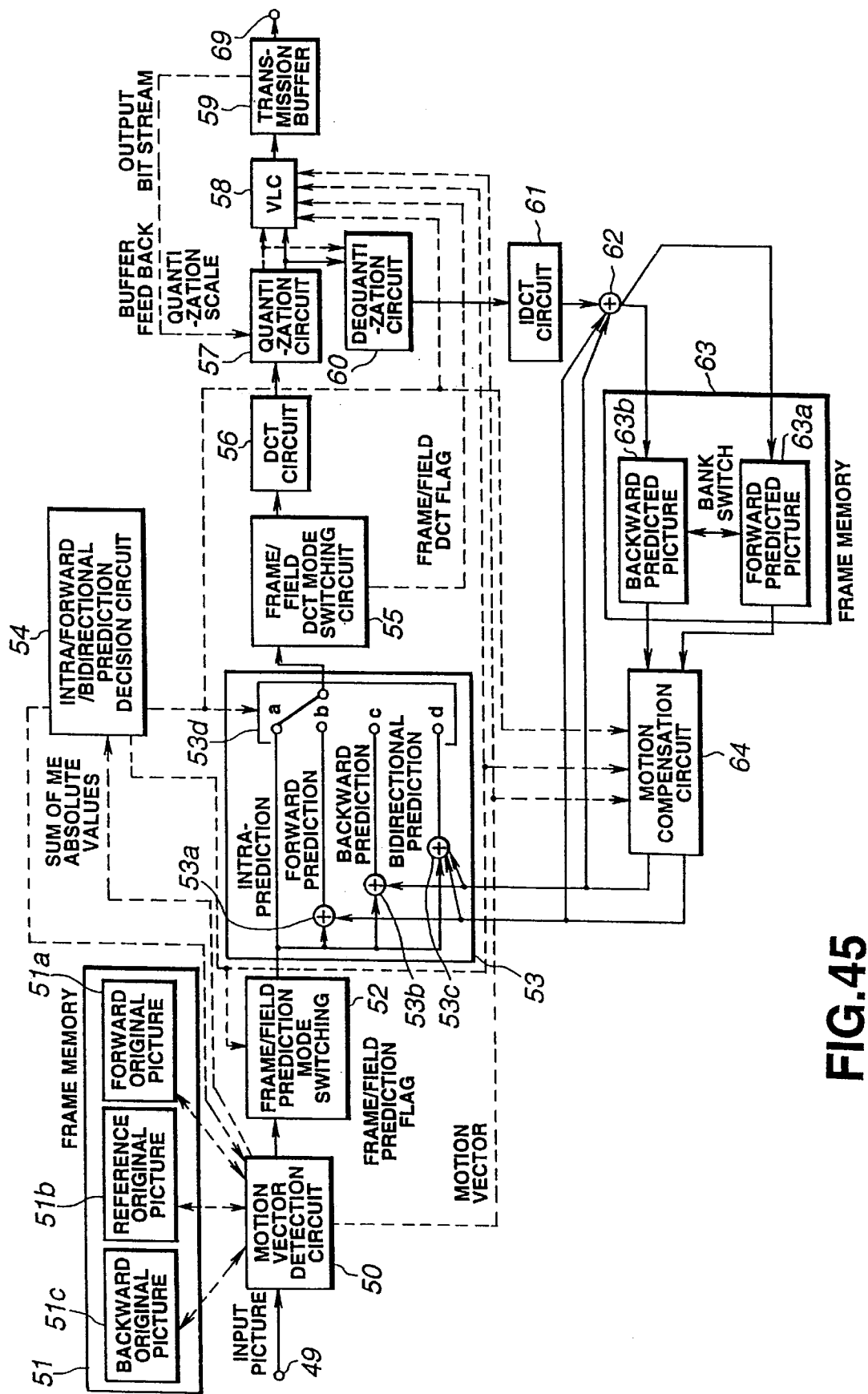
FIG. 45 is a block diagram showing an example of construction of the encoder 18 shown in FIG. 40.

An illustrative construction of the encoder 18 is explained by referring to FIG. 45.

Picture data supplied for encoding via an input terminal 49 are entered on the macro-block basis to a motion vector detection circuit 50, which then processes the frame picture data as I-, P- or B-pictures in accordance with a pre-set sequence. It is pre-set by which of the I-, P- or B-pictures the sequentially entered frame pictures are to be processed. For example, the group-of-pictures constituted by frames F1 to F17 are processed as I, B, P, B, P, . . . B, P, as shown in FIG. 41.

The picture data of a frame processed as an I-picture, such as a frame F1, is transmitted from the motion vector detection circuit 50 to a forward original picture unit 51a of the frame memory 51 for storage therein, while the picture data of a frame processed as a B-picture, such as a frame F2, is transmitted to a reference original picture unit 51b, and the picture data of a frame processed as a P-picture, such as a frame F3, is transmitted to a backward original picture unit 51c for storage therein.

When a picture of a frame to be processed as a B-picture such as the frame F4 or as a P-picture, such as the frame F5, is entered at the next timing, picture data of the first P-picture frame F39, so far stored in the backward original picture unit 51c, is transferred to the forward original picture unit 51a. On the other hand, picture data of the next B-picture (frame F4) is stored by overwrite in the forward original picture unit 51b, while picture data of the next P-picture (frame F5) is stored by overwrite in the backward original picture unit 51b. This sequence of operations is performed repeatedly.

The signals of the respective pictures stored in the frame memory 51 are read out therefrom so as to be processed with frame prediction mode or field prediction mode by a prediction mode switching circuit 52. The respective picture signals are also processed by a processing unit 53 with the intra-coding mode, forward-prediction mode, backward-prediction mode or bi-directional prediction mode, under control by a prediction decision circuit 54. Which of these processing modes is used is determined on the macro-bock basis in association with prediction error signals, that is the difference between the reference signal and the prediction picture. Thus the motion vector detection circuit 50 generates the sum of absolute values of prediction error signals used for such decision and the evaluation values of the intra-coding mode corresponding to the prediction error signals on the macro-block basis. The square sum may be employed in place of the sum of the absolute values.

The frame prediction mode and the field prediction mode in the prediction mode switching circuit 52 are now explained.

If the frame prediction mode is set, the prediction mode switching circuit 52 directly outputs four luminance blocks Y[1] to Y[4], supplied from the motion vector detection circuit 50, to the downstream side processing unit 53. In such case, data of lines of even fields and data of lines of odd fields co-exist, as shown in FIG. 46A. In FIGS. 46A and 46B, solid lines and broken lines in each macro-block represent data of lines of an odd field (lines of the first field) and lines of an even field lines of the second field), respectively, while a and b in FIGS. 44a and 46b specify units of motion compensation. In the frame prediction mode, prediction is made in terms of four luminance blocks (macro-blocks) as a unit and each motion vector is associated with four luminance blocks.

If the field prediction mode is set, the prediction mode switching circuit 52 causes luminance blocks Y[1] and Y[2] of four luminance blocks of the signal entered from the motion vector detection circuit 50 in the configuration shown in FIG. 46A to be constituted only by dots of, for example, odd field line dots, while causing the remaining two luminance blocks Y[3] and Y[4] to be constituted only by data of lines of even fields. The resulting data is outputted to the processing unit 53. In such case, one motion vector is associated with two luminance blocks Y[1] and Y[2], and another motion vector is associated with the remaining two luminance blocks Y[3] and Y[4].

In the frame prediction mode, chroma signals are supplied to the processing unit 53 in a state in which data of lines of odd fields and data of lines of even fields co-exist, as shown in FIG. 46A. In the field prediction mode, upper half portions (four lines) of the chroma blocks Cb and Cr are chroma signals of an odd field corresponding to the luminance blocks Y[1] and Y[2], while lower half portions (four lines) of the chroma blocks Cb and Cr are chroma signals of an even field corresponding to the luminance blocks Y[3] and Y[4], as shown in FIG. 46B.

The motion vector detection circuit 50 generates, in the prediction decision circuit 54, the evaluation values of the intra-coding mode and the sum of absolute values of prediction errors for determining which of the intra-coding mode, forward prediction mode, froward prediction mode, backward prediction mode or the bi-directional prediction mode and which of the frame prediction mode or the field prediction mode are to be used for respective macro-blocks, from one macro-block to another.

That is, as an evaluation value of the intra-coding mode, a sum of absolute values of the differences between the signal of a macro-block of a reference picture to be encoded Aij and its mean value, that is $\Sigma|Aij-(\text{mean value of Aij})|$, is found. As the sum of absolute values of prediction errors of forward prediction, a sum of absolute values of the differences between the signal Aij of a macro-block of a reference picture and the signals Bij of a macro-block of a prediction picture (Aij–Bij), that is $\Sigma|Aij-Bij|$. is found. The sum of absolute values of prediction errors of backward prediction and bi-directional prediction is found in a similar manner for each of the frame prediction mode and the field prediction mode on the condition that the prediction picture is changed to a prediction picture different from that for the forward prediction.

These sums of the absolute values are provided to a prediction decision circuit 54 which then selects the smallest one of the sums of the absolute values of prediction errors of forward prediction, backward prediction and bi-directional prediction for each of the frame prediction mode and the field prediction mode as the sum of absolute values of prediction errors for inter-prediction. The sum of absolute values of the prediction errors of the inter-prediction is also compared to the evaluation value of the intra-coding mode and a smaller one is selected. The mode associated with the thus selected value is selected as the prediction mode and the frame/field prediction mode. That is, if the evaluation value of the intra-coding mode is smaller, the intra-coding mode is selected. If the sum of absolute values of prediction errors of inter-prediction is smaller, one of the forward prediction mode, backward prediction mode or the bi-directional prediction mode having the smallest value of the sum of the absolute values is set as the prediction mode and the frame/field prediction mode.

Figure 46:
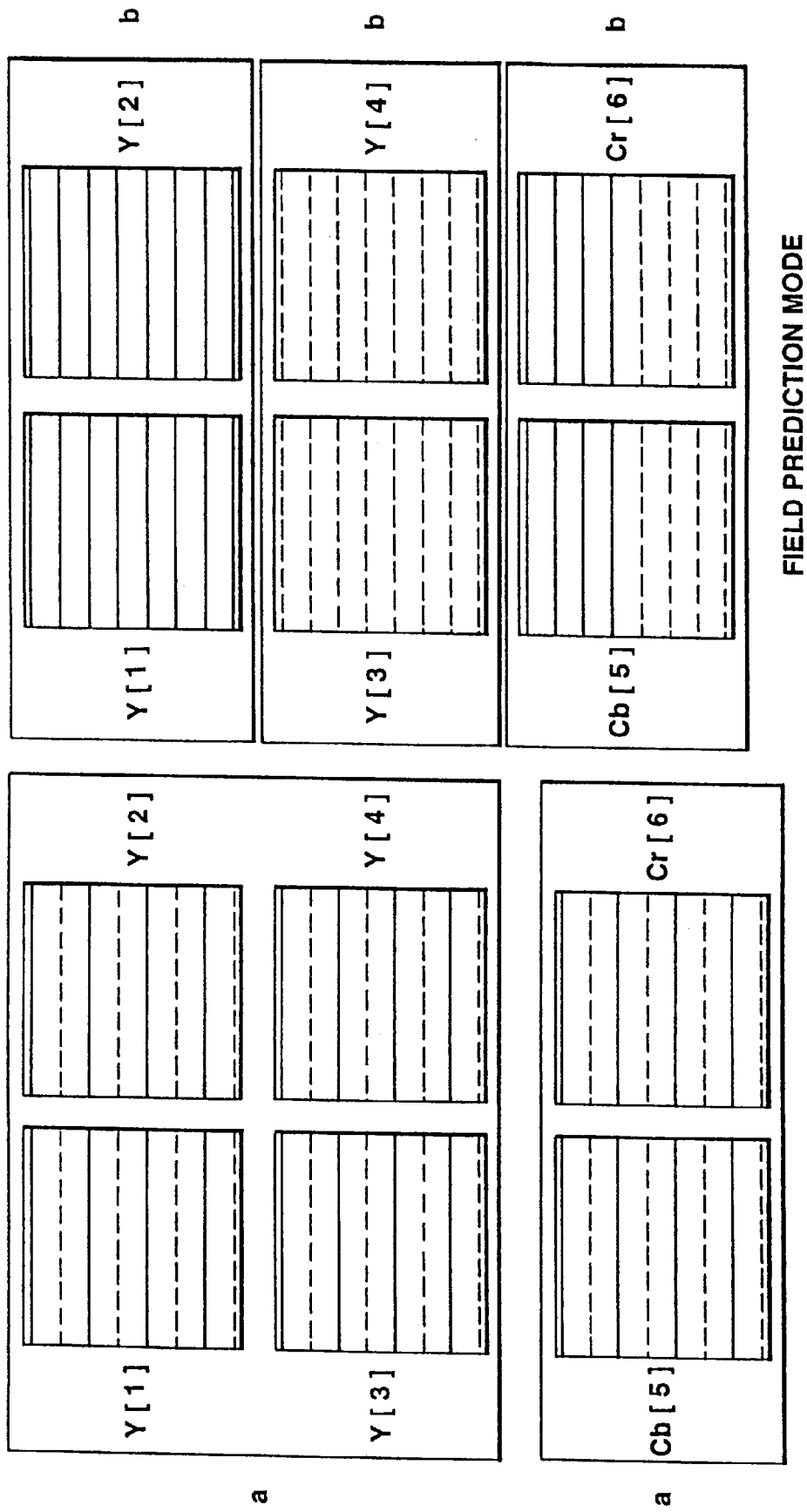
FIG. 46 illustrates the operation of a prediction switching circuit 52 of FIG. 42.

As described above, the prediction mode switching circuit 52 provides the macro-block signals of the reference picture to the processing unit 53 in the configuration shown in FIG. 46 corresponding to the frame prediction mode or the field prediction mode as selected by the prediction decision circuit 54. The motion vector detection circuit 50 outputs a motion vector between the prediction picture and the reference picture corresponding to the prediction mode selected by the prediction decision circuit 54 and provides the motion vector to a variable length encoding circuit 58 and to a motion compensation circuit 64 as later explained. For this motion vector, such a motion vector associated with the smallest sum of absolute values of the prediction errors is selected.

When the motion vector detection circuit 50 is reading out picture data of the I-picture from the forward original picture unit 51a, the prediction decision circuit 54 sets the intra-coding mode (mode not performing motion compensation) and sets a switch 53d of the processing unit 53 to a contact a. This routes picture data d the I-picture to a DCT mode switching circuit 55.

The DCT mode switching circuit 55 sets data of four luminance blocks to a state in which lines of odd fields and lines of even fields co-exist (frame DCT mode) or a state in which the lines of odd fields and the lines of even fields are isolated from each other (field DCT mode), as shown in FIGS. 47A and 47B. The DCT mode switching circuit 55 then outputs the data to the DCT circuit 56.

The DCT mode switching circuit 55 compares the encoding efficiency which would be achieved if DCT processing is done for data comprising odd field data and even field data together, to the encoding efficiency which would be achieved if DCT processing is done for data comprising odd field data and even field data separated from each other, and selects the mode with a higher encoding efficiency.

The input signals are set to a state in which the lines of the odd fields and the lines of the even fields co-exist as shown in FIG. 47A. The difference between the signals of the vertically adjacent lines of the odd fields and even fields is calculated, and the sum of the absolute values or the square sum is found. Alternatively, the input signals are set to a state in which the lines of the odd fields and the lines of the even fields are isolated from each other as shown in FIG. 4B. The difference between the signals of the vertically adjacent lines of the odd fields and even fields is calculated, and the sum of the absolute values or the square sum is found. The two sums of the absolute values are compared to each other and the DCT mode corresponding to the smaller value is set. If the former is smaller, the frame DCT mode is set and, if otherwise, the field DCT mode is set.

The data of the configuration corresponding to the selected DCT mode is outputted to the DCT circuit 56, while a DCT flag specifying the selected DCT mode is outputted to the variable length coding circuit 58.

On comparison of the frame/field prediction mode in the prediction mode switching circuit 52 (FIG. 46) to the DCT mode in the DCT switching circuit 55 (FIG. 47), it is seen that the data structures of the luminance block in the two modes remain substantially the same.

If the frame prediction mode (the mode in which even lines and odd lines exist together) is selected in the prediction mode switching circuit 52, the probability is high that the frame DCT mode (the mode in which even lines and odd lines exist together) be similarly selected in the DCT mode switching circuit 55. On the other hand, if the field prediction mode (the mode in which even lines and odd lines are isolated from each other) is selected in the prediction mode switching circuit 52, the probability is high that the field DCT mode (the mode in which even lines and odd lines are isolated from each other) be similarly selected in the DCT mode switching circuit 55.

However, this is not necessarily the case and the prediction mode switching circuit 52 sets the mode for minimizing the sum of absolute values of prediction errors, while the DCT mode switching circuit 55 sets the mode for optimizing the encoding efficiency.

The I-picture data outputted by the DCT mode switching circuit 55 is supplied to the DCT circuit 56 and thereby DCTed for conversion into DCT coefficients. The DCT coefficients are supplied to the quantization circuit 57 and thereby quantized at quantization steps corresponding to the amounts of data storage in the transmission buffer 59 before being supplied to the VLC circuit 58.

The VLC circuit 58 converts picture data (data of I-pictures) from the quantization circuit 57, in accordance with the quantization steps (scale) supplied from the quantization circuit 57, into variable length codes, such as Huffman codes, which are outputted to the transmission buffer 59.

The VLC circuit 58 is also fed with the quantization steps (scales), prediction mode (mode indicating which of the intra-coding mode, forward prediction mode, backward prediction mode or bi-directional prediction mode has been set), motion vector, the prediction flag (flag specifying which of the frame prediction mode or the field prediction mode has been set), and a DCT flag (flag specifying which of the frame DCT mode or the field DCT mode has been set) from the quantization circuit 57, prediction decision circuit 54, motion vector detection circuit 50, prediction decision circuit 54 and the DCT mode switching circuit 55, respectively, for variable length encoding.

The transmission buffer 59 temporarily stores the input data and outputs data corresponding to the stored data volume to the quantization circuit 57.

If the residual data volume in the transmission buff 59 is increased to an upper tolerable limit value, the transmission buffer increases the quantization scale by a quantization control signal for decreasing the data volume of the quantized data. Conversely, if the residual data volume in the transmission buff 59 is decreased to a lower tolerable limit value, the transmission buffer decreases the quantization scale by a quantization control signal for increasing the data volume of the quantized data. This prohibits the overflow or underflow in the transmission buffer 59 from occurring.

The data stored in the transmission buffer 59 is read out at a pre-set timing so as to be outputted on the transmission path via an output terminal 69 for storage on, for example, the recording medium 3.

The I-picture data outputted by the quantization circuit 57 are supplied to a dequantization circuit 60 where it is dequantized in accordance with the quantization steps supplied from the quantization circuit 57. An output of the dequantization circuit 60 is supplied to an inverse DCT (IDCT) circuit 61 where it is IDCTed and supplied via an adder 62 to a forward prediction picture unit 63a of a frame memory 63 for storage therein.

When processing picture data of sequentially entered various frames as the I, B, P, B, P, B, . . . pictures, the motion vector detection circuit 50 processes the initially entered frame picture as an I-picture and, before processing the picture data of the next frame as a B-picture, processes the picture data of the frame succeeding the next frame as a P-picture. Since the B-picture is likely to be accompanied by backward prediction and forward prediction, it cannot be decoded if the P-picture as the backward prediction picture is not provided in advance.

Thus the motion vector detection circuit 50 starts processing picture data of the p-picture stored in the backward original picture unit 51c. As in the above case, the macro-block based evaluation value of the intra-coding mode and the macro-block based inter-frame difference (prediction errors) are supplied from the motion vector detection circuit 50 to the prediction decision circuit 54. The prediction decision circuit 54 is responsive to the sum of absolute values of the prediction errors and the evaluation value of the intra-coding block on the macro-block basis to set one of the frame prediction mode or the field prediction mode and one of the intra-coding mode or the forward prediction mode, from one macro-block to another.

When the intra-coding mode is set, the processing unit 53 sets the switch 53d to the contact a as described above. Similarly to the I-picture data, these data are transmitted via the DCT switching circuit 55, DCT circuit 56, quantization circuit 57, VLC circuit 58 and via the transmission buffer 59 to the transmission path. These data are also supplied via the dequantization circuit 60, IDCT circuit 61 and the adder 62 to a backward prediction picture unit 63b of the frame memory 63 for storage therein.

For the forward prediction mode, the switch 53d is set to a contact b, while picture data stored in the forward prediction picture unit 63a of the frame memory 63, herein the I-picture data, are read and motion-compensated by the motion compensation circuit 64 in accordance with the motion vector outputted by the motion vector detection circuit 50. That is, if the setting of the forward prediction mode is commanded by the prediction decision circuit 54, the motion compensation circuit 64 reads out the readout address of the forward prediction picture unit 63a with a shift corresponding to the motion vector from the position corresponding to the position of the macro-block being outputted by the motion vector detection circuit 50 for generating prediction picture data.

The prediction picture data outputted by the motion compensation circuit 64 is fed to an adder 53a. The adder 53a subtracts the prediction picture data from the motion compensation circuit 64 corresponding to the macro-block from data of the macro-block of the reference picture supplied from the prediction mode switching circuit 52, and outputs a resulting difference. This difference data is transmitted to the transmission channel via DCT mode switching circuit 55, DCT circuit 56, quantization circuit 57, VLC circuit 58 and transmission buffer 58. The difference data is also locally decoded by the IDCT circuit 61 and supplied to the adder 62.

The adder 62 is also fed with the same data as the prediction picture data supplied to the adder 53a. The adder 62 adds the prediction picture data from the motion compensation circuit 64 to the difference data outputted by the IDCT circuit 61. This gives picture data of the original decoded P-picture. The picture data of the P-picture is supplied to the backward prediction picture unit 63b of the frame memory 63 for storage therein. Since in effect the data structure of the difference data outputted by the IDCT circuit needs to be the same as the data structure of the prediction picture data, it is necessary to provide a circuit for re-arraying data in readiness for a case in which the frame/field prediction mode differs from the frame/field DCT mode. This circuit, however, is omitted for simplicity.

After the data of the I-picture and the P-picture have been stored in this manner in the forward prediction picture unit 63a and the backward prediction picture unit 63b, respectively, the motion vector detection circuit 50 executes the processing for the B-picture. The prediction decision circuit 54 sets the frame/field prediction mode responsive to the value of the sum of absolute differences of the interframe differences and the evaluation value of the macroblock based intra-coding mode. The prediction decision circuit 54 also sets the prediction mode to one of the intra-coding, forward prediction, backward prediction or bi-directional prediction modes.

For the intra-coding or forward prediction mode, the switch 53d is set to the contacts a or b. The processing is similar to that for the P-picture occurs for transmitting data.

For the backward prediction mode, for which the switch 53d is set to its contact c, picture data stored in the backward prediction picture unit 63b, herein the P-picture, is read out and motion-compensated by the motion compensation circuit 64 in accordance with the motion vector outputted by the motion vector detection circuit 50. That is, when the backward prediction mode is commanded to be set by the prediction decision circuit 54, the motion compensation circuit 64 shifts the readout addresses of the backward prediction picture unit 63b from the position corresponding to the position of the macro-block being outputted by the motion vector detection circuit 50 in an amount corresponding to the motion vector in order to generate prediction picture data.

The prediction picture data outputted by the motion compensation circuit 64 is fed to an adder 53b. The adder 53b subtracts the prediction picture data from the motion compensation circuit 64 corresponding to the macro-block from data of the macro-block of the reference picture supplied from the prediction mode switching circuit 52, and outputs a resulting difference. This difference data is transmitted to the transmission channel via DCT mode switching circuit 55, DCT circuit 56, quantization circuit 57, VLC circuit 58 and transmission buffer 59.

For the bi-directional prediction mode in which the switch 53d is set to its contact d, data of the picture stored in the forward prediction picture unit 63a, herein the data of the I-picture, and data of the picture stored in the backward prediction picture unit 63b, herein data of the P-picture, are read out and motion-compensated by the motion compensation circuit 64 in accordance with the motion vector outputted by the motion vector detection circuit 50. That is, when the backward prediction mode is commanded to be set by the prediction decision circuit 54, the motion compensation circuit 64 shifts the readout addresses of the backward prediction picture unit 63b from the position corresponding to the position of the macro-block being outputted by the motion vector detection circuit 50 in an amount corresponding to the motion vector in order to generate prediction picture data.

The prediction picture data outputted by the motion compensation circuit 64 is fed to an adder 53c. The adder 53c subtracts the prediction picture data from the motion compensation circuit 64 corresponding to the macro-block from data of the macro-block of the reference picture supplied from the motion vector detection circuit 50, and outputs a resulting difference. This difference data is transmitted to the transmission channel via DCT mode switching circuit 55, DCT circuit 56, quantization circuit 57, VLC circuit 58 and transmission buffer 59.

Since the picture of the B-picture is not used as a reference picture for other pictures, it is not stored in the frame memory 63.

In the frame memory 63, the forward prediction picture unit 63a and the backward prediction picture unit 63b are bank-switched whenever the necessity arises so that data stored in one of these units is selectively outputted as the forward prediction picture or as the backward prediction picture for a given reference picture.

Figure 47:
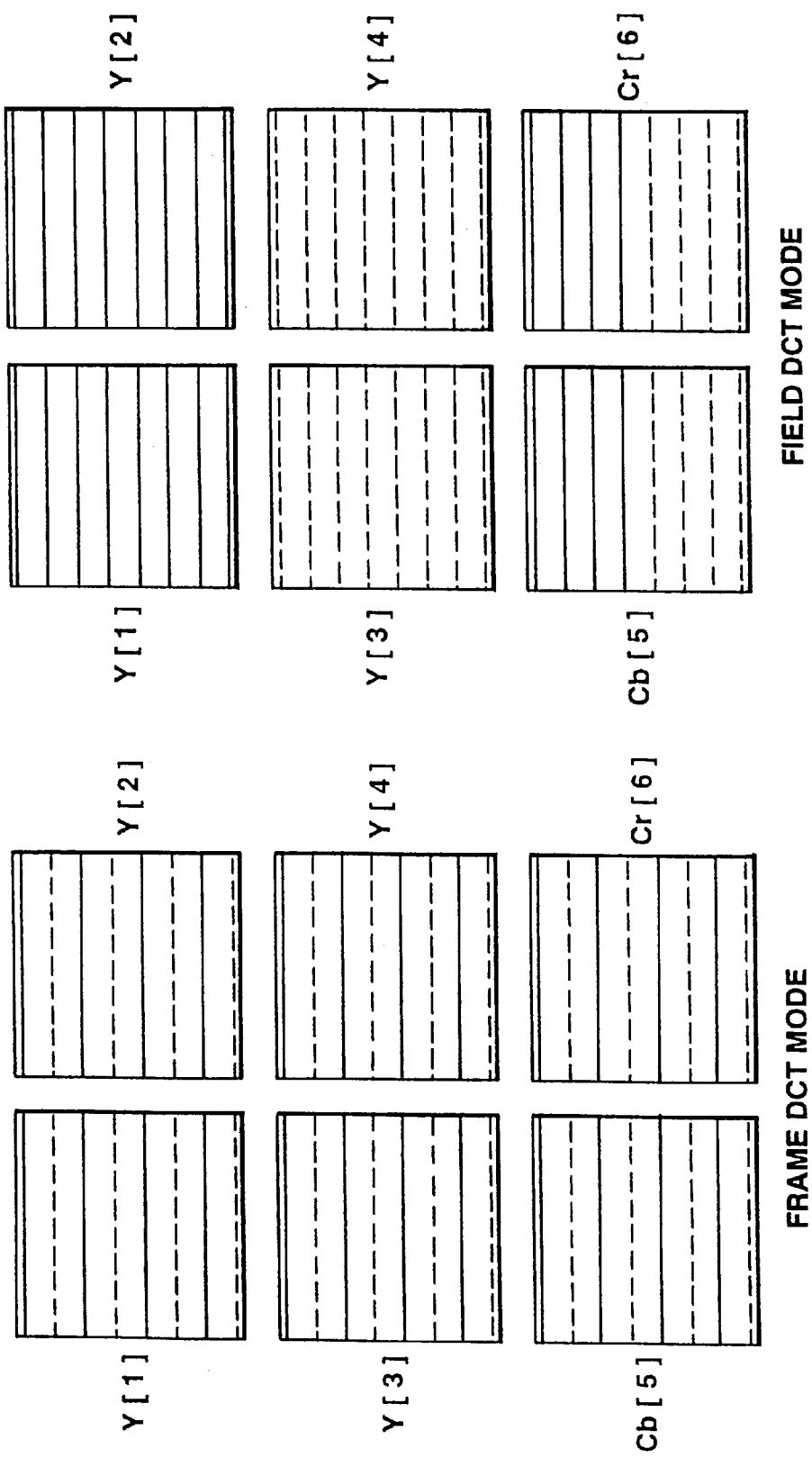
FIG. 47 illustrates the operation of the switching circuit 55 shown in FIG. 42.

Although the foregoing description has been centered about the luminance blocks, chroma blocks are similarly processed and transmitted in terms of macro-blocks shown in FIGS. 46 and 47 as units. For the motion vector for processing chroma blocks, motion vectors for the associated luminance blocks, halved in magnitude in both the vertical and horizontal directions, are employed.

Figure 48:
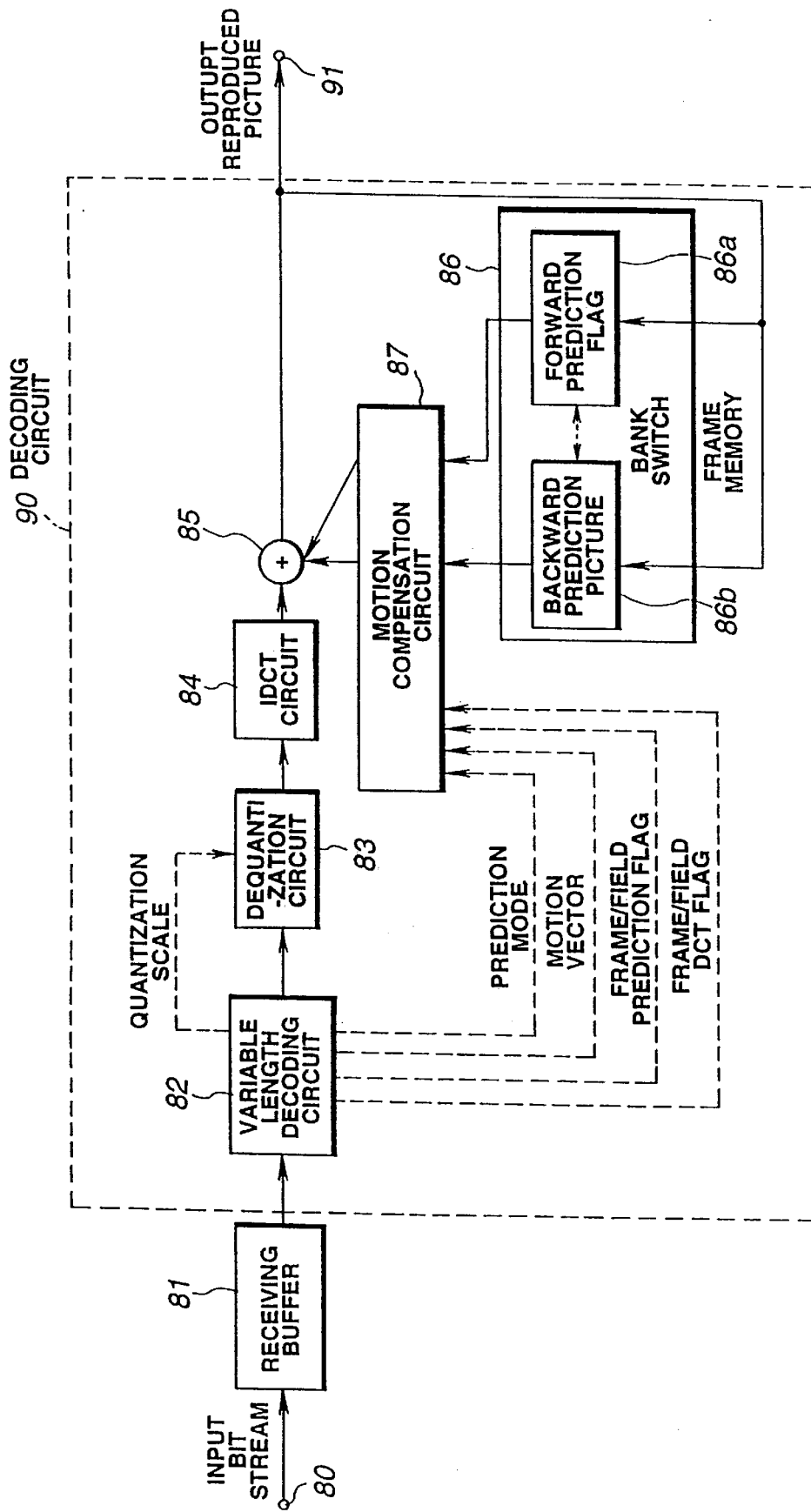
FIG. 48 is a block view showing an example of construction of a decoder 31 in FIG. 40.

Referring to FIG. 48, showing the construction of an embodiment of the decoder 31 in a block view, picture data transmitted over a transmission channel (recording medium 3) is received by a reception circuit, not shown, or reproduced by a reproducing unit. The picture data is then transiently stored in a reception buffer 81 via an input terminal 81 and thence supplied to a VLC circuit 82 of a decoding circuit 90. The VLC circuit 82 variable length encodes data supplied from the reception buffer 81 and outputs the motion vector, prediction mode, prediction flag and the DCT flag to the motion compensation circuit 87, while outputting the quantization step and the decoded picture data to the dequantization circuit 83.

The dequantization circuit 83 dequantizes picture data supplied from the VLC circuit 82 in accordance with the quantization step supplied from the VLC circuit 82 and outputs the dequantized data to an IDCT circuit 84. Output data of the dequantization circuit 83 (DCT coefficients) are IDCTed by the IDCT circuit 84 and thence supplied to an adder 85.

If the picture data supplied from the IDCT circuit 84 is the I-picture data, the data is outputted by the adder 85 and supplied to and stored in a forward prediction picture unit 86a of the frame 86 for generating prediction picture data for picture data subsequently entered to the adder 85 (data of the P- or B-picture). The data is also outputted at a format conversion circuit 32 (FIG. 43).

If the picture data supplied from the IDCT circuit 84 is the data of the P-picture having the picture data of the directly previous frame as the prediction picture data, and is data of the macro-block encoded with the forward prediction mode, picture data of the directly previous frame, stored in the forward prediction unit 86a of the frame memory 86, is read out and motion-compensated by a motion compensation circuit 87 in accordance with the motion vector outputted by the VLC circuit 82. The adder 85 adds the motion-compensated data to picture data supplied from the IDCT circuit 84 (difference data). The resulting data, that is the decoded p-picture data, is supplied to the backward prediction picture unit 86b of the frame memory 86 for generating prediction picture data for picture data subsequently supplied to the adder 85 (data of the B-picture or P-picture).

Similarly to the data of the I-picture, the data of the macro-block encoded by the intra-coding mode are not specifically processed by the adder 85 and directly stored in the backward prediction picture unit 86b, even although the data is the P-picture data.

If the picture data supplied from the IDCT circuit 84 is data of the B-picture, picture data of the I-picture stored in the forward prediction picture unit 86a of the frame memory 86 (for the case of the forward prediction mode) and/or picture data of the P-picture stored in the backward prediction picture unit 86b of the frame memory 86 (for the case of the backward prediction mode) are read out and motion-compensated by the motion compensation circuit 87 in accordance with the motion vector outputted by the VLC circuit 82 for generating a prediction picture. If no motion compensation is required, as in the case of intra-coding mode, no prediction picture is generated.

The motion-compensated data from the motion compensation circuit 87 is added by the adder 85 to an output of the IDCT circuit 84. The addition output is outputted via an output terminal 91 to the format conversion circuit 32.

However, this sum output is data the B-picture and is not used for generating a prediction picture for other pictures, so that it is not stored in the frame memory 86.

After outputting the B-picture, picture data of the P-picture stored in the backward prediction picture unit 86b is read out and outputted as playback picture via the motion compensation circuit 87 and the adder 85. At this time, however, no motion compensation or addition is performed.

Although a circuit corresponding to the prediction mode switching circuit 52 and the DCT mode switching circuit 55 in the encoder 18 of FIG. 45 is not shown in the decoder 31, the processing performed by this circuit, that is the processing for restoring the configuration of separation of signals of lines of odd-fields and even-fields to an original configuration of co-existence of signals of lines of odd-fields and even-fields, is carried out by the motion compensation circuit 87.

Although the processing of luminance signals has been described in the foregoing, chroma signals are processed in similar manner. The motion vectors employed for chroma signals are those for luminance signals halved in length in both the vertical and horizontal directions.

The three sorts of flags from the pre-processing circuit 104 of FIG. 4, that is picture_coding_type, top_field_first and repeat_first_field, are supplied along with picture data to the encoding apparatus 1 of the above-described encoding/decoding system for controlling the frame or field sets as units of encoding for achieving encoding in accordance with the encoding frames corresponding to the original non-interlaced picture. In addition, the I-, P- and B-picture types are also controlled for avoiding encoding of the above-described field repetition as the B-picture.

The present invention is not limited to the above-described merely illustrative embodiments. For example, a variety of different configurations of the irregular pattern detection circuit or the non-interlaced picture re-constructing circuit may also be employed. If the above lone field is produced in the second field, the field sets comprising repetition of the second fields may be reconstructed and transferred to encoding. The present invention may also be applied to transmission of signals without the -interposition of a recording medium.

What is claimed is:

1. A picture signal encoding method for encoding input picture signals having irregular combinations of the first and second fields as a result of an editing procedure being performed between various first and second fields constituting a non-interlaced picture, comprising the steps of:

checking the correlation between a given field and a neighboring field of the input picture signals in order to determine whether an edit point is present between said given field and said neighboring field;

storing the results of detection indicative of the location of said edit point; and deciding the combination of fields making up a non-interlaced picture of the picture string of the input picture signals in accordance with the stored check results to remove a lone field that is not related to a neighboring field as a result of a previously performed editing procedure.

2. The picture signal encoding method as claimed in claim 1 wherein, in said detection step, the correlation between paired neighboring fields is found from the correlation between an i'th line of the first field and an i'th line of the second field and the correlation between a j'th line of the second field and a j+1'st line of the first field and said lone field is detected on the basis of the correlation.

3. The picture signal encoding method as claimed in claim 1 wherein said input picture signals are obtained on converting an original 24-picture-frame-picture into a 25-frame-per-second video signal.

* * * * *